US012696181B2

(12) United States Patent
Kuge

(10) Patent No.: US 12,696,181 B2
(45) Date of Patent: Jul. 28, 2026

(54) USER EQUIPMENT (UE) AND COMMUNICATION CONTROL METHOD FOR UE

(71) Applicant: SHARP KABUSHIKI KAISHA, Sakai City (JP)

(72) Inventor: Yoko Kuge, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 473 days.

(21) Appl. No.: 18/013,172

(22) PCT Filed: Jun. 29, 2021

(86) PCT No.: PCT/JP2021/024486
§ 371 (c)(1),
(2) Date: Dec. 27, 2022

(87) PCT Pub. No.: WO2022/004699
PCT Pub. Date: Jan. 6, 2022

(65) Prior Publication Data
US 2023/0247542 A1     Aug. 3, 2023

(30) Foreign Application Priority Data
Jun. 29, 2020     (JP) ................................. 2020-111034

(51) Int. Cl.
*H04W 48/18*          (2009.01)
*H04W 60/04*          (2009.01)
*H04W 60/06*          (2009.01)
(52) U.S. Cl.
CPC ........... *H04W 48/18* (2013.01); *H04W 60/04* (2013.01); *H04W 60/06* (2013.01)

(58) Field of Classification Search
CPC ..... H04W 48/18; H04W 60/04; H04W 60/06; H04W 24/02; H04W 60/00; H04W 76/18
USPC ......................................................... 370/329
See application file for complete search history.

(56) References Cited

U.S. PATENT DOCUMENTS

2019/0357128 A1*  11/2019  Casati ................... H04W 48/18
2022/0232507 A1*  7/2022  Kim ...................... H04W 60/04
2023/0164726 A1   5/2023  Kuge et al.

FOREIGN PATENT DOCUMENTS

CN          115362722 A    11/2022
EP            4149170 A1    3/2023

OTHER PUBLICATIONS

3GPP TS 23.501 V16.4.0 (Mar. 2020) 3rd Generation Partnership Project; Technical Specification Group Services and System Aspects; System architecture for the 5G System (5GS); Stage 2 (Release 16).

(Continued)

*Primary Examiner* — Chandrahas B Patel
*Assistant Examiner* — Meheret Woldegebreal Kidane
(74) *Attorney, Agent, or Firm* — ScienBiziP, P.C.

(57)          ABSTRACT

A User Equipment (UE) includes a transmission and reception unit, a controller, and a storage unit. The transmission and reception unit receives allowed Network Slice Selection Assistance Information (NSSAI). In a case that the UE is roaming, the controller deletes mapped Single Network Slice Selection Assistance Information (S-NSSAI) of the allowed NSSAI from pending NSSAI stored by the storage unit.

2 Claims, 9 Drawing Sheets

(56)        References Cited

OTHER PUBLICATIONS

3GPP TS 23.502 V16.4.0 (Mar. 2020) 3rd Generation Partnership Project; Technical Specification Group Services and System Aspects; Procedures for the 5G System (5GS); Stage 2 (Release 16).

3GPP TS 24.501 V16.4.0 (Mar. 2020) 3rd Generation Partnership Project; Technical Specification Group Core Network and Terminals; Non-Access-Stratum (NAS) protocol for 5G System (5GS); Stage 3 (Release 16).

OPPO, "Clarification on S-NSSAI deletion based on the rejected NSSAI due to NSSAA in the roaming case", C1-204082, (Revision of C1-203324), 3GPP TSG-CT WG1 Meeting #124-e, Electronic meeting, Jun. 2-10, 2020.

China Mobile, "Updating requirements of NSSAA for roaming scenarios", C1-202173, 3GPP TSG-CT WG1 Meeting #123-e, Electronic meeting, Apr. 16-24, 2020, Apr. 9, 2020 (Apr. 9, 2020).

* cited by examiner

USER EQUIPMENT (UE) AND COMMUNICATION CONTROL METHOD FOR UE

TECHNICAL FIELD

The present invention relates to a User Equipment (UE) and a communication control method for a UE. This application claims priority based on JP-2020-111034 filed on Jun. 29, 2020, the contents of which are incorporated herein by reference.

BACKGROUND ART

The 3rd Generation Partnership Project (3GPP), which undertakes activities for standardizing recent mobile communication systems, has studied System Architecture Evolution (SAE) which is a system architecture of Long Term Evolution (LTE).

Additionally, the 3GPP has recently studied next-generation communication technologies and system architectures for a 5th Generation (5G) mobile communication system which is a next generation mobile communication system, and in particular, has standardized a 5G System (5GS) as a system for realizing a 5G mobile communication system (see NPL 1 and NPL 2). In the 5GS, technical problems attributable to connection of various terminals to a cellular network are extracted to standardize solutions.

CITATION LIST

Non Patent Literature

NPL 1: 3GPP TS 23.501 V16.4.0 (2020 March); 3rd Generation Partnership Project; Technical Specification Group Services and System Aspects; System Architecture for the 5G System; Stage 2 (Release 16)

NPL 2: 3GPP TS 23.502 V16.4.0 (2020 March); 3rd Generation Partnership Project; Technical Specification Group Services and System Aspects; Procedures for the 5G System; Stage 2 (Release 16)

NPL 3: 3GPP TS 24.501 V16.4.0 (2020 March); 3rd Generation Partnership Project; Technical Specification Group Core Network and Terminals; Non-Access-Stratum (NAS) protocol for 5G System (5GS); Stage 3 (Release 16)

SUMMARY OF INVENTION

Technical Problem

For the 5G System (5GS), a 5G Core Network (5GCN) corresponding to a new core network has been under study in order to provide a wide variety of services.

In addition, for the 5G, a network slice has been defined that corresponds to a logical network providing specific network functions and specific network characteristics for a specific service type or a specific group. For example, the network slice may be a logical network provided for terminals with a low delay function, or may be a logical network provided for sensor terminals used in the Internet of Things (IoT).

In the 3GPP, Enhancement of Network Slicing (eNS) has been under study in order to study further functions associated with network slices. In the 3GPP, as study of phase 2 of eNS, addition of a function for managing the number of UEs allowed for each slice or the number of sessions to be connected has been under study.

However, an implementation method for satisfying the above-described demand is not clear.

An aspect of the present invention has been made in the light of the circumstances as described above, and provides a method of implementing a function for eNS in the 5GS.

Solution to Problem

An aspect of the present invention provides a User Equipment (UE) including a transmission and reception unit, a controller, and a storage unit, wherein the transmission and reception unit receives allowed Network Slice Selection Assistance Information (NSSAI), and in a case that the UE is roaming, the controller deletes mapped Single Network Slice Selection Assistance Information (S-NSSAI) of the allowed NSSAI from pending NSSAI stored by the storage unit.

An aspect of the present invention provides a communication control method performed by a User Equipment (UE), the communication control method including the steps of receiving allowed Network Slice Selection Assistance Information (NSSAI), and in a case that the UE is roaming, deleting mapped Single Network Slice Selection Assistance Information (S-NSSAI) of the allowed NSSAI from pending NSSAI stored by the UE.

Advantageous Effects of Invention

According to an aspect of the present invention, in the 5GS, eNS can be supported, enabling managing the number of UEs allowed for each slice.

DESCRIPTION OF EMBODIMENTS

A preferred embodiment for carrying out an aspect of the present invention will be described below with reference to the drawings. Note that, as an example, an embodiment of a mobile communication system to which an aspect of the present invention is applied will be described in the present embodiment.

1. Overview of System

Figure 1:
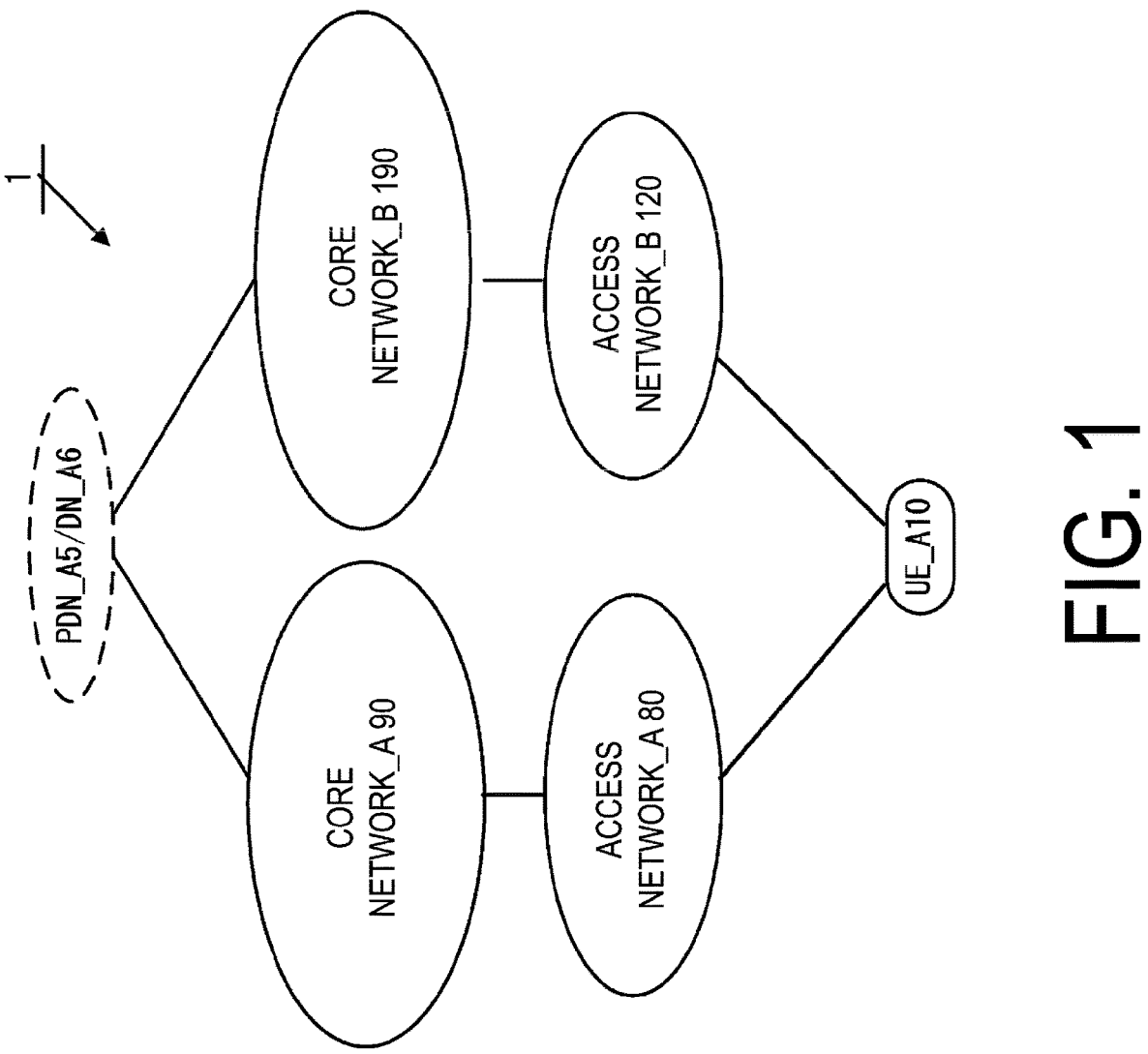
FIG. 1 is a diagram illustrating an overview of a mobile communication system (EPS/5GS).
Figure 2:
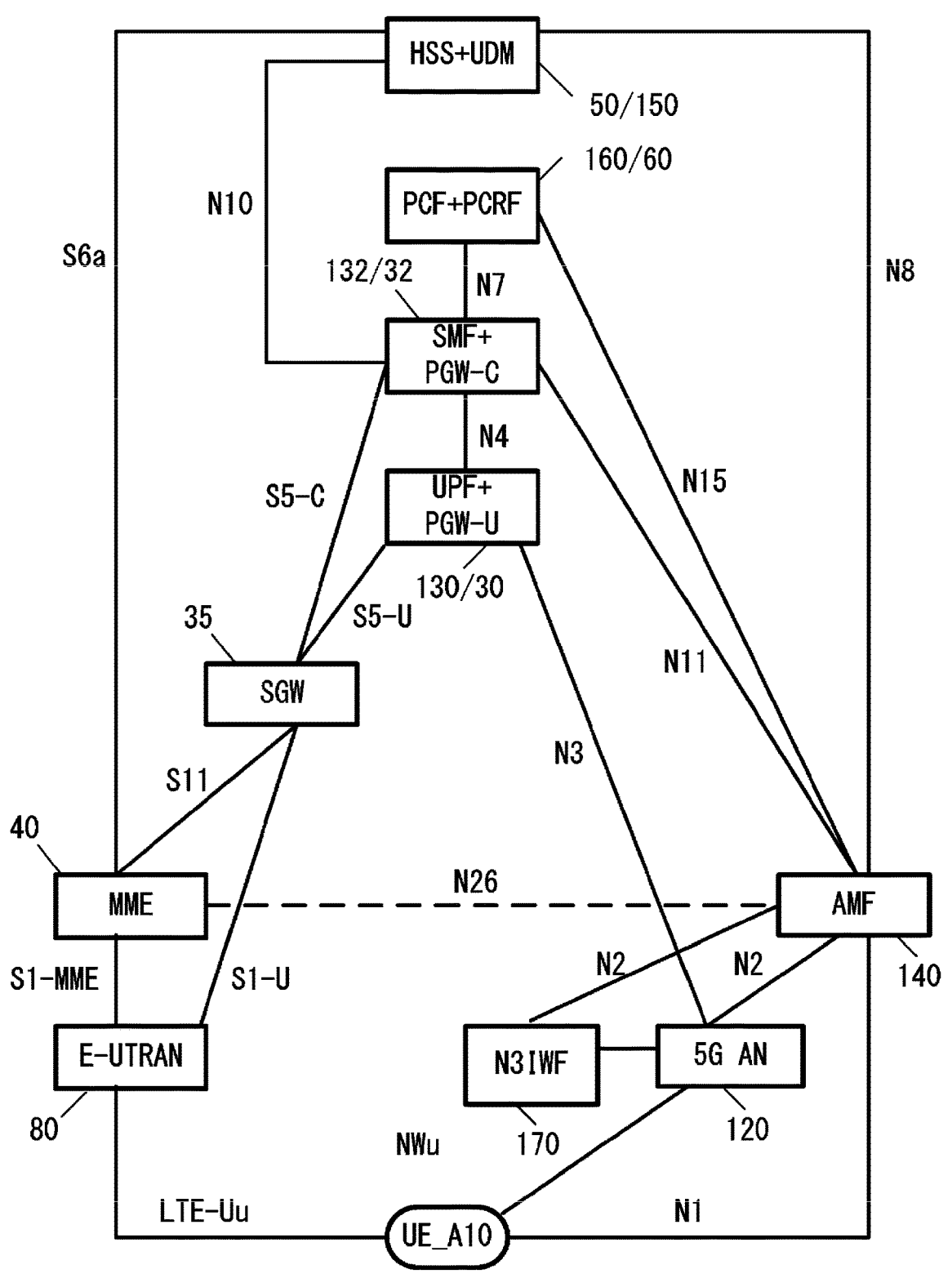
FIG. 2 is a diagram illustrating a detailed configuration of the mobile communication system (EPS/5GS).

First, FIG. 1 is a diagram illustrating an overview of a mobile communication system 1 used in each embodiment, and FIG. 2 is a diagram illustrating a detailed configuration of the mobile communication system 1.

In the illustration of FIG. 1, the mobile communication system 1 includes a UE_A 10, an access network_A 80, a core network_A 90, a Packet Data Network (PDN)_A 5, an access network_B 120, a core network_B 190, and a Data Network (DN)_A 6.

In the following description, the symbols may be omitted, such as in a UE, an access network_A, a core network_A, a PDN, an access network_B, a core network_B, and a DN, in regard to these apparatuses and functions.

Also, FIG. 2 illustrates apparatuses and functions such as a UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, a UDM 150, and an N3IWF 170, and interfaces for connecting these apparatuses and functions to each other.

In the following description, the symbols may be omitted, such as in a UE, an E-UTRAN, an MME, an SGW, a PGW-U, a PGW-C, a PCRF, an HSS, a 5G AN, an AMF, a UPF, an SMF, a PCF, a UDM, and an N3IWF, in regard to these apparatuses and functions.

Note that an Evolved Packet System (EPS) that is a 4G system includes the access network_A and the core network_A and may further include the UE and/or the PDN. A 5G System (5GS) that is a 5G system includes the UE, the access network_B, and the core network_B and may further include the DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus capable of performing radio communication, such as a mobile phone or a smartphone, and may be a terminal apparatus that can be connected to both the EPS and the 5GS. The UE may include a Universal Integrated Circuit Card (UICC) and an Embedded UICC (eUICC). Note that the UE may be referred to as a user equipment or a terminal apparatus.

The access network_A corresponds to an Evolved Universal Terrestrial Radio Access Network (E-UTRAN) and/or a radio LAN access network. In the E-UTRAN, one or more evolved Node Bs (eNBs) 45 are deployed. Note that in the following description, the symbol for the eNB 45 may be omitted such as in an eNB. In a case that there are multiple eNBs, the eNBs are connected to each other via, for example, an X2 interface. In the radio LAN access network, one or more access points are deployed.

The access network_B corresponds to a 5G access network (5G AN). The 5G AN includes an NG Radio Access Network (NG-RAN) and/or a non-3GPP access network. In the NG-RAN, one or more NR NodeBs (gNBs) 122 are deployed. Note that in the following description, the symbol for the gNB 122 may be omitted, such as in an eNB. The gNB is a node that provides a New Radio (NR) user plane and control plane to the UE, and is connected to a 5GCN via the NG interface (including the N2 interface or the N3 interface). In other words, the gNB is a base station apparatus newly designed for the 5GS and has functions different from those of the base station apparatus (eNB) used in the EPS that is a 4G system. In a case that there are multiple gNBs, the gNBs are connected to each other via, for example, an Xn interface.

Also, a non-3GPP access network may be an untrusted non-3GPP access network or a trusted non-3GPP access network. Here, the untrusted non-3GPP access network may be a non-3GPP access network that is an access network in which security management is not performed, such as a public wireless LAN, for example. On the other hand, the trusted non-3GPP access network may be an access network defined by 3GPP and may include a trusted non-3GPP access point (TNAP) and a trusted non-3GPP Gateway function (TNGF).

In the following description, the E-UTRAN and the NG-RAN may be referred to as 3GPP access. The radio LAN access network and the non-3GPP AN may be referred to as non-3GPP access. The nodes deployed in the access network_B may also be collectively referred to as NG-RAN nodes.

In the following description, the access network_A, and/or the access network_B, and/or an apparatus included in the access network_A, and/or an apparatus included in the access network_B may be referred to as an access network or an access network apparatus.

The core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

The core network_B corresponds to a 5G Core Network (5GCN). In the 5GCN, for example, an Access and Mobility Management Function (AMF), a User Plane Function (UPF), a Session Management Function (SMF), a Policy Control Function (PCF), a Unified Data Management (UDM), and the like are deployed. Here, the 5GCN may be referred to as a 5GC.

In the following description, the core network_A, and/or the core network B, an apparatus included in the core network_A, and/or an apparatus included in the core network_B may be referred to as a core network, a core network apparatus, or an intra-core network apparatus.

The core network (the core network_A and/or the core network B) may refer to an IP mobile communication network operated by a mobile communication operator (Mobile Network Operator MNO)) connecting the access network (the access network_A and/or the access network B) and the PDN and/or the DN, a core network for a mobile communication operator that operates and manages the mobile communication system 1, or a core network for a virtual mobile communication operator and a virtual mobile communication service provider such as a Mobile Virtual Network Operator (MVNO) and a Mobile Virtual Network Enabler (MVNE).

The core network (core network_A and/or core network_B) and the access network (access network_A and access network B) may be different from each other among the mobile network operators.

FIG. 1 illustrates a case that the PDN and the DN are the same; however the PDN and the DN may be different. The PDN may be a Data Network (DN) that provides communication services for the UE. Note that the DN may be configured as a packet data service network or may be configured for each service. In addition, the PDN may include a connected communication terminal. Thus, "to be connected to the PDN" may mean "to be connected to a communication terminal and a server apparatus deployed in the PDN". In addition, "to transmit and/or receive user data to and/or from the PDN" may mean "to transmit and/or receive user data to and/or from a communication terminal and a server apparatus deployed in the PDN". Note that the PDN may be referred to as a DN, and the DN may be referred to as a PDN.

In the following, at least some of the access network_A, the core network_A, the PDN, the access network_B, the core network_B, and the DN, and/or one or more apparatuses included in these may be referred to as a network or a network apparatus. In other words, the expression that "the network and/or the network apparatus transmits and/or receives a message and/or performs a procedure" means that "at least some of the access network_A, the core network_A, the PDN, the access network_B, the core network_B, and the DN, and/or one or more apparatuses included in these transmit and/or receive a message and/or perform a procedure".

The UE can be connected to the access network. The UE can be connected to the core network over the access network. In addition, the UE can be connected to the PDN or the DN over the access network and the core network. In other words, the UE can transmit and/or receive (communicate) user data to and/or from the PDN or the DN. In a case that user data is transmitted and/or received, not only Internet Protocol (IP) communication but also non-IP communication may be used.

Here, IP communication refers to data communication using the IP, and data is transmitted and/or received using IP packets. The IP packet includes an IP header and a payload part. In the payload part, data transmitted and/or received by the apparatuses and functions included in the EPS and the apparatuses and functions included in the 5GS may be included. Non-IP communication refers to data communication not using the IP, where data is transmitted and/or received in a form different from the structure of the IP packets. For example, non-IP communication may be data communication implemented through transmission and/or reception of application data to which an IP header is not added, or user data transmitted and/or received by the UE may be transmitted and/or received with another header such as a MAC header and an Ethernet (trade name) frame header added.

Also, apparatuses which are not illustrated in FIG. 2 may be configured in the access network_A, the core network_A, the access network_B, the core network_B, the PDN_A, and the DN_A. For example, the core network_A and/or the core network_B and/or the PDN_A and/or the DN_A may include an Authentication Server Function (AUSF) and an Authentication, authorization, and accounting (AAA) server (AAA-S). The AAA server may be located outside the core network.

Here, an AUSF is a core network apparatus provided with an authentication function for 3GPP access and non-3GPP access. Specifically, the AUSF is a network function unit that receives an authentication request for 3GPP access and/or non-3GPP access from the UE and performs an authentication procedure.

Also, the AAA server is an apparatus that is connected directly to the AUSF or indirectly to the AUSF via another network apparatus and has authentication, approval, and billing functions. The AAA server may be a network apparatus within the core network. Note that the AAA server may not be included in the core network_A and/or the core network_B and may be included in the PLMN. In other words, the AAA server may be a core network apparatus or may be an apparatus outside the core network. For example, the AAA server may be a server apparatus within the PLMN managed by a third party.

Note that although each of the apparatuses and functions is illustrated one by one for simplicity in FIG. 2, multiple similar apparatuses and functions may be configured in the mobile communication system 1. Specifically, multiple apparatuses and functions such as the UE_A 10, the E-UTRAN 80, the MME 40, the SGW 35, the PGW-U 30, the PGW-C 32, the PCRF 60, the HSS 50, the 5G AN 120, the AMF 140, the UPF 130, the SMF 132, the PCF 160, and/or the UDM 150 may be configured in the mobile communication system 1.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. At least a part (including all) of the functions of each apparatus may be configured as physical hardware, logical hardware, or software.

Note that each storage unit (a storage unit_A 340, a storage unit_A 440, a storage unit_B 540, a storage unit_A 640, and a storage unit_B 740) in each apparatus and function to be described later includes, for example, a semiconductor memory, a Solid State Drive (SSD), a Hard Disk Drive (HDD), or the like. Each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. Each storage unit can store identification information, control information, flags, parameters, and the like included in a control message transmitted and/or received in various communication procedures to be described later. Each storage unit may store these pieces of information for each UE. In a case that each storage unit performs interworking between the 5GS and the EPS, each storage unit can store a control message and user data transmitted and/or received to and/or from the apparatuses and functions included in the 5GS and/or the EPS. In this case, not only information transmitted and/or received over the N26 interface but also information transmitted and/or received without using the N26 interface can be stored.

2.1. Apparatus Configuration of UE

Figure 3:
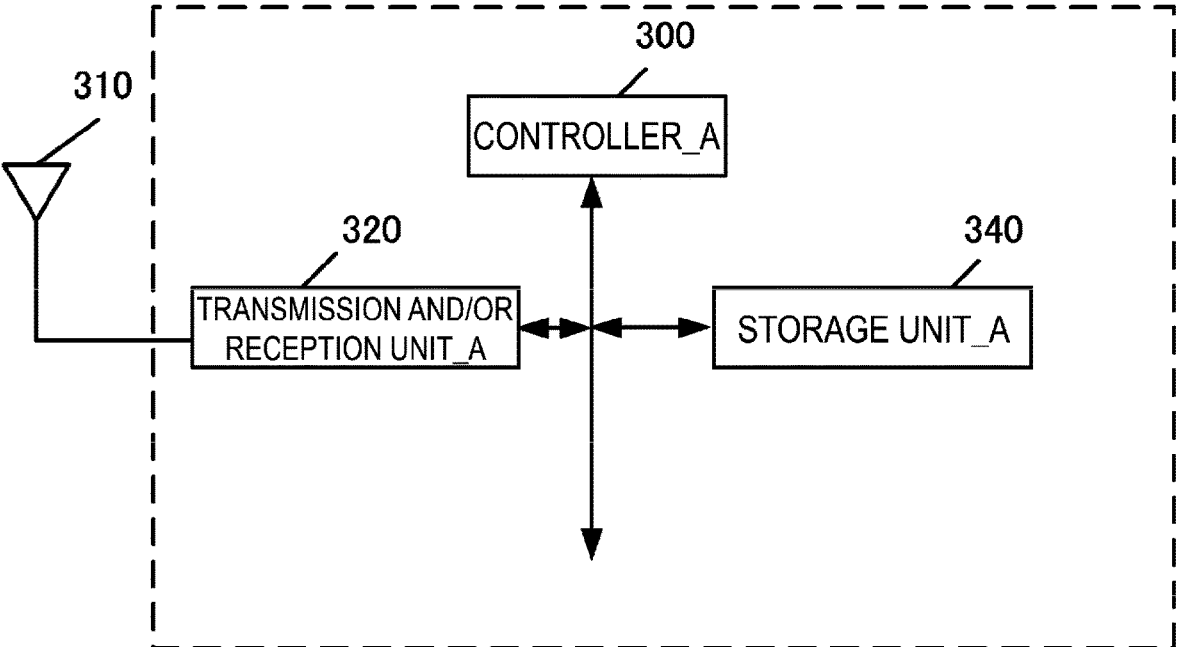
FIG. 3 is a diagram illustrating an apparatus configuration of a UE.

First, an apparatus configuration example of the User Equipment (UE) will be described with reference to FIG. 3. The UE includes a controller_A 300, an antenna 310, a transmission and/or reception unit_A 320, and a storage unit_A 340. The controller_A 300, the transmission and/or reception unit_A 320, and the storage unit_A 340 are connected via a bus. The transmission and/or reception unit_A 320 connects to the antenna 310.

The controller_A 300 is a function unit that controls the entire operations and functions of the UE. The controller_A 300 reads and performs various programs stored in the storage unit_A 340 as necessary, and thereby implements various types of processing in the UE.

The transmission and/or reception unit_A 320 is a function unit for performing radio communication with the base station apparatus (the eNB or the gNB) in the access network via the antenna. In other words, with the use of the transmission and/or reception unit_A 320, the UE can transmit and/or receive user data and/or control information to and/or from the access network apparatus, and/or the core network apparatus, and/or the PDN, and/or the DN.

Following is a detailed description with reference to FIG. 2. With the use of the transmission and/or reception unit_A 320, the UE can communicate with the base station apparatus (eNB) in the E-UTRAN over the LTE-Uu interface. The UE can communicate with the base station apparatus (gNB) in the 5G AN with the use of the transmission and/or reception unit_A 320. The UE can transmit and/or receive a Non-Access-Stratum (NAS) message to and/or from the AMF over the N1 interface with the use of the transmission and/or reception unit_A 320. Note that the N1 interface is a logical interface, and thus communication between the UE and the AMF is actually performed over the 5G AN.

The storage unit_A 340 is a function unit for storing programs, user data, control information, and the like necessary for each operation of the UE.

2.2. Apparatus Configuration of gNB

Figure 4:
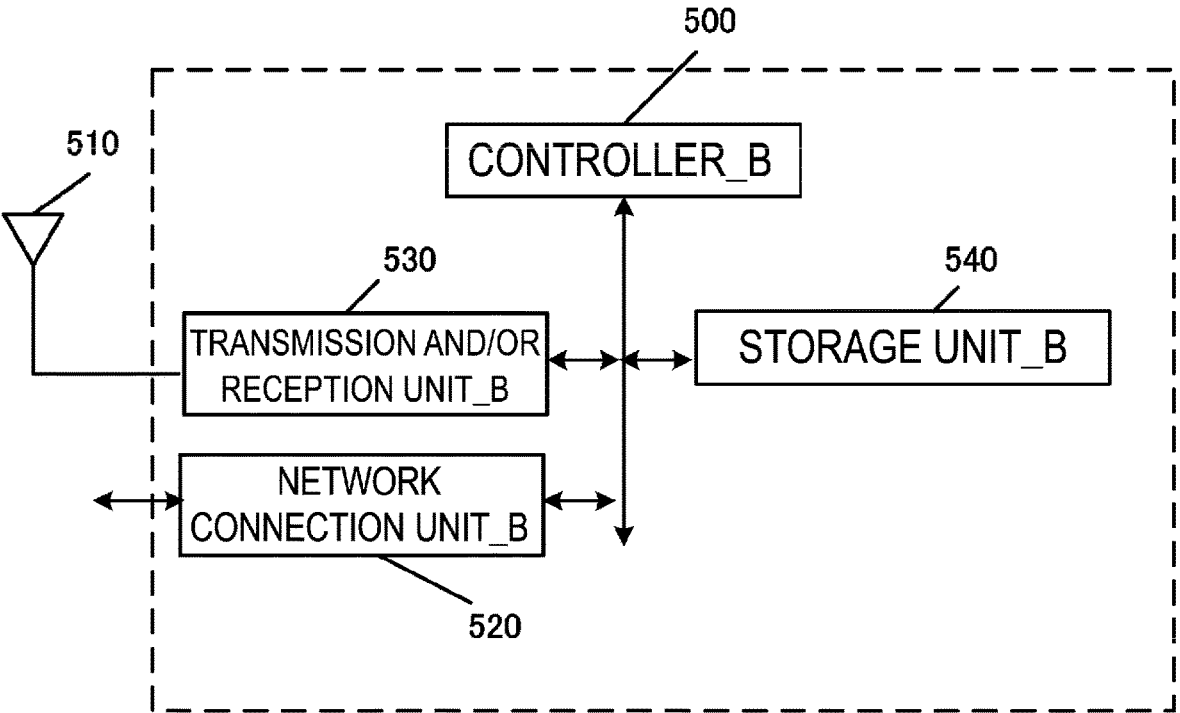
FIG. 4 is a diagram illustrating a configuration of an access network apparatus (gNB) in the 5GS.

Next, an apparatus configuration example of the gNB will be described with reference to FIG. 4. The gNB includes a controller_B 500, an antenna 510, a network connection unit_B 520, a transmission and/or reception unit_B 530, and a storage unit_B 540. The controller_B 500, the network connection unit_B 520, the transmission and/or reception unit_B 530, and the storage unit_B 540 are connected via a bus. The transmission and/or reception unit_B 530 connects to the antenna 510.

The controller_B 500 is a function unit that controls the entire operations and functions of the gNB. The controller_B 500 reads and performs various programs stored in the storage unit_B 540 as necessary, and thereby implements various types of processing in the gNB.

The network connection unit_B 520 is a function unit for the gNB to communicate with the AMF and/or the UPF. In other words, with the use of the network connection unit_B 520, the gNB can transmit and/or receive user data and/or control information to and/or from the AMF and/or the UPF.

The transmission and/or reception unit_B 530 is a function unit for performing radio communication with the UE via the antenna 510. In other words, with the use of the transmission and/or reception unit_B 530, the gNB can transmit and/or receive user data and/or control information to and/or from the UE.

Following is a detailed description with reference to FIG. 2. With the use of the network connection unit_B 520, the gNB in the 5G AN can communicate with the AMF over the N2 interface and can communicate with the UPF over the N3 interface. The gNB can communicate with the UE with the use of the transmission and/or reception unit_B 530.

The storage unit_B 540 is a function unit for storing programs, user data, control information, and the like necessary for each operation of the gNB.

2.3. Apparatus Configuration of AMF

Figure 5:
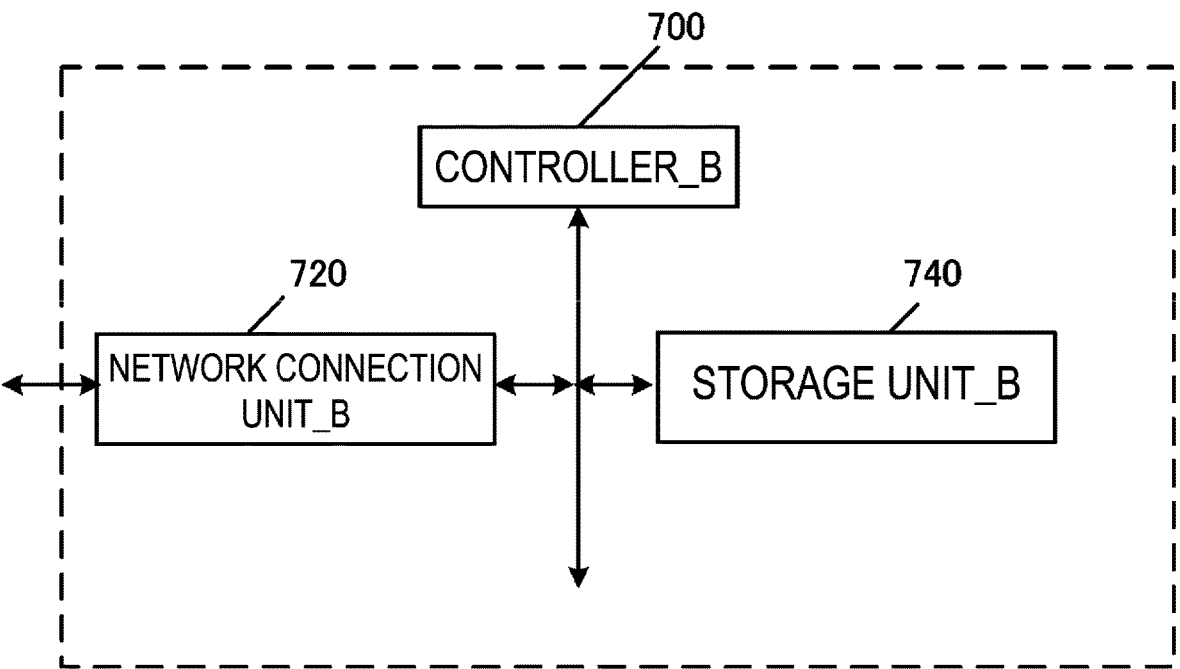
FIG. 5 is a diagram illustrating a configuration of a core network apparatus (AMF/SMF/UPF) in the 5GS.

Next, an apparatus configuration example of the AMF will be described with reference to FIG. 5. The AMF includes a controller_B 700, a network connection unit_B 720, and a storage unit_B 740. The controller_B 700, the network connection unit_B 720, and the storage unit_B 740 are connected via a bus. The AMF may be a node that handles the control plane.

The controller_B 700 is a function unit that controls the entire operations and functions of the AMF. The controller_B 700 reads and performs various programs stored in the storage unit_B 740 as necessary, and thereby implements various types of processing in the AMF.

The network connection unit B 720 is a function unit for the AMF to connect to the base station apparatus (gNB), and/or the SMF, and/or the PCF, and/or the UDM, and/or the SCEF in the 5G AN. In other words, with the use of the network connection unit_B 720, the AMF can transmit and/or receive user data and/or control information to and/or from the base station apparatus (gNB), and/or the SMF, and/or the PCF, and/or the UDM, and/or the SCEF in the 5G AN.

Following is a detailed description with reference to FIG. 2. With the use of the network connection unit_A 620, the AMF in the 5GCN can communicate with the gNB over the N2 interface, can communicate with the UDM over the N8 interface, can communicate with the SMF over the N11 interface, and can communicate with the PCF over the N15 interface. The AMF can transmit and/or receive a NAS message to and/or from the UE over the N1 interface with the use of the network connection unit_A 620. Note that the N1 interface is a logical interface, and thus communication between the UE and the AMF is actually performed over the 5G AN. In a case that the AMF supports the N26 interface, the AMF can communicate with the MME over the N26 interface with the use of the network connection unit A 620.

The storage unit_B 740 is a function unit for storing programs, user data, control information, and the like necessary for each operation of the AMF.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal with the UE via the N3IWF, a function of authenticating the UE connected via the N3IWF, and the like.

In registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is in a state of being unable to reach the UE, because a UE context in the AMF does not have valid location information and routing information for the UE. In the RM-REGISTERED state, the UE is registered in the network, and thus the UE can receive a service that requires registration in the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is 5GMM-REGISTERED, the UE_A 10 may start transmission and/or reception of user data and a control message, or may respond to paging. In addition, note that, in a case that each apparatus is 5GMM-REGISTERED, the UE_A 10 may perform a registration procedure other than a registration procedure for initial registration, and/or a service request procedure.

In addition, 5GMM-DEREGISTERED may be a state in which each apparatus does not establish the 5GMM context, may be a state in which the location information of the UE_A 10 is not known to the network, or may be a state in which the network is in a state of being unable to reach the UE_A 10. Note that, in a case that each apparatus is 5GMM-DEREGISTERED, the UE_A 10 may initiate the registration procedure, or may perform the registration procedure to thereby establish the 5GMM context.

In connection management, a CM state for each UE is managed. The CM state may be synchronized between the UE and the AMF. The CM state includes a non-connected state (CM-IDLE state) and a connected state (CM-CON-NECTED state). In the CM-IDLE state, the UE is in the RM-REGISTERED state, but does not have NAS signaling connection established with the AMF via the N1 interface. In the CM-IDLE state, the UE does not have connection of the N2 interface (N2 connection) and connection of the N3 interface (N3 connection). In contrast, in the CM-CON-NECTED state, the UE has NAS signaling connection established with the AMF via the N1 interface. In the CM-CONNECTED state, the UE may have connection of the N2 interface (N2 connection) and/or connection of the N3 interface (N3 connection).

In addition, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). In addition, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GMM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode.

One or more AMFs may be deployed in the core network_B. The AMF may be an NF that manages one or more Network Slice Instances (NSIs). The AMF may be a common CP function (Common Control Plane Network Function (CPNF) (CCNF)) shared among multiple NSIs.

Note that, in a case that the UE connects to the 5GS over non-3GPP access, the N3IWF is an apparatus deployed and/or a function allocated between non-3GPP access and the 5GCN.

2.4. Apparatus Configuration of SMF

Next, an apparatus configuration example of the SMF will be described with reference to FIG. 5. The SMF includes a controller_B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a function unit that controls the entire operations and functions of the SMF. The controller_B 700 reads and performs various programs stored in the storage unit_B 740 as necessary, and thereby implements various types of processing in the SMF.

The network connection unit_B 720 is a function unit for the SMF to connect to the AMF, and/or the UPF, and/or the PCF, and/or the UDM. In other words, with the use of the network connection unit_B 720, the SMF can transmit and/or receive user data and/or control information to and/or from the AMF, and/or the UPF, and/or the PCF, and/or the UDM.

Following is a detailed description with reference to FIG. 2. With the use of the network connection unit_A 620, the SMF in the 5GCN can communicate with the AMF over the N11 interface, can communicate with the UPF over the N4 interface, can communicate with the PCF via the N7 interface, and can communicate with the UDM over the N10 interface.

The storage unit_B 740 is a function unit for storing programs, user data, control information, and the like necessary for each operation of the SMF.

The SMF has a Session Management function such as establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of issuing a notification about arrival of downlink data (Downlink Data Notification), a function of providing SM information specific to the AN (for each AN) that is transmitted to the AN through the AMF over the N2 interface, a function of determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a function unit that controls the entire operations and functions of the UPF. The controller_B 700 reads and performs various programs stored in the storage unit_B 740 as necessary, and thereby implements various types of processing in the UPF.

The network connection unit B 720 is a function unit for the UPF to connect to the base station apparatus (gNB), and/or the SMF, and/or the DN in the 5G AN. In other words, with the use of the network connection unit_B 720, the UPF can transmit and/or receive user data and/or control information to and/or from the base station apparatus (gNB), and/or the SMF, and/or the DN in the 5G AN.

Following is a detailed description with reference to FIG. 2. With the use of the network connection unit_A 620, the UPF in the 5GCN can communicate with the gNB over the N3 interface, can communicate with the SMF over the N4 interface, can communicate with the DN over the N6 interface, and can communicate with another UPF over the N9 interface.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point to be mutually connected with the DN (that is, a function of transferring user data as a gateway between the DN and the core network_B), a function of routing and transferring packets, an Uplink Classifier (UL CL) function of supporting routing of multiple traffic flows for one DN, a Branching point function of supporting a multi-homed PDU session, a Quality of Service (QoS) processing function for the user plane, a function of verifying uplink traffic, a function of triggering buffering of downlink packets and Downlink Data Notification, and the like.

The UPF may be a gateway for IP communication and/or non-IP communication. The UPF may have a function of transferring IP communication, or a function of conversion between non-LP communication and IP communication. In addition, multiple deployed gateways may be gateways for connecting the core network_B and a single DN. Note that the UPF may have connectivity with another NF, and may connect to each apparatus via another NF.

Note that the user plane refers to user data that is transmitted and/or received between the UE and the network. The user plane may be transmitted and/or received using a PDN connection or a PDU session. In addition, in a case of the EPS, the user plane may be transmitted and/or received using the LTE-Uu interface, and/or the S1-U interface, and/or the S5 interface, and/or the S8 interface, and/or the SGi interface. In addition, in a case of the 5GS, the user plane may be transmitted and/or received over the interface between the UE and the NG RAN, and/or the N3 interface, and/or the N9 interface, and/or the N6 interface. The user plane may be hereinafter referred to as a U-Plane.

In addition, the control plane refers to a control message that is transmitted and/or received in order to perform communication control of the UE or the like. The control plane may be transmitted and/or received using Non-Access-Stratum (NAS) signaling connection between the UE and the MME. In addition, in a case of the EPS, the control plane may be transmitted and/or received using the LTE-Uu interface and the S1-MME interface. In addition, in a case of the 5GS, the control plane may be transmitted and/or received using the interface between the UE and the NG RAN and the N2 interface. The control plane may be hereinafter referred to as a control plane, or may be hereinafter referred to as a C-Plane.

In addition, the User Plane (U-Plane (UP)) may be a communication path for transmitting and/or receiving user data, and may include multiple bearers. In addition, the Control Plane (C-Plane (CP)) may be a communication path for transmitting and/or receiving a control message, and may include multiple bearers.

2.6. Description of Other Apparatuses and/or Functions and/or Identification Information in Present Embodiment Now, other apparatuses and/or functions and/or identification information and messages transmitted and/or received and stored and managed by each apparatus will be described.

A network refers to at least some of the access network_B, the core network_B, and the DN. One or more apparatuses included in at least a part of the access network_B, the core network_B, and the DN may be referred to as a network or a network apparatus. In other words, "a network transmits and/or receives a message and/or performs processing" may mean "an apparatus (a network apparatus and/or a control apparatus) in the network transmits and/or receives the message and/or performs the processing". Conversely, "an apparatus in a network transmits and/or receives a message and/or performs processing" may mean "the network transmits and/or receives the message and/or performs the processing".

A session management (SM) message (also referred to as a Non-Access-Stratum (NAS) SM message) may be a NAS message used in a procedure for SM, or may be a control message transmitted and/or received between the UE_A 10 and the SMF_A 230 via the AMF_A 240. Furthermore, the SM message may include a PDU session establishment request message, a PDU session establishment accept message, a PDU session reject message (PDU session establishment reject message), a PDU session modification request message, a PDU session modification command message, a PDU session modification complete message (PDU session modification complete), a PDU session modification command reject message, a PDU session modification reject message, a PDU session release request message, a PDU session release reject message, a PDU session release command message, a PDU session release complete message, and the like. The procedure for SM or the SM procedure may include a PDU session establishment procedure, a PDU session modification procedure, and a PDU session release procedure (UE-requested PDU session release procedure). Note that each procedure may be a procedure initiated by the UE, or may be a procedure initiated by the NW (network).

A Mobility management (MM) message (also referred to as a NAS MM message) may be a NAS message used in a procedure for MM, or may be a control message transmitted and/or received between the UE_A 10 and the AMF_A 240. Furthermore, the MM message may include a Registration request message, a Registration Accept message, a Registration reject message, a De-registration request message, a De-registration accept message, a configuration update command message, a configuration update complete message, a Service request message, a Service accept message, a Service reject message, a Notification message, a Notification response message, and the like. The procedure for MM or the MM procedure may include a Registration procedure, a De-registration procedure, a Generic UE configuration update procedure, an authentication and authorization procedure, a Service request procedure, a Paging procedure, and a Notification procedure.

A 5G System (5GS) service may be a connection service provided using the core network_B 190. In addition, the 5GS service may be a service different from an EPS service, or may be a service similar to the EPS service.

A non 5GS service may be a service other than the 5GS service and may include an EPS service and/or a non EPS service.

A Packet Data Network (PDN) type indicates a type of PDN connection and includes IPv4, IPv6, IPv4v6, and non-IP. In a case that IPv4 is specified, it is indicated that transmission and/or reception of data is performed using IPv4. In a case that IPv6 is specified, it is indicated that transmission and/or reception of data is performed using IPv6. In a case that IPv4v6 is specified, it is indicated that transmission and/or reception of data is performed using IPv4 or IPv6. In a case that non-IP is specified, it is indicated that communication is performed using a communication method other than the IP, not communication using the IP.

Although a Protocol Data Unit/Packet Data Unit (PDU) session can be defined as a relationship between the DN that provides a PDU connectivity service and the UE, the PDU session may be connectivity established between the UE and an external gateway. In the 5GS, the UE establishes a PDU session via the access network_B and the core network_B, and can thereby perform transmission and/or reception of user data to and/or from the DN by using the PDU session. Here, the external gateway may be a UPF, an SCEF, or the like. The UE can perform transmission and/or reception of user data to and/or from an apparatus deployed in the DN, such as an application server, by using a PDU session.

Note that each apparatus (the UE, and/or the access network apparatus, and/or the core network apparatus) may associate one or more pieces of identification information with PDU session(s) for management. Note that these pieces of identification information may include one or more of a DNN, a QoS rule, a PDU session type, application identification information, NSI identification information, access network identification information, and an SSC mode, and may further include other pieces of information. In addition, in a case that multiple PDU sessions are established, pieces of identification information associated with the PDU sessions may have the same or different contents.

The Data Network Name (DNN) may be identification information for identifying the core network and/or an external network such as the DN. In addition, the DNN can also be used as information for selecting a gateway such as the PGW_A 30/UPF_A 235 connecting the core network B 190. In addition, the DNN may correspond to an Access Point Name (APN).

A Protocol Data Unit/Packet Data Unit (PDU) session type indicates a type of PDU session and includes IPv4, IPv6, Ethernet, and Unstructured. In a case that IPv4 is specified, it is indicated that transmission and/or reception of data is performed using IPv4. In a case that IPv6 is specified, it is indicated that transmission and/or reception of data is performed using IPv6. In a case that Ethernet is specified, it is indicated that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using a Point-to-Point (P2P) tunneling technique. For the P2P tunneling technique, for example, a UDP/IP encapsulation technique may be used. Note that the PDU session type may include the IP, in addition to the above. The IP can be specified in a case that the UE can use both of IPv4 and IPv6.

The Public land mobile network (PLMN) is a communication network that provides mobile radio communication services. The PLMN is a network managed by an operator who is a (mobile) network operator, and the operator can be identified by a PLMN ID. The PLMN as used herein may mean the PLMN ID. A PLMN that matches a Mobile Network Code (MNC) and a Mobile Country Code (MCC)

of an International Mobile Subscriber Identity (IMSI) of the UE may be a Home PLMN (HPLMN). The PLMN may mean a core network.

Furthermore, the UE may hold, in the USIM, an Equivalent HPLMN list for identifying one or multiple Equivalent HPLMNs (EHPLMNs). A PLMN different from the HPLMN and/or the EHPLMN may be a VPLMN (Visited PLMN).

A PLMN with which the UE has successfully registered may be a Registered PLMN (RPLMN). An Equivalent PLMN list is used for identifying one or multiple Equivalent PLMNs (EPLMNs) that can be used equivalently to the RPLMN in a case that the UE selects the PLMN, and each apparatus may receive the Equivalent PLMN list from the RPLMN, and/or hold the Equivalent PLMN list, and/or store the Equivalent PLMN list.

The current PLMN may be a PLMN requested by the UE and/or a PLMN selected by the UE, and/or an RPLMN, and/or a PLMN allowed by a network and/or a PLMN to which a core network apparatus that transmits and/or receives messages belongs.

The requested PLMN means a transmission destination network of a message in a case that the UE transmits the message. Specifically, the requested PLMN may be a PLMN selected by the UE in the case that the UE transmits a message. The requested PLMN is a PLMN requested by the UE, and may be the current PLMN. In a case that the UE is in the registered state, the requested PLMN may be a registered PLMN.

The Standard-alone Non-Public Network (SNPN) is a network to which only particular UEs are allowed to connect, each of the UEs being identified by using an SNPN ID including a combination of a PLMN ID and a Network identifier (NID). The SNPN may mean a core network. Here, the UEs allowed to connect to the SNPN may be SNPN enabled UEs.

Furthermore, the UE may hold, in the USIM, an Equivalent SNPN list for identifying one or multiple Equivalent SPNPs (ESNPNs). An SNPN different from the HSNPN and/or the ESNPN may be a Visited PLMN (VPLMN).

The SNPN with which the UE has successfully registered may be a Registered SNPN (RSNPN). Each apparatus may receive the Equivalent SNPN list from the RSNPN, and/or hold the Equivalent SNPN list, and/or store the Equivalent SNPN list; the Equivalent PLMN list can be used for identifying one or multiple Equivalent PLMNs (ESNPNs) that can be used equivalently to the RSNPN in a case that the UE selects the PLMN or the SNPN.

A network slice (NS) is a logical network that provides specific network capability and network characteristics. The UE and/or the network can support the network slice (NW slice (NS)) in the 5GS. The network slice may simply be referred to as a slice.

A network slice instance (NSI) includes a set of an instance (entity) of a network function (NF) and necessary resources and forms a network slice to be allocated. Here, the NF is a processing function in a network, and is adopted or defined in 3GPP. The NSI is an entity of one or more NSs configured in the core network_B. The NSI may include a virtual Network Function (NF) generated using a Network Slice Template (NST).

Here, the NST is associated with a resource request for provision of a requested communication service and capability, and is a logical expression of one or more NFs. In other words, the NSI may be a set of multiple NFs in the core network_B 190. The NSI may be a logical network configured for classifying user data to be delivered depending on a service or the like. In the NS, one or more NFs may be configured. The NF configured in the NS may or may not be an apparatus shared with another NS.

The UE and/or the apparatus in the network can be allocated to one or more NSs, based on an NSSAI, and/or an S-NSSAI, and/or a UE usage type, and/or registration information such as one or more NSI IDs, and/or an APN. Note that the UE usage type is a parameter value included in registration information of the UE, which is used for identifying the NSI. The UE usage type may be stored in the HSS. The AMF may select the SMF and the UPF, based on the UE usage type.

The Single Network Slice Selection Assistance Information (S-NSSAI) is information for identifying the NS. The S-NSSAI may include only a Slice/Service type (SST), or may include both of an SST and a Slice Differentiator (SD). Here, the SST is information indicating operation of the NS expected in terms of functions and services. The SD may be information for interpolating an SST in a case of selecting one NSI out of multiple NSIs indicated by the SST.

The S-NSSAI may be information unique to each PLMN or may be standard information common to the PLMNs. The network may store one or more S-NSSAIs in the registration information of the UE as default S-NSSAIs. Note that, in a case that the S-NSSAI is a default S-NSSAI, and the UE does not transmit to a network a valid S-NSSAI in a registration request message, the network may provide an NS related to the UE.

The S-NSSAI transmitted and received between the UE and the NW may be represented by an S-NSSAI Information Element (IE). Furthermore, the S-NSSAI IE transmitted and received between the UE and the NW may include the S-NSSAI including the SST and/or the SD of the registered PLMN, and/or the SST and/or SD indicating the S-NSSAI of the HPLMN to which the S-NSSAI is mapped. One or multiple S-NSSAIs stored by the UE and/or the NW may include the SST and/or the SD, the S-NSSAI including the SST and/or the SD, and/or the SST and/or SD indicating the S-NSSAI of the HPLMN to which the S-NSSAI is mapped may be configured.

The Network Slice Selection Assistance Information (NS-SAI) is a set of S-NSSAIs. Each S-NSSAI included in the NSSAI is information for assisting the access network or the core network to select the NSI. The UE may store the NSSAI allowed by the network for each PLMN. The NSSAI may be information used for selecting the AMF. The UE may apply each NSSAI (allowed NSSAI, and/or configured NSSAI, and/or rejected NSSAI, and/or pending NSSAI, and/or the first NSSAI) to the PLMN and the EPLMN.

The mapped S-NSSAI is the S-NSSAI of the HPLMN mapped to the S-NSSAI of the registered PLMN in a roaming scenario. The UE may store one or multiple pieces of mapped S-NSSAI mapped to the S-NSSAI included in the configured NSSAI and the allowed NSSAI of each access type. Furthermore, the UE may store one or multiple pieces of mapped S-NSSAI of the S-NSSAI included in the first NSSAI, and/or the rejected NSSAI, and/or the pending NSSAI.

A Network Slice-Specific Authentication and Authorization (NSSAA) function is a function for implementing network slice specific authentication and authorization. The network slice-specific authentication and authorization allows the UE to be authenticated and authorized outside the core network, such as in a 3rd Party. The PLMN and the network apparatus having the NSSAA function can perform an NSSAA procedure for a certain S-NSSAI, based on registration information of the UE. Furthermore, the UE including the NSSAA function can manage, store, and transmit and/or receive the pending NSSAI and/or the third rejected NSSAI. NSSAA may be herein referred to as a network slice specific authentication and authorization procedure or an authentication and authorization procedure.

The S-NSSAI that requires NSSAA is an S-NSSAI that requires NSSAA managed by the core network and/or the core network apparatus. Furthermore, the S-NSSAI that requires the NSSAA may be an S-NSSAI other than the HPLMN in which the S-NSSAI managed by the core network and/or the core network apparatus and requiring the NSSAA is mapped S-NSSAI.

The core network and/or the core network apparatus may store the S-NSSAI that requires NSSAA by associating the S-NSSAI and information indicating whether or not NSSAA is required. In addition, the core network and/or the core network apparatus may store by associating the S-NSSAI that requires NSSAA and information indicating whether or not NSSAA has completed or information indicating NSSAA has completed and the state is an allowed or success state. The core network and/or the core network apparatus may manage the S-NSSAI that requires NSSAA as information unrelated to the access network.

Also, configured NSSAI is NSSAI fed and stored in the UE. The UE may store the configured NSSAI for each PLMN. The UE may store the configured NSSAI in association with the PLMN. Note that, in the present document, the configured NSSAI associated with the PLMN may be represented as configured NSSAI for the PLMN, or configured NSSAI of the PLMN, or configured NSSAI for the PLMN, or configured NSSAI associated with the PLMN. The UE may store the configured NSSAI that is valid for all PLMNs instead of being associated with the PLMN, and such configured NSSAI may be represented as a "default configured NSSAI".

The configured NSSAI may be associated with multiple PLMNs, and the multiple PLMNs may be EPLMNs.

The configured NSSAI may be information configured by the network (or PLMN). The S-NSSAI included in the configured NSSAI may be represented as configured S-NS-SAI. The configured S-NSSAI may include S-NSSAI and mapped S-NSSAI. Alternatively, the S-NSSAI of the PLMN may be represented as "configured S-NSSAI", and the S-NSSAI for which the configured S-NSSAI is mapped to the HPLMN may be represented as "mapped S-NSSAI for the configured NSSAI for the PLMN".

The configured NSSAI may be updated at any timing by the NW, and based on the update, the configured NSSAI updated may be transmitted from the NW to the UE.

Requested NSSAI is NSSAI provided to the network from the UE during the registration procedure. In the registration procedure, the S-NSSAI included in the requested NSSAI transmitted by the UE may be the S-NSSAI included in the allowed NSSAI or configured NSSAI stored by the UE. In the PDU session establishment procedure, the S-NSSAI included in the requested NSSAI transmitted by the UE may be the S-NSSAI included in the allowed NSSAI stored by the UE.

The requested NSSAI may be information indicating a network slice requested by the UE. The S-NSSAI included in the requested NSSAI may be represented as requested S-NSSAI. For example, the requested NSSAI is included and transmitted and/or received, in an NAS message transmitted from the UE to the network, such as a registration request message or a PDU session establishment request message, or in a Radio Resource Control (RRC) message including the Non-Access-Stratum (NAS) message. Here, in the roaming case, the requested NSSAI may include the S-NSSAI of VPLMN and the S-NSSAI of the mapped HPLMN. In other words, the S-NSSAI included in the requested NSSAI (requested S-NSSAI) may include S-NS-SAI and mapped S-NSSAI.

The allowed NSSAI is information indicating one or multiple network slices allowed for the UE. In other words, the allowed NSSAI is information identifying a network slice to which the UE is allowed by the network to connect. The allowed NSSAI may be stored by the UE and/or the NW, or transmitted from the NW to the UE.

The UE and/or the NW may store and manage the allowed NSSAI for each access (3GPP access or non-3GPP access) as UE information. The UE and/or NW may further manage the allowed NSSAI in association with the registration area.

Furthermore, the UE and/or the NW may store and manage the allowed NSSAI in association with the PLMN as information for the UE. The allowed NSSAI may be associated with multiple PLMNs, and the multiple PLMNs may be EPLMNs.

Note that, in the present document, the allowed NSSAI associated with the PLMN and the access type may be represented as allowed NSSAI for the PLMN and the access type or allowed NSSAI for the access type of the PLMN. The S-NSSAI included in the allowed NSSAI may be represented as allowed S-NSSAI. The allowed S-NSSAI may include S-NSSAI and mapped S-NSSAI.

Rejected NSSAI is information indicating one or multiple network slices not allowed for the UE. In other words, the rejected NSSAI is information identifying a network slice to which the UE is not allowed by the network to connect. The rejected NSSAI may be information including one or multiple combinations of S-NSSAI and a reject cause value.

Here, the S-NSSAI included in the rejected NSSAI may be associated with the PLMN ID or the SNPN ID. Note that the PLMN or SNPN indicated by the PLMN ID or SNPN ID associated with the S-NSSAI included in the rejected NSSAI may be the current PLMN or current SNPN. Alternatively, the PLMN ID or the SNPN ID associated with the S-NSSAI included in the rejected NSSAI may be information indicating the HPLMN or the HSNPN, regardless of the current PLMN or the SNPN.

Here, the reject cause value is information indicating why the network rejects the corresponding S-NSSAI. The UE and the network may each appropriately store and manage the rejected NSSAI based on the reject cause value associated with each S-NSSAI.

Furthermore, the rejected NSSAI may be included in the NAS message transmitted from the network to the UE, such as the registration accept message, the configuration update command, the registration reject message, or in the RRC message including the NAS message.

The S-NSSAI included in the rejected NSSAI may be represented as rejected S-NSSAI.

The rejected NSSAI may be any of the first to third rejected NSSAI, the pending NSSAI, and the first NSSAI, or a combination thereof. The S-NSSAI included in the rejected NSSAI may be represented as rejected S-NSSAI. The rejected S-NSSAI may include the S-NSSAI and mapped S-NSSAI.

The UE and/or NW may store and manage the rejected NSSAI in association with the PLMN as information for the UE. The rejected NSSAI may be associated with multiple PLMNs, and the multiple PLMNs may be EPLMNs.

Note that in the present document, the rejected NSSAI associated with the PLMN may be represented as rejected NSSAI for the PLMN or rejected NSSAI of the PLMN. The UE and/or the NW may further store, in association with the registration area, second rejected NSSAI and/or second rejected S-NSSAI. The UE and/or the NW may store the second rejected NSSAI and/or the second rejected S-NSSAI in association with the access type and/or the registration area.

Here, the first rejected NSSAI is a set of one or more of the S-NSSAIs included in the requested NSSAI by the UE, the one or more S-NSSAI being not available in the current PLMN or the current SNPN. The first rejected NSSAI may be rejected NSSAI for the current PLMN or SNPN in the 5GS, may be rejected S-NSSAI for the current PLMN or SNPN, or may be S-NSSAI included in the rejected NSSAI for the current PLMN or SNPN. The first rejected NSSAI may be rejected NSSAI stored by the UE or the NW, or may be rejected NSSAI transmitted from the NW to the UE.

In a case that the first rejected NSSAI is rejected NSSAI transmitted from the NW to the UE, the first rejected NSSAI may be information including one or multiple combinations of S-NSSAI and a cause value. The reject cause value in this case may be "S-NSSAI not available in the current PLMN or SNPN," or may be information indicating that the S-NS-SAI associated with the reject cause value is not available in the current PLMN or SNPN. The S-NSSAI included in the first rejected NSSAI may be represented as first rejected S-NSSAI.

The first rejected NSSAI may be applied to the entire registered PLMN or registered SNPN. The UE and/or the NW may treat the first rejected NSSAI and the S-NSSAI included in the first rejected NSSAI as information not dependent on the access type. In other words, the first rejected NSSAI may be information valid for 3GPP access and non-3GPP access.

In a case that the UE transitions to a deregistered state on both the 3GPP access and the non-3GPP access for the current PLMN, the UE may delete the first rejected NSSAI from storage. In other words, in a case that the UE transitions to the deregistered state for the current PLMN via one access, or successfully registers with a new PLMN via one certain access, or fails to register with a new PLMN via one access and transitions to the deregistered state, and further that the UE is not registered (deregistered state) via the other access, then the UE deletes the first rejected NSSAI. In other words, in a case that the UE transitions to the deregistered state for the current PLMN via one access, and is in a state in which the UE is registered (registered state) with the current PLMN via another access, then the UE need not delete the first rejected NSSAI.

The S-NSSAI included in the first rejected NSSAI or the first rejected NSSAI may be the S-NSSAI of the current PLMN. In other words, the S-NSSAI included in the first rejected NSSAI or the first rejected NSSAI may be stored and/or managed and/or transmitted and/or received in association only with the current PLMN ID or SNPN ID. Alternatively, the S-NSSAI included in the first rejected NSSAI may be the S-NSSAI of the HPLMN or the S-NSSAI of the current PLMN.

The second rejected NSSAI is a set of one or multiple pieces of the S-NSSAI included in the requested NSSAI by the UE, the one or multiple pieces of NSSAI being not available in the current registration area. The second rejected NSSAI may be rejected NSSAI for the current registration area in the 5GS. The second rejected NSSAI may be rejected NSSAI stored by the UE or the NW, or may be rejected NSSAI transmitted from the NW to the UE. In a case that the second rejected NSSAI is rejected NSSAI transmitted from the NW to the UE, the second rejected NSSAI may be information including one or multiple combinations of S-NSSAI and a cause value. The reject cause value in this case may be "S-NSSAI not available in the current registration area," or may be information indicating that the S-NSSAI associated with the reject cause value is not available in the current registration area. The S-NSSAI included in the second rejected NSSAI may be represented as second rejected S-NSSAI.

The second rejected NSSAI may be valid in the current registration area and may be applied to the current registration area. The UE and/or the NW may treat the second rejected NSSAI and the S-NSSAI included in the second rejected NSSAI as information for each access type. In other words, the second rejected NSSAI may be valid information for each of the 3GPP access or the non-3GPP access. In other words, once the UE transitions to the deregistered state for one access, the UE may delete, from storage, the second rejected NSSAI associated with the access.

The S-NSSAI included in the second rejected NSSAI or the second rejected NSSAI may be the S-NSSAI of the current PLMN. In other words, the S-NSSAI included in the second rejected NSSAI or the second rejected NSSAI may be stored and/or managed and/or transmitted and/or received in association only with the current PLMN ID or SNPN ID. Alternatively, the S-NSSAI included in the second rejected NSSAI may be the S-NSSAI of the HPLMN, or may be the S-NSSAI of the current PLMN.

The third rejected NSSAI is a set of one or multiple S-NSSAIs each requiring NSSAA and for which the NSSAA for the S-NSSAI has failed or has been revoked. The third rejected NSSAI may be NSSAI stored by the UE or the NW, or may be NSSAI transmitted and/or received between the NW and the UE. In a case that the third rejected NSSAI is transmitted from the NW to the UE, the third rejected NSSAI may be information including one or multiple combinations of S-NSSAI and a reject cause value. The reject cause value in this case may be "S-NSSAI not available due to the failed or revoked NSSAA," and may be information indicating that the NSSAA for the S-NSSAI associated with the reject cause value has failed or has been revoked. The S-NSSAI included in the third rejected NSSAI may be represented as third rejected S-NSSAI.

The third rejected NSSAI may be applied to the entire registered PLMN, or may be applied to the registered PLMN and/or the EPLMN, or may be applied to all PLMNs. Application of the third rejected NSSAI to all PLMNs may mean that the third rejected NSSAI is not associated with the PLMN, or that the third rejected NSSAI is associated with the HPLMN.

In other words, the UE and/or the NW may treat the third rejected NSSAI and the third rejected S-NSSAI as information not dependent on the access type. In other words, the third rejected NSSAI may be valid information for the 3GPP access and the non-3GPP access. The third rejected NSSAI may be NSSAI different from the rejected NSSAI. The third rejected NSSAI may be the first rejected NSSAI. The third rejected NSSAI may be rejected NSSAI for the failed or revoked NSSAA in the 5GS, may be rejected S-NSSAI for the failed or revoked NSSAA, or may be S-NSSAI included in the rejected NSSAI for the failed or revoked NSSAA.

The third rejected NSSAI is a rejected NSSAI allowing the UE to identify the slice that is rejected due to failure or revocation of NSSAA from the core network. Specifically, the UE does not initiate the registration request procedure for the S-NSSAI included in the third rejected NSSAI while storing the third rejected NSSAI. The third rejected NSSAI may be identification information including one or multiple S-NSSAIs received from the core network in association with the reject cause value indicating failure of NSSAA.

The third rejected NSSAI is information not dependent on the access type. Specifically, in a case of storing the third rejected NSSAI, the UE need not attempt to transmit, either on the 3GPP access or on the non-3GPP access, the registration request message including the S-NSSAI included in the third rejected NSSAI. Alternatively, the UE can transmit, based on a UE policy, the registration request message including the S-NSSAI included in the third rejected NSSAI.

Alternatively, the UE may delete the third rejected NSSAI based on the UE policy, and transition to a state in which the UE can transmit the registration request message including the S-NSSAI included in the third rejected NSSAI. In other words, in a case of transmitting, based on the UE policy, the registration request message including the S-NSSAI included in the third rejected NSSAI, the UE may delete the S-NSSAI from the third rejected NSSAI.

During roaming, the S-NSSAI included in the third rejected NSSAI may be the S-NSSAI of the HPLMN. In other words, the third rejected NSSAI received by the UE from the VPLMN may include S-NSSAI of the HPLMN.

Alternatively, even during roaming, the S-NSSAI included in the third rejected NSSAI may be the S-NSSAI of the current PLMN. In other words, the S-NSSAI included in the third rejected NSSAI may be stored and/or managed and/or transmitted and/or received in association only with the current PLMN ID or SNPN ID.

The first NSSAI is information including one or multiple pieces of S-NSSAI that have reached the maximum number of UEs for each network slice. The first NSSAI may be rejected NSSAI, allowed NSSAI, or pending NSSAI. The first NSSAI may be NSSAI stored by the UE and/or the NW, or NSSAI transmitted from the NW to the UE.

In a case that the first NSSAI is transmitted from the NW to the UE, the first NSSAI may be information including one or multiple pieces of information including at least one of the S-NSSAI and the mapped S-NSSAI, the reject cause value, the value of the back-off timer, and the valid range of the value of the back-off timer. The reject cause value in this case may be "S-NSSAI having reached the maximum number of UEs for each network slice" and may be information indicating that the maximum number of UEs has been reached that can be allowed for the S-NSSAI associated with the reject cause value.

Here, the reject cause value may be the reject cause value included in the rejected NSSAI, or may be flag information, or may be a 5GMM cause. Furthermore, in this case, the value of the back-off timer may be information indicating the duration for which the UE is prohibited from transmitting the MM message and the SM message using the corresponding S-NSSAI or the S-NSSAI related to the mapped S-NSSAI.

Furthermore, the information indicating the valid range of the value of the back-off timer may be information indicating whether the value of the back-off timer is applied to the current Public Land Mobile Network (PLMN), or is applied to all the PLMNs, or is valid in the current registration area.

The first NSSAI may be applied to the entire registered PLMNs, may be valid for all PLMNs, may be applied to all the PLMNs, may be valid within the registration area, may be applied to the registered PLMNs and EPLMNs, or may be applied to one or multiple PLMNs to which TAI included in a TA list (or registration area) belongs. Application of the first NSSAI to all the PLMNs may mean that the first NSSAI is not associated with the PLMN or the first NSSAI is associated with the HPLMN.

In a case that the first NSSAI is valid for the entire registered PLMNs or is applied to all the PLMNs or is applied to the registered PLMNs and/or EPLMNs, then the UE and/or the NW may treat the first NSSAI and the S-NSSAI included in the first NSSAI as information not dependent on the access type. In a case that the first NSSAI is valid within the registration area or is applied to one or multiple PLMNs to which the TAI included in the TA list (TAI list or registration area) belongs, the UE and/or the NW may treat the first NSSAI and the S-NSSAI included in the first NSSAI as information for each access type.

The first NSSAI may be allowed NSSAI, rejected NSSAI, pending NSSAI, or information different from these types of information.

In a case that the first NSSAI is NSSAI transmitted from the NW to the UE, the first NSSAI may be a set of a combination of the S-NSSAI and the mapped S-NSSAI.

During roaming, the S-NSSAI included in the third rejected NSSAI may be the S-NSSAI of the HPLMN. In other words, the third rejected NSSAI received by the UE from the VPLMN may include S-NSSAI of the HPLMN. In that case, the third rejected NSSAI may be stored in and/or managed by the UE and/or the NW in association with the HPLMN. Alternatively, the third rejected NSSAI need not be associated with the PLMN ID and may be stored in and/or managed by the UE and/or NW as information common to all PLMNs.

The pending NSSAI is a set of one or multiple S-NSSAIs indicating that the utilization by the UE is pending and/or is not enabled. The pending NSSAI may be a set of S-NSSAIs for which the network requires network slice specific authentication and for which network slice specific authentication is not complete. The pending NSSAI may be pending NSSAI in the 5GS. The pending NSSAI may be NSSAI stored by the UE or the NW, or may be NSSAI transmitted and/or received between the NW and the UE.

In a case that the pending NSSAI is NSSAI transmitted from the NW to the UE, the pending NSSAI may be information including one or multiple combinations of S-NSSAI and a reject cause value. The reject cause value in this case may be "S-NSSAI is pending for the NSSAA (NSSAA is pending for the S-NSSAI)," or may be information indicating that the UE is prohibited from using the S-NSSAI associated with the reject cause value or the use by the UE is pending until the NSSAA for the S-NSSAI is complete.

In a case that the pending NSSAI is NSSAI transmitted from the NW to the UE, the pending NSSAI may be a set of the combination of the S-NSSAI and the mapped S-NSSAI.

The pending NSSAI may be applied to the entire registered PLMNs, or may be applied to the registered PLMNs and one or multiple EPLMNs of the registered PLMNs, or may be applied to all the PLMNs. Application of the pending NSSAI to all the PLMNs may mean that the pending NSSAI is not associated with the PLMN, or that the pending NSSAI is associated with the HPLMN.

The UE and/or the NW may treat the S-NSSAI included in the pending NSSAI as information not dependent on the access type. In other words, the pending NSSAI may be information valid for the 3GPP access and the non-3GPP access. The pending NSSAI may be NSSAI different from the rejected NSSAI. The pending NSSAI may be first rejected NSSAI.

The pending NSSAI is NSSAI including one or multiple pieces of S-NSSAI identifying slices for which the procedure has been made pending by the UE. Specifically, while storing the pending NSSAI, the UE does not initiate the registration request procedure for the S-NSSAI included in the pending NSSAI. In other words, the UE does not use the S-NSSAI included in the pending NSSAI during the registration procedure until NSSAA for the S-NSSAI included in the pending NSSAI completes. The pending NSSAI is information not dependent on the access type. Specifically, in a case of storing the pending NSSAI, the UE attempts to transmit, neither on the 3GPP access nor on the non-3GPP access, the registration request message including the S-NSSAI included in the pending NSSAI.

During roaming (roaming scenario), the S-NSSAI included in the pending NSSAI may be the S-NSSAI of the HPLMN. In other words, the pending NSSAI received by the UE from the VPLMN may include S-NSSAI of the HPLMN.

A tracking area is a single or multiple ranges that can be expressed using the location information of the UE_A 10 managed by the core network. The tracking area may include multiple cells. In addition, the tracking area may be an area in which a control message such as paging is broadcast, or may be an area in which the UE_A 10 can move without performing a handover procedure. In addition, the tracking area may be a routing area, or may be a location area. The tracking area may be any area as long as the area is similar to these. The tracking area may be hereinafter a Tracking Area (TA). The tracking area may be identified by a Tracking Area Identity (TAI) including a Tracking area code (TAC) and the PLMN.

The Registration area is a set of one or multiple TAs allocated to the UE by the AMF. Note that while moving within one or multiple TAs included in the registration area, the UE_A 10 may be able to move without transmitting and/or receiving a signal for updating the tracking area. In other words, the registration area may be an information group indicating an area in which the UE_A 10 can move without performing the tracking area update procedure. The registration area may be identified by a TAI list configured by one or multiple TAIs.

The TAI included in the TAI list may belong to one PLMN, or may belong to multiple PLMNs. In a case that multiple TAIs included in the TAI list belong to different PLMNs, the PLMNs may be EPLMNs.

A UE ID is information for identifying the UE. Specifically, the UE ID may be a SUbscription Concealed Identifier (SUCI), or a Subscription Permanent Identifier (SUPI), or a Globally Unique Temporary Identifier (GUTI), or an International Mobile Subscriber Identity (IMEI), or an IMEI Software Version (IMEISV), or a Temporary Mobile Subscriber Identity (TMSI), for example. Alternatively, the UE ID may be other information configured by an application or within the network. Moreover, the UE ID may be information for identifying the user.

Management of the maximum number of UEs connected to the slice is to manage the maximum number of UEs that can be registered with the network slice or the S-NSSAI at the same time. Here, the UE registered with the network slice or the S-NSSAI may refer to the inclusion of the S-NSSAI indicating a network slice, in the allowed NSSAI for storage. An apparatus in a network, the apparatus supporting the function to manage the maximum number of UEs connected to the slice can store, for each piece of S-NSSAI, information as to whether the management of the maximum number of UEs connected to the slice is required and can further check, during the registration procedure, whether the number of registered UEs has reached a certain specified number corresponding to the maximum number. Furthermore, each apparatus that supports the function to manage the maximum number of UEs connected to the slice may be able to store the first NSSAI. In this specification, the maximum number of UEs connected to the slice may be expressed as the maximum number of UEs connected per slice, or the maximum number of UEs that can be registered with the network slice or S-NSSAI, or the maximum number of UEs, or the specified number.

The back-off timer is a timer for prohibiting the transmission of the MM message performed by the UE and/or the initiation of the procedure using the SM message. The back-off timer is managed and run by the UE. The back-off timer may be associated with the S-NSSAI. For the UE, while the back-off timer associated with the S-NSSAI is valid, transmission of the MM message and/or the SM message using the S-NSSAI may be prohibited, or regulated, or limited. These regulations may be regulations based on congestion control in the 5GS, or may be regulations including regulations based on the congestion control in 5GS.

The back-off timer may be a timer that is started and/or stopped in units of S-NSSAI and/or PLMNs.

Specifically, the back-off timer may be associated with the S-NSSAI, and may be a timer for prohibiting transmission of the MM message and/or SM message using specific S-NSSAI. In other words, the UE may be configured not to transmit the MM message and/or SM message using the specific S-NSSAI during the counting of the timer.

Furthermore, the UE may be configured such that, during the counting of the timer, in a new PLMN, the transmission of the MM message and/or SM message prohibited in the original PLMN is allowed, based on a specific condition described below. Note that the expression of allowance of transmission of the MM message and/or the SM message prohibited in the original PLMN may mean allowance of transmission of the MM message and/or the SM message using the same S-NSSAI as that associated with the back-off timer, and/or the S-NSSAI associated with the same S-NS-SAI, and/or the S-NSSAI associated with the mapped S-NS-SAI of the same S-NSSAI.

Furthermore, the back-off timer may be a timer for prohibiting transmission of the MM message using specific NSSAI. In other words, the UE may be configured not to transmit the MM message using the specific NSSAI and/or the NSSAI including the specific S-NSSAI during the counting of the timer.

Furthermore, the UE may be configured such that, during the counting of the timer, in a new PLMN, the UE is allowed for transmission of the MM message prohibited in the original PLMN, based on the specific condition described below. Note that the expression of allowance of transmission of the MM message prohibited in the original PLMN may mean allowance of transmission of the MM message using the same NSSAI as that associated with the back-off timer and/or the NSSAI including the same S-NSSAI as that associated with the back-off timer. Furthermore, the expression of allowance of transmission of the MM message prohibited in the original PLMN may mean allowance of transmission of the MM message using the NSSAI including the S-NSSAI associated with the S-NSSAI associated with the back-off timer and/or the NSSAI including the S-NSSAI associated with the mapped S-NSSAI of the S-NSSAI associated with the back-off timer.

The back-off timer may be a timer associated with no NSSAI and used for prohibiting transmission of the MM message using the no NSSAI. In other words, the UE_A 10 may be configured not to transmit the MM message using the no NSSAI during the counting of the timer. Furthermore, the UE_A 10 may be configured such that, during the counting of the timer, in a new PLMN, the UE_A 10 is allowed for transmission of the MM message prohibited in the original PLMN, based on the specific condition described below. Note that the expression of allowance of transmission of the MM message prohibited in the original PLMN may mean allowance of the MM message using the no NSSAI.

Furthermore, the back-off timer may be a timer of 5GMM, and/or a timer of EPS mobility management (EMM). Furthermore, the back-off timer may be a timer T3448, or may be a timer equivalent to the timer T3448. In other words, the back-off timer may be the same as or similar to a timer for regulating communication of user data via the control plane.

Now, description will be given of the identification information transmitted and/or received and stored and managed by apparatuses in the present embodiment.

First identification information is information indicating a network slice requested by the UE. The first identification information may be information including one or more pieces of S-NSSAI associated with the network slice requested by the UE. Note that the network slice requested by the UE may be a network slice that is to be used by the UE, or may be a network slice for which the UE requests the network to allow usage by the UE. The S-NSSAI included in the first identification information may be S-NSSAI included in the configured NSSAI associated with the current PLMN, or may be S-NSSAI included in the allowed NSSAI associated with the current PLMN.

In other words, the first identification information may be S-NSSAI included in the configured NSSAI associated with one or more current PLMNs, or S-NSSAI included in the allowed NSSAI associated with one or more current PLMNs, or a combination of the two configurations described above. More specifically, the allowed NSSAI associated with the current PLMN may be allowed NSSAI associated with the current PLMN and the current access type. Furthermore, the first identification information may be requested NSSAI in the 5GS.

Note that the S-NSSAI included in the first identification information may be S-NSSAI that is not included in the rejected NSSAI stored by the UE and associated with the current PLMN, and/or may be S-NSSAI that is not included in the pending NSSAI stored by the UE and associated with the current PLMN, or may be S-NSSAI that is not included in the first NSSAI stored by the UE and associated with the current PLMN.

During roaming, in a case that the S-NSSAI included in the pending NSSAI, and/or the rejected NSSAI, and/or the first NSSAI is S-NSSAI of the HPLMN, the S-NSSAI included in the first identification information may be the S-NSSAI of the current PLMN in which the S-NSSAI included in the pending NSSAI stored in the UE, and/or the rejected NSSAI, and/or the first NSSAI is not the mapped S-NSSAI.

Furthermore, the S-NSSAI included in the first identification information may be the S-NSSAI for which the back-off timer associated with the S-NSSAI for the UE or with the mapped S-NSSAI of the S-NSSAI for the UE is not running in the UE.

Second identification information may be information indicating that the UE supports a function to manage the maximum number of UEs connected to the slice. Alternatively, the second identification information may be information indicating whether the UE supports the function to manage the maximum number of UEs connected to the slice. The second identification information may be 5GMM capability information. The second identification information may be information indicating that the UE can perform storage.

10th identification information may be information indicating the S-NSSAI having reached the maximum number of UEs that can be registered with the network slice or the S-NSSAI. The 10th identification information may be included in the allowed NSSAI transmitted from the network, may be included in the rejected NSSAI transmitted from the network, may be included in the pending NSSAI transmitted from the network, or may be transmitted from the network as information different from the above-described types of information.

Furthermore, the 10th identification information may be NSSAI. Furthermore, the 10th identification information may be allowed NSSAI, or may be rejected NSSAI. Furthermore, the 10th identification information may be pending NSSAI, or may be NSSAI different from the above-described types of NSSAI.

The 10th identification information may be the first NSSAI or the S-NSSAI included in the first NSSAI. The 10th identification information may include at least one of 11th to 15th identification information. Specifically, the 10th identification information may include at least one or more pieces of information of the S-NSSAI having reached the maximum number of UEs that can be registered with the network slice or the S-NSSAI, the mapped S-NSSAI of the S-NSSAI, the cause value indicating that the maximum number of UEs that can be registered with the network slice or the S-NSSAI has been reached, the value of the back-off timer indicating the period during which the UE is prohibited from transmitting the registration request message using the S-NSSAI, and information indicating the valid range of the back-off timer.

The 10th identification information may further include at least one or more pieces of information of the cause value indicating that the maximum number of UEs that can be registered with the network slice has been reached, the value of the back-off timer indicating the period during which transmission of the registration request message using the no NSSAI is prohibited, and the information indicating the valid range of the back-off timer. Note that the cause value indicating that the maximum number of UEs that can be registered with the network slice has been reached, the value of the back-off timer indicating the period during which transmission of the registration request message using the no NSSAI is prohibited, and the information indicating the valid range of the back-off timer need not be included in the 10th identification information and may be separately transmitted and/or received. Here, in a case that the 10th identification information is included in the rejected NSSAI, the cause value included in the 10th identification information may be the reject cause value.

The 11th identification information may be information and/or a cause value indicated to the UE by the network and indicating that the maximum number of UEs that can be registered with the network slice or the S-NSSAI has been reached. The 11th identification information may be information and/or a cause value indicating that the use of S-NSSAI is rejected or restricted because the maximum number of UEs connected per slice has been reached. In other words, the 11th identification information is the information and cause value indicating that the use of S-NSSAI is rejected or restricted for the UE by the network because the maximum number of UEs connected per slice has been reached.

The 11th identification information may be included in the 10th identification information, and may be associated with the S-NSSAI indicated in the 14th identification information included in the same 10th identification information, and/or the mapped S-NSSAI indicated in the 15th identification information. The 11th identification information may be associated with the different pieces of identification information included in the same 10th identification information. In a case that the 11th identification information is included in the rejected NSSAI, the 11th identification information may be a reject cause value. The 11th identification information may be flag information.

Furthermore, the 11th identification information may be a cause value indicating that the connection to the slice is limited and/or is not allowed. Furthermore, the 11th identification information may be a cause value indicating that registration with the slice is limited and/or is not allowed.

Furthermore, the 11th identification information may be a 5G Mobility Management (5GMM) cause. Furthermore, the 11th identification information may be a 22nd 5GMM cause. Here, the 22nd 5GMM cause may be a cause value indicating a congestion. Furthermore, the 22nd 5GMM cause may be information transmitted to the UE due to congestion in the network.

Furthermore, the 11th identification information may be a 5GMM cause other than the 22nd 5GMM cause. For example, the 11th identification information may be information transmitted to the UE due to congestion of network slices. Furthermore, the 11th identification information may be information transmitted to the UE due to the lack of resources in the network slice. Furthermore, the 11th identification information may be a cause value indicating a failure to provide a requested service due to insufficient resources for the specific slice.

The 12th identification information may be the value of the back-off timer. Specifically, the 12th identification information may be information indicating the period in which the network prohibits the UE from transmitting the MM message using the S-NSSAI indicated in the 14th identification information and/or the 15th identification information included in the same 10 identification information, or transmitting the SM message other than a PDU connection release request message. In other words, the 12th identification information may be information indicating the period in which the network prohibits the UE from transmitting the registration request message using the S-NSSAI indicated in the 14th identification information and/or the 15th identification information included in the same 10 identification information.

The 12th identification information may be included in the 10th identification information, and may be associated with the S-NSSAI indicated in the 14th identification information included in the same 10th identification information, and/or with the mapped S-NSSAI indicated in the 15th identification information. The 12th identification information may be associated with the different pieces of identification information included in the same 10th identification information.

The 13th identification information is information indicating the valid range of the back-off timer. Specifically, the 13th identification information may be information indicating the valid range of the back-off timer counted by the UE, with use of the value of the corresponding back-off timer. More specifically, the 13th identification information may be information indicating that the corresponding back-off timer is applied to the current PLMN (the PLMN requested by the UE or the RPLMN) or to all the PLMNs. Furthermore, alternatively, the 13th identification information may be information indicating that the back-off timer is applied to the current registration area.

Furthermore, the 13th identification information may be information indicating the range of a regulation, or may be information indicating the range in which the regulation is applied. Note that the regulation may be based on congestion control. More specifically, the regulation may limit the transmission of the MM message performed by the UE. Furthermore, the regulation may be implemented by the back-off timer.

The 13th identification information may be included in the 10th identification information, and in that case, the value of the corresponding back-off timer may be a value indicated by the 12th identification information included in the same 10th identification information. Furthermore, in that case, the 13th identification information may be associated with the different pieces of identification information included in the same 10th identification information.

The 14th identification information is information indicating the S-NSSAI having reached the maximum number of UEs that can be registered for each piece of the S-NSSAI. The 14th identification information may be the S-NSSAI included in the 10th identification information, and may be associated with the mapped S-NSSAI indicated in the 15th identification information included in the same 10th identification information. The 14th identification information may be associated with the different pieces of identification information included in the same 10th identification information. Furthermore, the 14th identification information may be S-NSSAI.

The 15th identification information is the S-NSSAI of the HPLMN associated with the corresponding S-NSSAI. Specifically, in a case that the current PLMN (or the PLMN requested by the UE, or the RPLMN, or the PLMN selected by the UE) is not the HPLMN, the 15th identification information may be information indicating the S-NSSAI of the HPLMN mapped to the S-NSSAI of the current PLMN. The 15th identification information may be mapped S-NSSAI.

The 15th identification information may be the mapped S-NSSAI included in the 10th identification information, and may be associated with the S-NSSAI indicated in the 14th identification information included in the same 10th identification information, and in that case, the 15th identification information may be the mapped S-NSSAI of the S-NSSAI indicated in the 14th identification information. The 15th identification information may be associated with the different pieces of identification information included in the same 10th identification information. Furthermore, the 15th identification information may be the mapped S-NSSAI of the S-NSSAI indicated by the 14th identification information.

3.1. Description of Procedures Used in Each Embodiment

Next, procedures used in each embodiment will be described. Note that the procedures used in each embodiment include a Registration procedure, a Network Slice-Specific Authentication and Authorization procedure, a UE configuration update procedure (Generic UE configuration update procedure), and a Network-initiated de-registration procedure included. Each procedure will be described below.

Note that, in each embodiment, a case that each of the combinations including the HSS and the UDM, the PCF and the PCRF, the SMF and the PGW-C, and the UPF and the PGW-U is configured to form a single apparatus (that is, the same physical hardware, or the same logical hardware, or the same software) as illustrated in FIG. 2 will be described as an example. However, the details described in the present embodiment can also be applied to a case that each of the combinations is configured to form different apparatuses (that is, different pieces of physical hardware, or different pieces of logical hardware, or different pieces of software). For example, data may be directly transmitted and/or received between these apparatuses, data may be transmitted and/or received over the N26 interface between the AMF and the MME, or data may be transmitted and/or received via the UE.

3.2. Registration Procedure

First, the Registration procedure will be described with reference to FIG. 6. Hereinafter, the present procedure will refer to the registration procedure. The registration procedure is a procedure for registration with the access network_B, and/or the core network_B, and/or the DN as initiated by the UE. In a case that the UE is in a state of not being registered with the network, for example, the UE can perform the present procedure at any timing such as the timing at which the UE is turned on. In other words, the UE can initiate the present procedure at any timing in a case that the UE is in the deregistered state (5GMM-DEREGISTERED state). Each apparatus (in particular, the UE and the AMF) can transition to the registered state (5GMM-REGISTERED state), based on completion of the registration procedure. Note that each registered state may be managed by each apparatus for each access. Specifically, each apparatus may independently manage the registration state (registered state or deregistered state) for the 3GPP access and the registration state for the non-3GPP access.

In addition, the registration procedure may be a procedure for updating position registration information of the UE in the network, and/or periodically giving a notification of the state of the UE from the UE to the network, and/or updating a specific parameter related to the UE in the network.

In a case that the UE moves across tracking areas (TAs), the UE may initiate the registration procedure. In other words, in a case that the UE moves to a TA that is different from the TA indicated in the held TA list (TAI list or registration area), the UE may initiate the registration procedure. Furthermore, the UE may initiate the present procedure in a case that the running back-off timer or any other timer expires. In addition, the UE may initiate the registration procedure in a case that a context of each apparatus needs to be updated due to disconnection and deactivation of a PDU session. In addition, in a case that there is a change in capability information and/or a preference, related to PDU session establishment, of the UE, the UE may initiate the registration procedure. In addition, the UE may periodically initiate the registration procedure. Furthermore, the UE may initiate the registration procedure based on completion of the UE configuration update procedure, or based on completion of the registration procedure, or based on completion of the PDU session establishment procedure, or based on completion of the PDU session management procedure, or based on information received from the network in each procedure, or based on expiry or stoppage of the back-off timer. Note that these are not restrictive, and the UE can perform the registration procedure at any timing.

Note that the above described procedure for the UE to transition from a state of not being registered with the network to a state of being registered with the network may be considered to be an initial registration procedure or a registration procedure for initial registration, and the registration procedure performed in a state in which the UE is registered with the network may be considered to be a registration procedure for mobility and periodic registration update or a mobility and periodic registration procedure.

Figure 6:
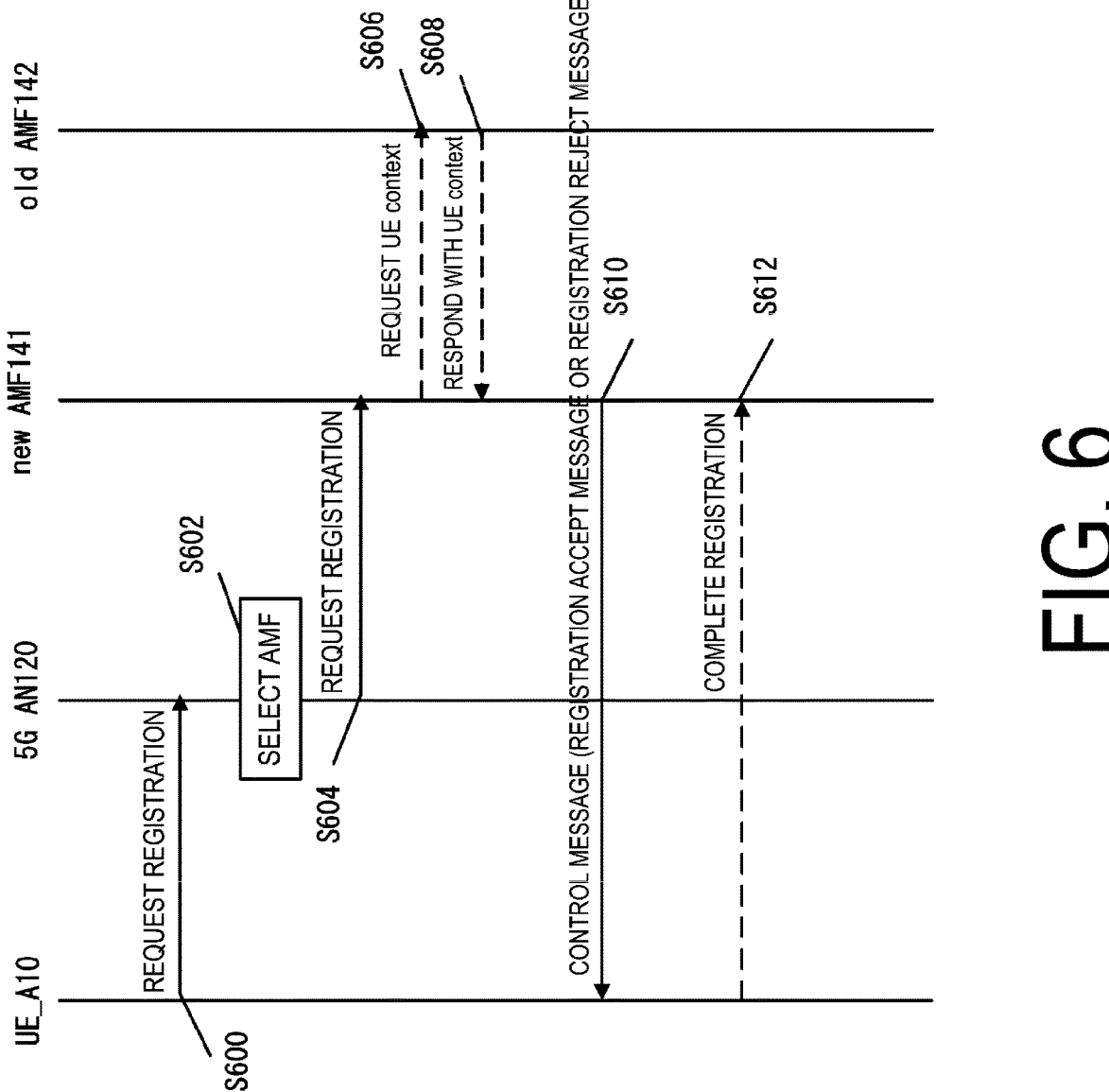
FIG. 6 is a diagram illustrating a registration procedure.

The new AMF 141 in FIG. 6 indicates the AMF with which the UE_A 10 is registered according to the present procedure, and the old AMF 142 in FIG. 6 means the AMF with which the UE has been registered according to a procedure before the present procedure. In a case that the AMF is not changed within the present procedure, no interface or procedure occurs between the old AMF 142 and the new AMF 141, and the new AMF 141 may be the same apparatus as the old AMF 142. In the present embodiment, the description of the AMF may mean the new AMF 141, the old AMF 142, or both. Note that the new AMF 141 and the old AMF 142 may be an AMF 140.

First, the UE_A 10 initiates the registration procedure by transmitting a Registration request message to the new AMF 141 (S600), (S602), and (S604). Specifically, the UE transmits an RRC message including the registration request message to the 5G AN 120 (or the gNB) (S600). Moreover, the registration request message is an NAS message transmitted and/or received over the N1 interface. The RRC message may be a control message transmitted and/or received between the UE and the 5G AN 120 (or the gNB). The NAS message is processed in the NAS layer, and the RRC message is processed in the RRC layer. Note that the NAS layer is a layer higher than the RRC layer.

Here, the UE_A 10 can include and transmit, in the registration request message and/or the RRC message, one or more pieces of identification information of at least the first and the second identification information. Furthermore, the UE_A 10 may include and transmit, in the registration request message and/or the RRC message, identification information indicating the type of the present procedure. Here, the identification information indicating the type of the present procedure may be a 5GS registration type IE, and may be information indicating that the present procedure is the registration procedure executed for an initial registration, or for update of registration information associated with movement, or for periodic update of registration information, or for emergency registration.

The UE_A 10 may include UE capability information in the registration request message to notify the network of the functions supported by the UE_A 10. Here, the UE capability information may be 5GMM capability in the 5GS.

The UE_A 10 may include and transmit these pieces of identification information in control messages different from the above-described ones, for example, control messages from layers lower than the RRC layer (for example, the MAC layer, RLC layer, and PDCP layer). Note that, by transmitting these pieces of identification information, the UE_A 10 may indicate that the UE_A 10 supports the functions, or may indicate a request from the UE_A 10, or may indicate both. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

Note that the UE_A 10 may select or determine whether to transmit the first and the second identification information to the network based on the UE capability information, and/or the UE policy, and/or the UE state, and/or the user registration information, and/or a context stored in the UE, and/or the like.

The UE_A 10 may transmit the second identification information in a case that the UE includes a function to manage the maximum number of UEs connected to the slice, or requests at least one piece of S-NSSAI that requires to be managed for management of the maximum number of UEs connected to the slice. By transmitting the second identification information, the UE_A 10 may notify the network that the UE includes a function to store the first NSSAI.

Furthermore, in a case that the UE_A 10 includes the NSSAA function, or requests at least one S-NSSAI identifying a slice that requires NSSAA, the UE may include and transmit, in the registration request message, the capability information indicating the support of the NSSAA function. By transmitting the capability information indicating the support of the NSSAA function, the UE_A 10 may request the network to treat the UE as a UE with the NSSAA function, and to perform, in the procedure related to the UE, an authentication and authorization procedure based on the NSSAA function.

In a case that the UE stores an "allowed NSSAI associated with the PLMN requested by the UE and the access type requested by the UE," and/or the UE stores the "configured NSSAI for the requested PLMN," and/or the UE stores the "default configured NSSAI," the UE may include the first identification information in the registration request message, and may transmit the registration request message to the requesting PLMN.

Alternatively, in a case that the UE stores the "allowed NSSAI associated with a PLMN that is different from the PLMN requested by the UE and with the access type requested by the UE," and the allowed NSSAI or the TAI included in the registration area with which the S-NSSAI included in the allowed NSSAI is associated belongs to the PLMN requested by the UE, then the UE may include the first identification information in the registration request message, and transmit the registration request message to the requesting PLMN.

The UE_A 10 may determine the information included in the first identification information based on one or multiple NSSAIs stored by the UE. The one or multiple NSSAIs stored by the UE may be, for example, allowed NSSAI associated with the requested PLMN and the requested access type, and/or configured NSSAI associated with the requested PLMN, and/or default configured NSSAI, and/or rejected NSSAI associated with the requested PLMN. Additionally/alternatively, the one or multiple NSSAIs stored by the UE may be the pending NSSAI and/or the first NSSAI, or the rejected NSSAI not associated with the requested PLMN.

Additionally or alternatively, the one or multiple NSSAIs stored by the UE may be allowed NSSAI associated with a PLMN other than the PLMN requested by the UE and with the access type requested by the UE and/or the access type, and second rejected NSSAI associated with a PLMN other than the requested PLMN and with the current registration area. Furthermore, the UE_A 10 may store the mapped S-NSSAI of the S-NSSAI included in each NSSAI stored by the UE.

The UE may select one or multiple pieces of S-NSSAI from the stored allowed NSSAI and/or configured NSSAI, and include and transmit the S-NSSAI in the first identification information.

Specifically, in a case of storing allowed NSSAI associated with the requested PLMN and the requested access type, the UE_A 10 may include and transmit, in the first identification information, the allowed NSSAI or one or multiple S-NSSAIs included in the allowed NSSAI.

Additionally or alternatively, in a case of storing configured NSSAI associated with the PLMN requested by the UE_A 10, the UE_A 10 may include and transmit, in the first identification information, the configured NSSAI or one or multiple S-NSSAIs included in the configured NSSAI.

Additionally or alternatively, in a case that the UE_A 10 stores "allowed NSSAI associated with the PLMN other than the requested PLMN and the requested access type," and further the TAI included in the registration area (TAI list) with which the allowed NSSAI or the S-NSSAI included in the allowed NSSAI is associated is associated with the requested PLMN, the UE_A 10 may include and transmit, in the first identification information, the allowed NSSAI or one or multiple S-NSSAIs included in the allowed NSSAI.

In other words, the UE_A 10 may include, in the first identification information, "S-NSSAI included in the allowed NSSAI associated with the PLMN other than the requested PLMN and the registration area" or the "S-NSSAI associated with the registration area and included in the allowed NSSAI associated with the PLMN other than the requested PLMN" stored by the UE, and at least one TAI included in the registration area may belong to the first PLMN.

The first identification information may include one or more S-NSSAIs described above. However, the UE_A 10 may perform control such that the one or multiple S-NSSAIs included in the first identification information do not overlap.

In a case of storing the rejected NSSAI for the PLMN requested by the UE_A 10, the UE_A 10 may transmit the first identification information in which the S-NSSAI included in the rejected NSSAI is not included.

Specifically, in a case of storing "first rejected NSSAI associated with the requested PLMN," the UE_A 10 may transmit the first identification information in which the S-NSSAI included in the first rejected NSSAI is not included. In other words, the UE_A 10 may perform control such that one or multiple S-NSSAIs included in the first identification information are each no longer the S-NSSAI included in the "first rejected NSSAI associated with the requested PLMN" stored by the UE.

Furthermore, in a case of storing at least one "second rejected NSSAI associated with the requested PLMN or EPLMN and with the current registration area," the UE_A 10 may transmit the first identification information in which the S-NSSAI included in the second rejected NSSAI is not included. In other words, the UE_A 10 may perform control such that one or multiple S-NSSAIs included in the first identification information are each no longer the S-NSSAI included in the "second rejected NSSAI associated with the requested PLMN or EPLMN and with the current registration area" stored by the UE_A 10.

In a case that information indicating the current registration area stored by the UE_A 10 includes a TAI belonging to one or multiple PLMNs that are different from the requested PLMN, the different one or multiple PLMNs are EPLMNs of the requested PLMN, and the UE_A 10 may perform control such that the one or multiple S-NSSAIs included in the first identification information are each no longer the S-NSSAI included in the "second rejected NSSAI associated with one of the different one or multiple PLMNs and with the current registration area" stored by the UE_A 10.

In other words, in a case that information indicating the current registration area stored by the UE_A 10 includes a TAI belonging to one or multiple PLMNs that are different from the requested PLMN, the UE_A 10 need not include, in the first identification information, the "S-NSSAI included in the second rejected NSSAI associated with one PLMN of the different one or multiple PLMNs and with the current registration area."

Furthermore, in a case of storing "third rejected NSSAI associated with the requested PLMN,"

the UE_A 10 may transmit the first identification information without including, in the first identification information, the S-NSSAI included in the third rejected NSSAI. In other words, the UE_A 10 may perform control such that the one or more S-NSSAIs included in the first identification information are each no longer the S-NSSAI included in the "third rejected NSSAI associated with the requested PLMN" stored by the UE_A 10.

Furthermore, in a case of storing at least one "third rejected NSSAI associated with the EPLMN of the requested PLMN," the UE_A 10 may transmit the first identification information in which the S-NSSAI included in the third rejected NSSAI is not included. In other words, the UE_A 10 may perform control such that the one or more S-NSSAIs included in the first identification information are each no longer the S-NSSAI included in the "third rejected NSSAI associated with the EPLMN of the requested PLMN" stored by the UE_A 10.

Furthermore, in a case of storing a "third rejected NSSAI that is valid for all of the PLMNs," the UE_A 10 may transmit the S-NSSAI included in the third rejected NSSAI, or the S-NSSAI to which the S-NSSAI described above is mapped, or the S-NSSAI associated with the S-NSSAI described above, or the mapped S-NSSAI of the S-NSSAI described above to not be included in the first identification information. In other words, the UE_A 10 may perform control such that the one or more S-NSSAIs included in the first identification information are each no longer the S-NSSAI included in the "third rejected NSSAI valid for all the PLMNs" stored by the UE_A 10, or the S-NSSAI to which the S-NSSAI described above is mapped, or the S-NSSAI associated with the S-NSSAI described above, or the mapped S-NSSAI of the S-NSSAI described above. Note that the "third rejected NSSAI that is valid for all the PLMNs" may mean third rejected NSSAI that is not associated with the PLMN, or may mean third rejected NSSAI associated with the HPLMN.

Furthermore, in a case of storing the "pending NSSAI associated with the requested PLMN," the UE may transmit the first identification information in which the S-NSSAI included in the pending NSSAI is not included. In other words, the UE may perform control such that one or more S-NSSAI included in the first identification information are each no longer the S-NSSAI included in the "pending associated with the requested PLMN" stored by the UE.

Furthermore, in a case of storing at least one "pending NSSAI associated with the EPLMN of the requested PLMN," the UE may transmit the first identification information in which the S-NSSAI included in the pending NSSAI is not included. In other words, the UE may perform control such that one or multiple S-NSSAIs included in the first identification information are each no longer the S-NS-SAI included in the "pending NSSAI associated with the EPLMN of the requested PLMN."

Furthermore, in a case of storing the "pending NSSAI that is valid for all the PLMNs," the UE may transmit the S-NSSAI included in the pending NSSAI, or the S-NSSAI to which the S-NSSAI described above is mapped, or the S-NSSAI associated with the S-NSSAI described above, or the mapped S-NSSAI of the S-NSSAI described above to not be included in the first identification information. In other words, the UE may perform control such that the one or more S-NSSAIs included in the first identification information are each no longer the S-NSSAI included in the "pending NSSAI valid for all the PLMNs", or the S-NSSAI to which the S-NSSAI described above is mapped, or the S-NSSAI associated with the S-NSSAI described above, or the mapped S-NSSAI of the S-NSSAI described above. Note that the "pending NSSAI that is valid for all the PLMNs" may mean pending NSSAI that is not associated with the PLMN, or may mean pending NSSAI associated with the HPLMN.

Furthermore, in a case that the back-off timer associated with certain S-NSSAI is valid, in other words, the back-off timer is running, or until the back-off timer is stopped, the UE_A 10 may transmit the first identification information without including, in the first identification information, the S-NSSAI or S-NSSAI related to the S-NSSAI. Specifically, in a case that the S-NSSAI with which the back-off timer is associated is the S-NSSAI associated with the requested PLMN or the S-NSSAI included in the NSSAI associated with the requested PLMN, the UE may transmit the first identification information in which the S-NSSAI of the UE_A 10 is not included, during counting of the back-off timer or until the back-off timer expires or stops.

Alternatively, in a case that the S-NSSAI with which the back-off timer is associated is associated with the HPLMN, the UE_A 10 may transmit the first identification information in which the S-NSSAI of the requested PLMN to which the S-NSSAI of the UE_A 10 is mapped is not included. Note that the S-NSSAI associated with the back-off timer being associated with the HPLMN may mean that the back-off timer is valid for all the PLMNs, or may mean that the back-off timer is not associated with the PLMN.

Furthermore, in a case of storing the "first NSSAI associated with the requested PLMN," the UE may transmit the first identification information in which the S-NSSAI included in the first NSSAI of the UE is not included. In other words, the UE may perform control such that one or multiple S-NSSAIs included in the first identification information are no longer the S-NSSAI included in the "first NSSAI associated with the requested PLMN" stored by the UE.

Furthermore, in a case of storing at least one "first NSSAI associated with EPLMN of the requested PLMN," the UE may transmit the first identification information in which the S-NSSAI included in the first NSSAI of the UE is not included. In other words, the UE may perform control such that one or multiple S-NSSAIs included in the first identification information are no longer the S-NSSAI included in the "first NSSAI associated with the EPLMN of the requested PLMN".

Furthermore, in a case of storing the "first NSSAI that is valid for all the PLMNs," the UE may transmit the S-NSSAI included in the first NSSAI of the UE, or the S-NSSAI to which the S-NSSAI described above is mapped to not be included in the first identification information. In other words, the UE may perform control such that the one or more S-NSSAIs included in the first identification information are each no longer the S-NSSAI included in the "first NSSAI valid for all the PLMNs" or the S-NSSAI to which the S-NSSAI described above is mapped. Note that the "first NSSAI that is valid for all the PLMNs" may mean first NSSAI that is not associated with the PLMN, or may mean first NSSAI associated with the HPLMN.

During roaming, in a case that the rejected NSSAI, and/or the pending NSSAI, and/or the first NSSAI includes the S-NSSAI of the HPLMN, the UE_A 10 may perform control such that the one or multiple S-NSSAIs included in the 1st identification information do not include, as the mapped S-NSSAI, the S-NSSAI of the HPLMN included in the rejected NSSAI, and/or the pending NSSAI, and/or the first NSSAI stored by the UE_A 10. In other words, the UE_A 10 may perform control such that the 1st identification information does not include the S-NSSAI of the current PLMN to which the S-NSSAI included in the rejected NSSAI, and/or the pending NSSAI, and/or the first NSSAI is mapped.

Furthermore, in other words, with respect to the S-NSSAI included in the 1st identification information generated by the UE_A 10, mapped S-NSSAI of the S-NSSAI is not included in the rejected NSSAI, and/or the pending NSSAI, and/or the first NSSAI stored by the UE_A 10. Here, the rejected NSSAI may be at least one of the first to three rejected NSSAIs, and includes the S-NSSAI of the HPLMN.

The UE_A 10 may include identification information other than the first and second identification information in the registration request message and/or the RRC message including the registration request message, and may include and transmit, for example, the UE ID and/or the PLMN ID and/or the AMF identification information. Here, the AMF identification information may be information for identifying the AMF or a set of AMFs, for example, a 5GS-Temporary Mobile Subscription Identifier (5G-S-TMSI) or a Globally Unique AMF Identifier (GUAMI).

By including and transmitting an SM message (for example, the PDU session establishment request message) in the registration request message, or by transmitting an SM message (for example, the PDU session establishment request message) together with the registration request message, the UE_A 10 may initiate the PDU session establishment procedure during the registration procedure.

In a case that the 5G AN 120 (or the gNB) receives the RRC message including the registration request message, then the 5G AN (or the gNB) selects the AMF to transfer the registration request message (S602). Note that the 5G AN 120 (or the gNB) can select the AMF based on one or more pieces of identification information included in the registration request message and/or the RRC message including the registration request message. Specifically, the 5G AN (or the gNB) may select the new AMF 141 corresponding to the transmission destination of the registration request message, based on at least one piece of identification information of the first and second identification information.

For example, the 5G AN 120 (or gNB) may select the AMF based on the first identification information. Specifically, the 5G AN (or gNB) may select an AMF included in the network slice identified by the S-NSSAI included in the first identification information or an AMF having connectivity to the network slice.

Furthermore, for example, the 5G AN 120 (or gNB) may select, based on the second identification information, an AMF including a function to manage the maximum number of UEs connected to the slice and/or an AMF having connectivity to a network including the function to manage the maximum number of UEs connected to the slice.

Note that the method of selecting the AMF is not limited to that described above and the 5G AN (or the gNB) may select the AMF based on other conditions. The 5G AN (or the gNB) extracts the registration request message from the received RRC message and transfers the registration request message to the selected new AMF (S604). Note that in a case that at least one piece of identification information of the first and second identification information is not included in the registration request message but in the RRC message, the identification information included in the RRC message may be transferred to the selected AMF (new AMF 141) together with the registration request message (S604).

In a case of receiving the registration request message, the new AMF 141 can perform first condition fulfillment determination. The first condition fulfillment determination is performed by the network (or the new AMF 141) to determine whether to accept a request from the UE. In a case that the first condition fulfillment determination is true, the new AMF 141 performs procedural steps from S606 to S612. On the other hand, in a case that the first condition fulfillment determination is false, the new AMF 141 may skip procedural steps from S606 to S608 and perform a procedural step in S610.

Alternatively, the new AMF 141 may perform the first condition fulfillment determination after requesting a UE context from the old AMF 142 and then receiving the UE context from the old AMF 142 (S606 and S608). In that case, the new AMF 141 may perform S610 and/or S612 in a case that the first condition fulfillment determination is true. On the other hand, in a case that the first condition fulfillment determination is false, the new AMF 141 may perform S610.

Note that in this regard, in a case that the first condition fulfillment determination is true, the control message transmitted and received in S610 may be the Registration accept message. In a case that the first condition fulfillment determination is false, the control message transmitted and received in S610 may be the Registration reject message.

Note that the first condition fulfillment determination may be performed based on reception of the registration request message, and/or each piece of identification information included in the registration request message, and/or subscriber information, and/or capability information of the network, and/or an operator policy, and/or a network state, and/or registration information of a user, and/or a context stored in the AMF, and/or the like.

For example, the first condition fulfillment determination may be true in a case that the network allows the request from the UE, and the first condition fulfillment determination may be false in a case that the network does not allow the request from the UE. In a case that a network with which the UE is to be registered and/or an apparatus in the network supports the function requested by the UE, the first condition fulfillment determination may be true, whereas in a case that the network and/or the apparatus does not support the function requested by the UE, the first condition fulfillment determination may be false. In addition, in a case that the transmitted and/or received identification information is allowed, the first condition fulfillment determination may be true, whereas in a case that the transmitted and/or received identification information is not allowed, the first condition fulfillment determination may be false.

In a case that the S-NSSAI included in the requested NSSAI received by the AMF from the UE is information for identifying a slice that requires the NSSAA procedure, and further, in a case that the AMF stores success for results of the NSSAA procedure of a corresponding S-NSSAI for the UE, the first condition fulfillment determination may be true. Alternatively, the first condition fulfillment determination may be false in a case that no S-NSSAI is allowed for the UE and that no allowed NSSAI is scheduled to be allocated to the UE in the future.

The first condition fulfillment determination may be true in a case that the S-NSSAI included in the requested NSSAI received by the AMF from the UE is information for identifying a slice requiring management of the maximum number of UEs connected to the slice and further that the maximum number of UEs is not reached. Alternatively, in a case that no S-NSSAI is allowed for the UE as well, the first condition fulfillment determination may be true in a case that the allowed NSSAI is expected to be allocated to the UE in the future.

For the AMF, the first condition fulfillment determination may be true or may be false in a case that no S-NSSAI is allowed for the UE and that the first NSSAI is allocated to the UE.

The new AMF 141 performs the procedural steps in S606 and S608 in a case that the AMF indicated in the AMF identification information included in the message received at the new AMF 141 from the UE is an old AMF 142, and the new AMF 141 does not perform the procedural steps in S606 and S608 in a case that the AMF indicated in the AMF identification information included in the message received at the new AMF 141 from the UE_A 10 is the new AMF 141. In other words, the procedural steps in S606 and S608 are performed in a case that the present procedure leads to a change of the AMF (AMF change), and the procedural steps in S606 and S608 are skipped in a case that the AMF is not changed.

A UE context transfer procedure will be described (S606 and S608). The new AMF 141 transmits a UE context request message to the old AMF 142 (S606). The old AMF 142 transmits the UE context to the new AMF 141 based on the UE context request message received. The new AMF 141 generates a UE context based on the UE context received.

Here, the UE context transmitted from the new AMF 141 to the old AMF 142 may include the UE ID and the allowed NSSAI. The UE context may include the configured NSSAI and/or rejected NSSAI, the NSSAI and/or pending NSSAI, and/or the first NSSAI. Information as to whether notification to the UE is complete may be linked to the allowed NSSAI, and/or the configured NSSAI, and/or the rejected NSSAI, and/or the pending NSSAI, and/or the first NSSAI included in the UE context, and the S-NSSAI included in each piece of NSSAI.

The UE context may include information of the S-NSSAI that requires the NSSAA procedure, and/or information indicating authentication that the NSSAA procedure has completed for the UE has succeeded, and/or information indicating that the authentication has failed.

The UE context may include the information of the S-NSSAI requiring management of the maximum number of UEs connected to the slice, and/or information indicating that the maximum number of UEs is reached, and/or information indicating whether the maximum number of UEs connected to the slice is reached.

Note that the information regarding the characteristics of the S-NSSAI may be managed as one piece of information and that specifically, the network may associate with each other and store, for each piece of S-NSSAI, information indicating whether the NSSAA is required, whether the NSSAA is successful, whether the maximum number of UEs connected to the slice requires to be managed, and whether the maximum number of UEs connected to the slice is reached.

The new AMF 141 may transmit a control message to the UE based on the determination of the first condition fulfillment determination and/or on the reception of the UE context from the old AMF 142 (S610). The control message may be the registration accept message, or may be the registration reject message.

The new AMF 141 may include and transmit one or multiple pieces of the 10th identification information in the control message. Alternatively, the new AMF 141 may include and transmit, in the control message, one or more pieces of identification information of at least the 10th to the 15th identification information. Note that, by transmitting these pieces of identification information and/or the control message, the new AMF 141 may indicate that the network supports the functions, may indicate that the request from the UE is accepted, may indicate that the request from the UE is not allowed, or may indicate information obtained by combining the above-described pieces of information. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

In a case of receiving the first identification information and/or the second identification information from the UE, the new AMF 141 may include and transmit, in the control message, at least one piece of identification information of the 10th to the 15th identification information.

Furthermore, the new AMF 141 may transmit at least one of the 10th to 15 identification information in a case that the UE configuration information is updated.

The new AMF 141 may further include the configured NSSAI, and/or the allowed NSSAI, and/or the rejected NSSAI, and/or the pending NSSAI, and/or the first NSSAI in the control message and transmit the control message to the UE_A 10. Note that the message transmitted by the new AMF 141 to the UE may be based on the information received from the UE. Specifically, the S-NSSAI included in the rejected NSSAI transmitted by the new AMF 141 to the UE may be the S-NSSAI included in the 1st identification information received from the UE.

Note that the 10th to the 15th identification information may be included and transmitted in the allowed NSSAI, and/or the rejected NSSAI, and/or the pending NSSAI, and/or the first NSSAI, or may be these pieces of NSSAI.

At the time of transmission of the control message, in a case that S-NSSAI to be allowed (allowed NSSAI) for the UE AMF 141 is not available but the NSSAA procedure is to be performed after completion of or in parallel with the present procedure, or that the NSSAA procedure is being performed between the UE and the network, or that the pending NSSAI is included and transmitted in the control message, the AMF may include and transmit an empty value in the allowed NSSAI.

At the time of transmission of the control message, in a case of allowing no S-NSSAI (allowed NSSAI) for the UE AMF 141 but including the 10th identification information in the control message, or notifying the first NSSAI to the UE before the present procedure, then the AMF may include and transmit an empty value in the allowed NSSAI.

In a case of including, in the control message, the 13th identification information indicating application to all the PLMNs, the new AMF 141 may also include the 15th identification information in the control message.

The UE_A 10 receives, from the network, the control message and/or one or more pieces of information of the 10th to the 15th identification information. In particular, the UE receives, from the new AMF 141, the control message and/or one or more pieces of information of the 10th to the 15th identification information.

Based on the reception of at least one piece of information of the 10th to the 15th identification information, the UE_A 10 may recognize the information received. Specifically, since the maximum number of UEs connected per slice is reached, the UE_A 10 may recognize a state in which the UE is temporarily prohibited from transmitting the MM message and/or the SM message using the S-NSSAI indicated by the 10th identification information, and/or the S-NSSAI indicated by the 14th identification information, and/or the S-NSSAI related to the mapped S-NSSAI indicated by the 15th identification information. Note that the MM procedure may be the registration request message, and the SM message may be the PDU session establishment request message.

Based on the reception of at least one or more pieces of information of the 10th to the 15th identification information and/or the reception of the control message, the UE_A 10 may perform the following operation for each piece of the 10th identification information.

The UE_A 10 may include the S-NSSAI indicated by the 10th identification information, and/or the S-NSSAI indicated by the 14th identification information, and/or the S-NSSAI related to the mapped S-NSSAI indicated by the 15th identification information, in the appropriate first NSSAI for storage. Specifically, the UE may add the S-NSSAI indicated by the 14th identification information received to the first NSSAI associated with information indicated in the 11th identification information and/or the 13th identification information.

Alternatively, the UE_A 10 may add the mapped S-NSSAI indicated by the 15th identification information received to the first NSSAI, or add the S-NSSAI related to the mapped S-NSSAI indicated by the 15th identification information received to the first NSSAI associated with the current PLMN, or to the first NSSAI associated with the current PLMN and the current access type (registered access type, 3GPP, access, or non-3GPP access), or to the first NSSAI(s) associated with the current PLMN and all the access types.

Furthermore, in a case that the S-NSSAI included in the first NSSAI stored by the UE is included in the allowed NSSAI stored by the UE and associated with the PLMN and access type requested by the UE in the present procedure and with other access types, the S-NSSAI may be deleted from the allowed NSSAI.

Furthermore, in a case of receiving the 15th identification information, the UE_A 10 may store the S-NSSAI indicated by the 15th identification information as the mapped S-NSSAI of the S-NSSAI indicated by the 14th identification information.

In a case that the 13th identification information received is information indicating application to all the PLMNs, then the UE may delete the S-NSSAI associated with the mapped S-NSSAI indicated by the 15th identification information from the allowed NSSAI corresponding to the PLMNs other than the current PLMN.

Based on the reception of the 10th identification information and/or the 11th identification information, and/or the reception of the control message, the UE_A 10 may recognize that the S-NSSAI indicated in the 10th identification information has reached the maximum number of UEs connected per slice. Here, the S-NSSAI indicated in the 10th identification information may be the S-NSSAI indicated in the 14th identification information and/or the mapped S-NSSAI indicated in the 15th identification information.

Based on the reception of at least one or more pieces of information of the 10th to the 15th identification information and/or the reception of the control message, the UE_A 10 may use the value of the back-off timer received to start the counting of the back-off timer associated with the S-NSSAI or to start the back-off timer and manage the back-off timer. Here, the value of the back-off timer may be the value of the timer indicated in the 10th identification information and/or the 12th identification information, and the S-NSSAI may be the S-NSSAI indicated in the first identification information, and/or the 10th identification information, and/or the 14th identification information, and/or may be the mapped S-NSSAI indicated in the 15th identification information.

During running of the back-off timer, the UE_A 10 may be in the state in which the US is prohibited from transmitting the MM message and the SM message using the S-NSSAI associated with the back-off timer, or the mapped S-NSSAI (S-NSSAI of HPLMN) associated with the back-off timer, or the S-NSSAI associated with the mapped S-NSSAI associated with the back-off timer.

Furthermore, in a case of receiving the 13th identification information, the UE_A 10 may apply the back-off timer according to the valid range indicated in the 13th identification information.

Specifically, in a case that the 13th identification information is information indicating the application within the current PLMN, the UE_A 10 may apply the back-off timer within the current PLMN. Specifically, in response to a change of the PLMN (PLMN change), the UE_A 10 need not stop the counting of the back-off timer or the back-off timer, but the regulation by the back-off timer associated with the PLMN before movement may be released. In other words, in a case that the PLMN is changed, the UE maintains the back-off timer, but the regulation on the PLMN before movement may be released.

Alternatively, in response to a change of the PLMN, the UE_A 10 may stop the counting of the back-off timer associated with the current PLMN or stop the back-off timer. In other words, in a case that the PLMN is changed, the UE_A 10 may stop the back-off timer and the regulation on the PLMN before movement may be released.

Alternatively, in a case that the 13th identification information is information indicating the application to all the PLMNs, the UE_A 10 may apply the back-off timer in all the PLMNs. In other words, even in a case that the PLMN is changed, the UE_A 10 may maintain the back-off timer instead of stopping the back-off timer. In a case that the PLMN is changed while the back-off timer is running, the UE_A 10 may maintain the state in which the MM message and the SM message are prohibited, the MM message and the SM message using the S-NSSAI of the moving destination PLMN associated with the mapped S-NSSAI of the S-NSSAI with which the back-off timer is associated, or the S-NSSAI of the moving destination PLMN associated with the mapped S-NSSAI, or the mapped S-NSSAI.

Alternatively, in a case that the 13th identification information is information indicating the application in the current registration area, the UE_A 10 may apply the back-off timer in the current registration area. In other words, in response to moving out of the registration area, the UE_A 10 may stop the counting of the back-off timer or stop the back-off timer.

Furthermore, the UE_A 10 may manage and/or store the 11th identification information, and/or the first NSSAI associated with the 13th identification information or one or multiple S-NSSAIs included in the first NSSAI.

Here, in response to the stoppage or expiry of the back-off timer, the limitation may be released and the UE_A 10 may transition to a state in which the UE can transmit the MM message and the SM message using the S-NSSAI with which the back-off timer is associated, and/or the S-NSSAI related to the mapped S-NSSAI with which the back-off timer is associated, and/or the mapped S-NSSAI with which the back-off timer is associated. In other words, in response to the stoppage or expiry of the back-off timer, the UE_A 10 may transition to the state in which the UE_A 10 can transmit the MM message using, for the requested NSSAI, the S-NSSAI with which the back-off timer is associated, and/or the S-NSSAI related to the mapped S-NSSAI with which the back-off timer is associated, and/or the mapped S-NSSAI with which the back-off timer is associated.

Furthermore, in response to the stoppage or expiry of the back-off timer, the UE_A 10 may transition to a state in which the UE can transmit the MM message using the NSSAI associated with the back-off timer. In other words, in response to the stoppage or expiry of the back-off timer, the UE_A 10 may transition to the state in which the UE can transmit the MM message using, for the requested NSSAI, the NSSAI associated with the back-off timer.

Furthermore, in response to the stoppage or expiry of the back-off timer, the UE_A 10 may delete, from the first NSSAI, the S-NSSAI with which the back-off timer is associated, the mapped S-NSSAI with which the back-off timer is associated, or the S-NSSAI associated with the mapped S-NSSAI with which the back-off timer is associated.

Furthermore, in a case that the back-off timer is valid for the registered PLMN, in response to the stoppage or expiry of the back-off timer, the UE_A 10 may delete, from the first NSSAI associated with the current PLMN, the S-NSSAI with which the back-off timer is associated, the mapped S-NSSAI with which the back-off timer is associated, or the S-NSSAI associated with the mapped S-NSSAI with which the back-off timer is associated.

Furthermore, in a case that the back-off timer is valid for the registered PLMN, in response to the stoppage or expiry of the back-off timer, the UE_A 10 may delete, from the first NSSAI applied to all the PLMNs, the S-NSSAI with which the back-off timer is associated, the mapped S-NSSAI with which the back-off timer is associated, or the S-NSSAI associated with the mapped S-NSSAI with which the back-off timer is associated.

Furthermore, in a case that the back-off timer is valid for all the PLMNs, in response to the stoppage or expiry of the back-off timer, the UE_A 10 may delete, from the first NSSAI applied to all the PLMNs, the S-NSSAI with which the back-off timer is associated, the mapped S-NSSAI with which the back-off timer is associated, or the S-NSSAI associated with the mapped S-NSSAI with which the back-off timer is associated.

Furthermore, in a case that the back-off timer is valid for all the PLMNs, in response to the stoppage or expiry of the back-off timer, the UE may delete, from the first NSSAI applied to each PLMN, the S-NSSAI with which the back-off timer is associated, the mapped S-NSSAI with which the back-off timer is associated, or the S-NSSAI associated with the mapped S-NSSAI with which the back-off timer is associated.

In other words, in a case that the S-NSSAI with which the back-off timer is associated, the mapped S-NSSAI with which the back-off timer is associated, or the S-NSSAI associated with the mapped S-NSSAI with which the back-off timer is associated are included in the multiple first NSSAIs and are stored by the UE_A 10, the UE_A 10 may delete the corresponding S-NSSAIs from all of the corresponding first NSSAIs.

Specifically, for example, in a case that a back-off timer #1 associated with S-NSSAI #1 has been managed as being valid for all the PLMNs, then in response to the stoppage or expiry of the back-off timer #1, the UE may delete S-NSSAI #1 from first NSSAI #1 associated with PLMN #1 and further delete S-NSSAI #2 associated with mapped S-NS-SAI of S-NSSAI #1 from first NSSAI #2 associated with the PLMN #2.

In a case of receiving a TAI list, the UE_A 10 enables the received TAI list, and in a case that the UE_A 10 already stores a valid TAI list, the UE_A 10 may delete or disable the old TAI list. The valid TAI list may hereinafter be represented as the registration area below. Note that in a case that the UE_A 10 does not store a valid TAI list, and does not receive a TAI list from the core network during the present procedure, no valid TAI list needs to be stored.

The UE_A 10 may appropriately store each received NSSAI. Specifically, in a case of receiving configured NSSAI, the UE_A 10 may store the received configured NSSAI as "configured NSSAI associated with the current PLMN." In other words, the UE_A 10 may replace the "configured NSSAI associated with the current PLMN stored by the UE_A 10" with the "received configured NSSAI."

Furthermore, in a case of receiving the configured NSSAI, the UE_A 10 may delete mapped S-NSSAI of S-NSSAI included in the "configured NSSAI associated with the current PLMN stored by the UE_A 10." Furthermore, in a case that the "received configured NSSAI" includes one or multiple mapped S-NSSAIs, the UE_A 10 may store the one or multiple mapped S-NSSAIs.

Furthermore, in a case that the UE_A 10 receives the configured NSSAI, the UE_A 10 may delete the "rejected NSSAI stored by the UE_A 10 and associated with the current PLMN."

Alternatively, in a case of receiving the configured NSSAI, the UE_A 10 may delete at least one of the "first rejected NSSAI stored by the UE_A 10 and associated with the current PLMN," the "second rejected NSSAI stored by the UE_A 10 and associated with the current PLMN," and the "third rejected NSSAI stored by the UE_A 10 and associated with the current PLMN."

Furthermore, in a case of receiving the configured NSSAI, the UE_A 10 may delete the "first NSSAI stored by the UE_A 10," the "first NSSAI stored by the UE_A 10 and associated with the current PLMN," and/or one or multiple "first NSSAIs stored by the UE_A 10 and associated with the EPLMN of the current PLMN."

Furthermore, in a case of receiving the configured NSSAI, the UE_A 10 may delete the "pending NSSAI stored by the UE_A 10," and/or the "pending NSSAI stored by the UE_A 10 and associated with the current PLMN," and/or one or multiple "first pending NSSAIs stored by the UE_A 10 and associated with the EPLMN of the current PLMN."

Furthermore, in a case of receiving the allowed NSSAI, the UE_A 10 may store the received allowed NSSAI as "allowed NSSAI associated with the current PLMN and the current access type." In other words, the UE_A 10 may replace the "allowed NSSAI associated with the current PLMN and the current access type" stored by the UE_A 10 with the "received allowed NSSAI".

Furthermore, in a case that the UE_A 10 receives a TAI list and the allowed NSSAI from the new AMF 141, and at least one TAI included in the TAI list belongs to the EPLMN, then the UE_A 10 may store the received allowed NSSAI as "allowed NSSAI associated with the EPLMN to which the TAI included in the TAI list belongs and with the current access type."

Note that in a case of storing the allowed NSSAI, the UE_A 10 may store the allowed NSSAI in association with the registration area, or may store, in association with the registration area, the S-NSSAI included in the allowed NSSAI.

Furthermore, in a case that the UE_A 10 receives the allowed NSSAI, the UE_A 10 may delete the mapped S-NSSAI of S-NSSAI included in the "allowed NSSAI deleted based on reception" or the "old allowed NSSAI updated based on reception." Furthermore, in a case that mapped S-NSSAIs are included in the "allowed NSSAI received" by the UE_A 10, the UE_A 10 may store one or multiple mapped S-NSSAIs.

However, in a case of receiving the S-NSSAI included in the pending NSSAI, the S-NSSAI being included in the old allowed NSSAI, the UE_A 10 need not delete the mapped S-NSSAI of the S-NSSAI.

In a case of receiving the MM message including the allowed NSSAI and the pending NSSAI, the UE_A 10 may perform control based on reception of the pending NSSAI before control based on reception of the allowed NSSAI.

Specifically, in a case that the old allowed NSSAI stored by the UE_A 10 includes S-NSSAI #1, and the UE_A 10 receives, from the network, the pending NSSAI including S-NSSAI #1 and the new allowed NSSAI not including S-NSSAI #1, the UE_A 10 may perform update of each stored NSSAI based on reception of the pending NSSAI prior to update of each stored NSSAI based on reception of the allowed NSSAI.

Similarly, in a case of receiving the MM message including the allowed NSSAI and the rejected NSSAI, the UE_A 10 may perform control based on reception of the rejected NSSAI prior to control based on reception of allowed NSSAI.

Specifically, in a case that the old allowed NSSAI stored by the UE_A 10 includes S-NSSAI #1, and the UE_A 10 receives, from the network, the rejected NSSAI including S-NSSAI #2 corresponding to mapped S-NSSAI of S-NS-SAI #1, and the new allowed NSSAI not including S-NSSAI #1, the UE_A 10 may perform update of each stored NSSAI based on reception of the rejected NSSAI prior to update of each stored NSSAI based on reception of the allowed NSSAI.

Furthermore, in a case of receiving the allowed NSSAI, the UE_A 10 may delete the S-NSSAI of the "rejected NSSAI stored by the UE_A 10 and associated with the current PLMN."

Specifically, in a case of receiving the allowed NSSAI, the UE_A 10 may delete the S-NSSAI included in the received allowed NSSAI and/or the mapped S-NSSAI of the received allowed NSSAI from at least one of the "first rejected NSSAI stored by the UE_A 10 and associated with the current PLMN," the "second rejected NSSAI stored by the UE_A 10 and associated with the current PLMN," the "second rejected NSSAI stored by the UE_A 10 and associated with the current PLMN and with the current registration area," and the "third rejected NSSAI stored by the UE_A 10 and associated with the current PLMN," or may delete, from all the NSSAIs, the S-NSSAI included in the received allowed NSSAI and/or the mapped S-NSSAI of the allowed NSSAI.

Furthermore, in a case of receiving the allowed NSSAI, the UE_A 10 may delete the S-NSSAI included in the received allowed NSSAI from the "pending NSSAI stored by the UE_A 10 and associated with the current PLMN." Furthermore, in a case of receiving the allowed NSSAI, the UE_A 10 may delete the mapped S-NSSA or S-NSSAI included in the received allowed NSSAI from the "pending NSSAI stored by the UE_A 10 and associated with all the PLMNs." Furthermore, in a case of receiving the allowed NSSAI, the UE_A 10 may delete the S-NSSAI included in the received allowed NSSAI from the "pending NSSAI stored by the UE_A 10 and associated with the EPLMN."

Here, in the roaming scenario, in a case that the S-NSSAI included in the pending NSSAI is S-NSSAI of the HPLMN, and the UE_A 10 receives the allowed NSSAI, then the UE_A 10 may remove, from the "pending NSSAI stored by the UE_A 10," the mapped S-NSSAI of the S-NSSAI included in the received new allowed NSSAI. At this time, in the roaming scenario, the allowed NSSAI is associated with the PLMN ID or the SNPN ID, indicating the current PLMN or the current SNPN, in other words, is, the RPLMN or the RSNPN, whereas the S-NSSAI included in pending NSSAI may be the S-NSSAI of the HPLMN.

Furthermore, in a case of receiving the allowed NSSAI, the UE_A 10 may delete the S-NSSAI included in the received allowed NSSAI from the "first NSSAI stored by the UE_A 10 and associated with the current PLMN." Alternatively, in a case of receiving the allowed NSSAI, the UE_A 10 may delete the mapped S-NSSA or S-NSSAI included in the received allowed NSSAI from the "first NSSAI stored by the UE_A 10 and associated with all the PLMNs."

Furthermore, in a case of receiving the rejected NSSAI, the UE_A 10 may store the S-NSSAI included in the received rejected NSSAI as appropriate rejected NSSAI based on the reject cause value with which the S-NSSAI is associated. In other words, the UE_A 10 may add the "S-NSSAI included in the received rejected NSSAI" to the "rejected NSSAI" stored by the UE_A 10.

Specifically, in a case of receiving the reject cause value "S-NSSAI not available in the current PLMN or SNPN," and the rejected S-NSSAI associated with the reject cause value, the UE_A 10 may add the S-NSSAI to the first rejected NSSAI associated with the current PLMN.

Furthermore, in a case of receiving the reject cause value "S-NSSAI not available in the current registration area" and the rejected S-NSSAI associated with the reject cause value, the UE_A 10 may add the "received rejected S-NSSAI" to the "second rejected NSSAI associated with the current PLMN and the current registration area."

Furthermore, in a case of receiving the reject cause value "S-NSSAI not available due to the failed or revoked NSSAA" and the rejected S-NSSAI associated with the reject cause value, the UE_A 10 may add the "received rejected S-NSSAI" to the "third rejected NSSAI." At this time, the "third rejected NSSAI" may be associated with the current PLMN, or may be common to all PLMNs.

Note that in a case that the UE_A 10 receives the TAI list together with the rejected NSSAI, the current registration area is indicated by the received TAI list. On the other hand, in a case that the UE_A 10 does not receive the TAI list together with the rejected NSSAI, the current registration area is indicated by the TAI list previously received and stored by the UE_A 10. Furthermore, in a case of receiving the reject cause value "S-NSSAI not available due to the failed or revoked NSSAA" and the rejected NSSAI including the rejected S-NSSAI associated with the reject cause value, the UE_A 10 may add and/or store the S-NSSAI to the third rejected NSSAI. Note that in a case of storing the third rejected NSSAI associated with the current PLMN, then the UE may add and/or store the received S-NSSAI to and/or in the third rejected NSSAI associated with the current PLMN.

Furthermore, in a case of receiving the rejected NSSAI, the UE_A 10 may delete the S-NSSAI included in the received rejected NSSAI from the "allowed NSSAI stored by the UE_A 10 and associated with the current PLMN."

Here, in a case that the UE_A 10 receives the rejected NSSAI including the S-NSSAI of the HPLMN, and further the rejected NSSAI received by the UE_A 10 includes the mapped S-NSSAI of the S-NSSAI included in the "allowed NSSAI stored by the UE_A 10 and associated with the current PLMN," the UE_A 10 may delete the S-NSSAI from the "allowed NSSAI stored by the UE_A 10 and associated with the current PLMN."

Furthermore, in a case of receiving the rejected NSSAI, the UE_A 10 may delete the S-NSSAI included in the received rejected NSSAI from the "pending NSSAI stored by the UE_A 10 and associated with the current PLMN." Furthermore, in a case of receiving the rejected NSSAI, the UE_A 10 may delete the mapped S-NSSA or S-NSSAI included in the received allowed NSSAI, from the "pending NSSAI stored by the UE_A 10 and associated with all the PLMNs." Furthermore, in a case of receiving the rejected NSSAI, the UE_A 10 may delete the S-NSSAI included in the received allowed NSSAI from the "pending NSSAI stored by the UE_A 10 and associated with the EPLMN."

Furthermore, in a case of receiving the allowed NSSAI, the UE_A 10 may delete the S-NSSAI included in the received allowed NSSAI from the "first NSSAI stored by the UE_A 10 and associated with the current PLMN." Alternatively, in a case of receiving the allowed NSSAI, the UE_A 10 may delete the mapped S-NSSA or S-NSSAI included in the received allowed NSSAI from the "first NSSAI stored by the UE_A 10 and associated with all the PLMNs."

Furthermore, in a case of receiving the rejected NSSAI, the UE_A 10 may delete the S-NSSAI included in the received rejected NSSAI from the "pending NSSAI stored by the UE_A 10 and associated with the current PLMN." Furthermore, in a case of receiving the rejected NSSAI, the UE_A 10 may delete the mapped S-NSSA or S-NSSAI included in the received allowed NSSAI, from the "pending NSSAI stored by the UE_A 10 and associated with all the PLMNs." Furthermore, in a case of receiving the rejected NSSAI, the UE_A 10 may delete the S-NSSAI included in the received allowed NSSAI from the "pending NSSAI stored by the UE_A 10 and associated with the EPLMN."

Note that during roaming, in a case that the S-NSSAI included in the rejected NSSAI (one of the first to third rejected NSSAIs) is the S-NSSAI of the HPLMN and the pending NSSAI stored by the UE is the S-NSSAI of the current PLMN (in other words, the VPLMN), and that the UE_A 10 receives the rejected NSSAI, and that the rejected NSSAI includes the mapped S-NSSAI of certain S-NSSAI included in the "pending NSSAI stored by the UE_A 10 and associated with the current PLMN," then the UE_A 10 may delete the S-NSSAI from the "pending NSSAI stored by the UE_A 10 and associated with the current PLMN."

Alternatively, during roaming, in a case that the S-NSSAI included in the rejected NSSAI (one of the first to third rejected NSSAIs) is the S-NSSAI of the HPLMN and the pending NSSAI stored by the UE is also the S-NSSAI of the HPLMN, in a case of receiving the rejected NSSAI, the UE_A 10 may delete the S-NSSAI included in the received rejected NSSAI from the "pending NSSAI stored by the UE_A 10 and associated with the current PLMN."

Alternatively, during roaming, in a case that the S-NSSAI included in the rejected NSSAI (one of the first to third rejected NSSAIs) is the S-NSSAI of the current PLMN (in other words, the VPLMN) and the pending NSSAI stored by the UE is the S-NSSAI of the HPLMN, and that the UE_A 10 receives the rejected NSSAI, and that the certain S-NS-SAI included in the "pending NSSAI stored by the UE_A 10" is the mapped S-NSSAI of the rejected NSSAI or the mapped S-NSSAI of the S-NSSAI included in the rejected NSSAI, the UE_A 10 may delete the S-NSSAI from the "pending NSSAI stored by the UE_A 10."

Furthermore, in a case of receiving the rejected NSSAI, the UE_A 10 may delete the S-NSSAI included in the received rejected NSSAI from the "first NSSAI stored by the UE_A 10 and associated with the current PLMN." Furthermore, in a case of receiving the rejected NSSAI, the UE_A 10 may delete the mapped S-NSSA or S-NSSAI included in the received allowed NSSAI from the "first NSSAI stored by the UE_A 10 and associated with all the PLMNs." Furthermore, in a case of receiving the rejected NSSAI, the UE_A 10 may delete the S-NSSAI included in the received allowed NSSAI from the "first NSSAI stored by the UE_A 10 and associated with the EPLMN."

Furthermore, in a case of receiving the pending NSSAI, the UE_A 10 may replace the pending NSSAI stored by the UE_A 10 with new pending NSSAI. Specifically, in a case of receiving the pending NSSAI included in a registration accept message during a registration procedure for the current PLMN or SNPN, the UE_A 10 may replace, with the new pending NSSAI, the pending NSSAI associated with the current PLMN or SNPN stored by the UE_A 10.

Alternatively, in a case that the S-NSSAI included in the pending NSSAI is the S-NSSAI of the HPLMN, and that the UE_A 10 receives the pending NSSAI included in the registration accept message during the registration procedure for the current PLMN or SNPN, the UE_A 10 may replace the pending NSSAI stored by the UE_A 10 with the new pending NSSAI.

Furthermore, in a case of storing the mapped S-NSSAI of the pending NSSAI, the UE_A 10 may delete the mapped S-NSSAI of the pending NSSAI, store the mapped S-NSSAI of the new pending NSSAI, or perform both processing operations.

Note that the mapped S-NSSAI of the pending NSSAI may be stored based on the mapped S-NSSAI of the old allowed NSSAI.

Note that each type of processing performed by the UE based on reception of each piece of identification information described above may be performed during the present procedure or after completion of the present procedure or may be performed based on completion of the present procedure after completion of the present procedure.

Note that the AMF may select and determine at least which piece of identification information out of the 10th to the 15th identification information is to be included in the control message, based on each piece of received identification information, and/or subscriber information, and/or capability information of the network, and/or an operator policy, and/or a state of the network, and/or registration information of a user, and/or a context stored in the AMF, and/or the like.

In a case that the control message is the registration accept message, the AMF can either include and transmit an SM message (for example, the PDU session establishment accept message) in the registration accept message, or transmit an SM message (for example, the PDU session establishment accept message) together with the registration accept message. Note that, such a transmission method may be performed in a case that the SM message (for example, the PDU session establishment request message) is included in the registration request message. The transmission method may be performed in a case that the SM message (for example, the PDU session establishment request message) is transmitted along with the registration request message. By performing such a transmission method as described above, the AMF can indicate that a procedure for SM is accepted in the registration procedure.

By transmitting the registration accept message based on each piece of received identification information, and/or subscriber information, and/or capability information of the network, and/or the operator policy, and/or the state of the network, and/or the registration information of the user, and/or the context stored in the AMF, and/or the like, the AMF may indicate that the request from the UE is accepted, or by transmitting the registration reject message, the AMF may indicate that the request from the UE is rejected.

The UE receives the control message via the 5G AN (gNB) (S608). In a case that the control message is the registration accept message, then by receiving the registration accept message, the UE can recognize that the request from the UE on the registration request message is accepted, and recognize contents of various pieces of identification information included in the registration accept message. Alternatively, in a case that the control message is the registration reject message, then by receiving the registration reject message, the UE can recognize that the request from the UE using the registration request message has been rejected and the content of various pieces of identification information included in the registration reject message. In a case that the UE does not receive the control message even after a prescribed time period has elapsed after transmitting the registration request message, the UE may recognize that the request from the UE is rejected.

Furthermore, in a case that the control message is the registration accept message, the UE can further transmit to the AMF a registration complete message as a response message to the registration accept message via the 5G AN (gNB) (S610). Note that, in a case that the UE receives the SM message such as the PDU session establishment accept message, the UE may include and transmit the SM message such as the PDU session establishment complete message in the registration complete message, or may indicate that the procedure for SM has completed by including the SM message. Here, the registration complete message is a NAS message transmitted and/or received over the N1 interface; however, between the UE and the 5G AN (gNB), the registration complete message is transmitted and/or received in an RRC message.

The AMF receives the registration complete message via the 5G AN (gNB) (S612). Each apparatus completes the present procedure based on transmission and/or reception of the registration accept message and/or the registration complete message.

Alternatively, each apparatus may complete the registration procedure based on the transmission and/or the reception of the registration reject message.

Note that each apparatus may transition to or maintain a state in which the UE is registered with the network (an RM_REGISTERED state or a 5GMM-REGISTERED state) based on the transmission and/or reception of the registration accept message and/or the registration complete message or may transition to or maintain a state in which the UE is not registered with the network (an RM_DEREGIS-TERED state or a 5GMM-DEREGISTERED state) over the access in which the UE has received the registration reject message for the current PLMN based on the transmission and/or reception of the registration reject message. The transition of each apparatus to each state may be performed based on transmission and/or reception of the registration complete message and completion of the registration procedure.

In addition, each apparatus may perform processing based on information transmitted and/or received in the registration procedure based on completion of the registration procedure. For example, in a case that information indicating that a part of the request from the UE is rejected is transmitted and/or received, a reason of rejection of the request from the UE may be recognized. In addition, each apparatus may perform the present procedure again or may perform the registration procedure on the core network_A or another cell based on the cause for the rejection of the request from the UE.

Moreover, the UE may store the identification information received along with the registration accept message and/or the registration reject message or may recognize determination of the network, based on the completion of the registration procedure.

Furthermore, the UE may delete the stored one or multiple NSSAIs based on completion of the registration procedure. Specifically, based on completion of the present procedure, in a case of transitioning to the deregistered state on both access (3GPP access and non-3GPP access) with respect to the current PLMN, the UE_A 10 may delete the stored first rejected NSSAI and/or third rejected NSSAI and/or first NSSAI.

Furthermore, based on completion of the present procedure, in a case of transitioning to the deregistered state on a certain access (3GPP access and non-3GPP access) with respect to the current PLMN, or succeeding in the registration procedure in a new registration area, or transitioning to the deregistered state or the registered state on a certain access (3GPP access and non-3GPP access) as a result of performing the registration procedure in the new registration area, then the UE_A 10 may delete the second rejected NSSAI associated with the current PLMN, the current registration area, and/or the access type.

Furthermore, each apparatus may initiate the registration procedure again based on the expiry or stoppage of the back-off timer.

Furthermore, each apparatus may initiate the registration procedure again based on the update of the stored NSSAI.

Furthermore, based on transition to or maintenance of the state in which the UE is registered with the network (RM-_REGISTERED state or 5GMM-REGISTERED state), each apparatus may initiate an SM procedure by transmission and/or reception of SM messages.

3.3. Network Slice-Specific Authentication and Authorization Procedure

Figure 7:
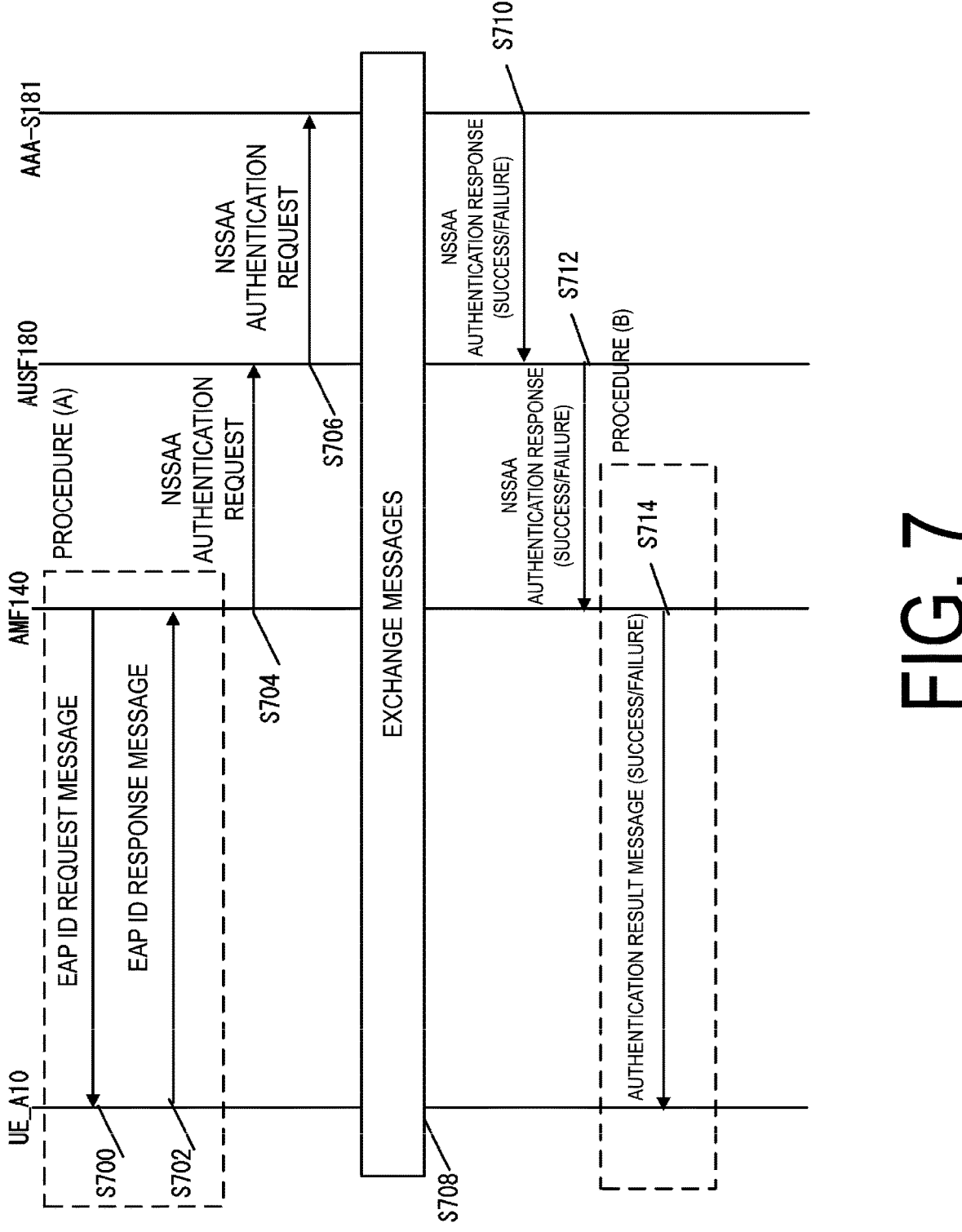
FIG. 7 is a diagram illustrating a Network Slice specific authentication and authorization procedure.

Now, the Network Slice-Specific Authentication and Authorization (NSSAA) procedure will be described using FIG. 7. The NSSAA procedure is hereinafter also referred to as the present procedure. The present procedure may be a procedure for performing, by the core network, an authentication and authorization procedure for a slice requiring the NSSAA procedure for the UE. Here, the authentication procedure and the authorization procedure may be a re-authentication procedure, and a re-authorization procedure.

The present procedure is a procedure performed by the PLMN, and may be performed for each S-NSSAI (mapped S-NSSAI), on which the NSSAA procedure is performed, and/or for each UE. The present procedure may be performed with the registration procedure complete.

The present procedure may be initiated by the AMF 140. For example, the AMF 140 may initiate the present procedure based on the reception of the registration request message from the UE_A 10. The AMF 140 may initiate the present procedure in a case that the AMF 140 stores information indicating that at least one S-NSSAI or mapped S-NSSAI of the S-NSSAI requested from the UE_A 10 is S-NSSAI requiring the NSSAA procedure and further does not store the result of the NSSAA of the S-NSSAI. Here, the result of the NSSAA may be information indicating a successful NSSAA, or a failed NSSAA, or both. Furthermore, the information indicating a successful NSSAA may be the allowed NSSAI. In other words, in a case that the S-NSSAI is stored as allowed NSSAI, the AMF 140 may recognize that the NSSAA of the S-NSSAI has succeeded, and may hold the result of the NSSAA.

Alternatively, the AMF 140 may initiate the present procedure based on a request from the AAA-S 181. For example, with the AMF 140 and/or the NW managing certain S-NSSAI as allowed NSSAI based on the result of the already performed NSSAA procedure, in a case that the AAA-S 181 requires performance of the NSSAA on the S-NSSAI again, the AMF may initiate the present procedure based on the request from the AAA-S 181. In this case, the present procedure may be the NSSAA procedure initiated by the AAA-S.

Hereinafter, the present procedure will be described. The AMF 140 transmits an EAP ID request message to the UE_A 10 via the 5G AN (or gNB or non-3GPP access) (S700). The EAP ID request message may be included and transmitted in an Authentication request message corresponding to an NAS message, or may be an Authentication request message corresponding to an NAS message. Note that the authentication request message, corresponding to a NAS message, may be a 5GS NETWORK SLICE-SPE-CIFIC AUTHENTICATION COMMAND message. The AMF 140 includes and transmit one or multiple pieces of S-NSSAI corresponding to an EAP ID request message, in the EAP ID request message or the authentication request message including the EAP ID request message. Here, the S-NSSAI may be the HPLMN S-NSSAI or the mapped S-NSSAI.

Based on the transmission of the EAP ID request message, the AMF 140 requests one or multiple EAP IDs, to the UE_A 10, as identification information for the UE used to perform the NSSAA for one or multiple pieces of S-NSSAI.

The UE_A 10 transmits an EAP ID response message to the AMF 140 based on the reception of the EAP ID request message and/or the reception of the S-NSSAI and/or reception of the authentication request message (S702). The EAP ID response message may be included and transmitted in the Authentication response message, which is an NAS message, or may be the Authentication response message, which is an NAS message. Note that the authentication response message, which is a NAS message, may be a 5GS NETWORK SLICE-SPECIFIC AUTHENTICATION COMPLETE message. The UE_A 10 may include and transmit the S-NSSAI received from the AMF 140 in the EAP ID response message or the authentication request message including the EAP ID response message. The UE_A 10 may include and transmit, in the EAP ID response message, the EAP ID being identification information of the UE corresponding to the S-NSSAI received from the AMF 140. Note that the UE_A 10 may include multiple EAP IDs and multiple pieces of S-NSSAI in the EAP ID response message, and each EAP ID and each S-NSSAI may be transmitted in association with each other.

Based on the EAP ID response message from the UE_A 10 and/or the reception of the EAP ID and/or the reception of the authentication response message, corresponding to a NAS message, the AMF 140 transmits the NSSAA authentication request message to the AAA-S 181 via the AUSF 180 (S704 and S706). The AM 140F may include, in the NSSAA authentication request message, the EAP ID response message received from the UE_A 10, and transmit the NSSAA authentication request message to the AUSF 180 and/or the AAA-S 181, or may include, in the NSSAA authentication request message, the EAP ID and/or the S-NSSAI included in the EAP ID response message received from the UE_A 10, and may transmit the NSSAA authentication request message to the AUSF 180 and/or AAA-S 181.

Note that the NSSAA authentication request message transmitted from the AMF 140 to the AUSF 180 may be the same as or may be different from the NSSAA authentication request message transmitted from the AUSF 180 to the AAA-S 181. Specifically, the AUSF 180 may transfer, to the AAA-S 181, the NSSAA authentication request message received from the AMF 140, or may include, in the NSSAA authentication request message, the EAP ID and/or the S-NSSAI included in the authentication request message received from the AMF 140 and transmit the authentication request message to the AAA-S 181.

Based on the reception of the NSSAA authentication request message and/or at least one piece of information included in the NSSAA authentication request message, the AAA-S 181 may initiate a procedure of exchanging, between the UE_A 10 and the AAA-S 181, a message required for authentication (S708). Note that the message used in the procedure of exchanging the message between the AAA-S 181 and the UE_A 10 may be an EAP message.

Now, in response to the authentication request message received from the AMF 140, the AAA-S 181 transmits the NSSAA authentication response message to the AMF 140 via the AUSF 180 (S710 and S712).

Note that the NSSAA authentication response message transmitted from the AAA-S 181 to the AUSF 180 may be the same as or may be different from the NSSAA authentication response message transmitted from the AUSF 180 to the AMF 140. Specifically, the AUSF 180 may transfer, to the AAA-S 181, the NSSAA authentication response message received from the AAA-S 181, or may include the NSSAA authentication response message in the NSSAA authentication response message, based on the authentication result and/or the S-NSSAI included in the authentication response message received from the AAA-S 181, and transmit the NSSAA authentication response message to the AMF 140.

The AUSF 180 includes and transmits the authentication result and S-NSSAI in the NSSAA authentication response message. In this regard, the authentication result may be information indicating success or failure. Here, the S-NSSAI included in the NSSAA authentication response message may be the S-NSSAI or the mapped S-NSSAI of the HPLMN.

Based on the reception of the NSSAA authentication response message, the AMF 140 transmits the Authentication result message to the UE_A 10 (S714). The AMF 140 may include and transmit, in the authentication result message, the NSSAA authentication response message or the authentication result and the S-NSSAI included in the NSSAA authentication response message.

The authentication result message may be a 5GS NETWORK SLICE-SPECIFIC AUTHENTICATION RESULT message, or may be included and transmitted in the NETWORK SLICE-SPECIFIC AUTHENTICATION RESULT message.

Each apparatus may complete the present procedure, based on the transmission and/or reception of an authentication result message. Based on the completion of the present procedure, each apparatus may update the stored information, based on the information transmitted and/or received in the present procedure. Specifically, the AMF 140 or the NW may store the authentication result for each piece of S-NSSAI, based on the transmission and/or reception of the authentication result. For example, in a case of transmitting and/or receiving "success" as the authentication result, the AMF 140 and/or the NW may store, as information regarding the UE, information indicating a state of "success" on the NSSAA, in association with the S-NSSAI transmitted and/or received together with the authentication result. Similarly, in a case of transmitting and/or receiving "failure" as the authentication result, the AMF 140 and/or the NW may store, as information regarding the UE, information indicating a state of "failure" on the NSSAA, in association with the S-NSSAI transmitted and/or received together with the authentication result.

In a case that the present procedure is a procedure initiated based on the reception of the registration request message from the UE_A 10, the AMF 140 may update the allowed NSSAI and/or the rejected NSSAI for the UE, based on the transmission and/or reception of the authentication result. Specifically, for example, in a case of transmitting and/or receiving "success" as the authentication result, the AMF 140 may include, in the allowed NSSAI for storage, the S-NSSAI transmitted and/or received together with the authentication result, or may store the S-NSSAI as the mapped S-NSSAI of the S-NSSAI included in the allowed NSSAI, or may store the received S-NSSAI associated with "allowed". Similarly, in a case of transmitting and/or receiving "failure" as the authentication result, the AMF 140 may store, as the third rejected NSSAI, the S-NSSAI transmitted and/or received together with the authentication result, or may store the S-NSSAI as the mapped S-NSSAI of the S-NSSAI included in the third rejected NSSAI, or may store the received S-NSSAI associated with "rejected". Furthermore, in a case that the AMF transmits and/or receives "failed" or "success" as an authentication result, and further stores the S-NSSAI included in the pending NSSAI, the S-NSSAI being transmitted and/or received by the UE_A 10 together with the authentication result, or may store the S-NSSAI as the mapped S-NSSAI of the S-NSSAI included in the pending NSSAI, then the UE_A 10 may delete the S-NSSAI from the pending NSSAI or delete, from the pending NSSAI, the S-NSSAI associated with the S-NSSAI.

Based on the transmission and/or reception of the authentication result, the UE may store the authentication result for each piece of S-NSSAI. Specifically, for example, in a case of transmitting and/or receiving "success" as the authentication result, the UE may store, as information regarding the UE, information indicating a state of "success" on the NSSAA in association with the S-NSSAI transmitted and/or received together with the authentication result. Similarly, in a case of transmitting and/or receiving "failure" as the authentication result, the UE may store, as information regarding the UE, information indicating a state of "failure" on the NSSAA in association with the S-NSSAI transmitted and/or received together with the authentication result.

Based on the completion of the present procedure, each apparatus may perform processing based on update of the stored information. For example, based on the completion of the present procedure, the AFM may initiate the UE configuration update procedure or a network initiated de-registration procedure in a case that the S-NSSAI included in the allowed NSSAI and/or the rejected NSSAI for the UE is changed. The AMF may use the UE configuration update procedure to notify the UE of new allowed NSSAI and new rejected NSSAI. The AMF may use the network initiated de-registration procedure to notify the UE of new rejected NSSAI.

3.4. UE Configuration Update Procedure

Figure 8:
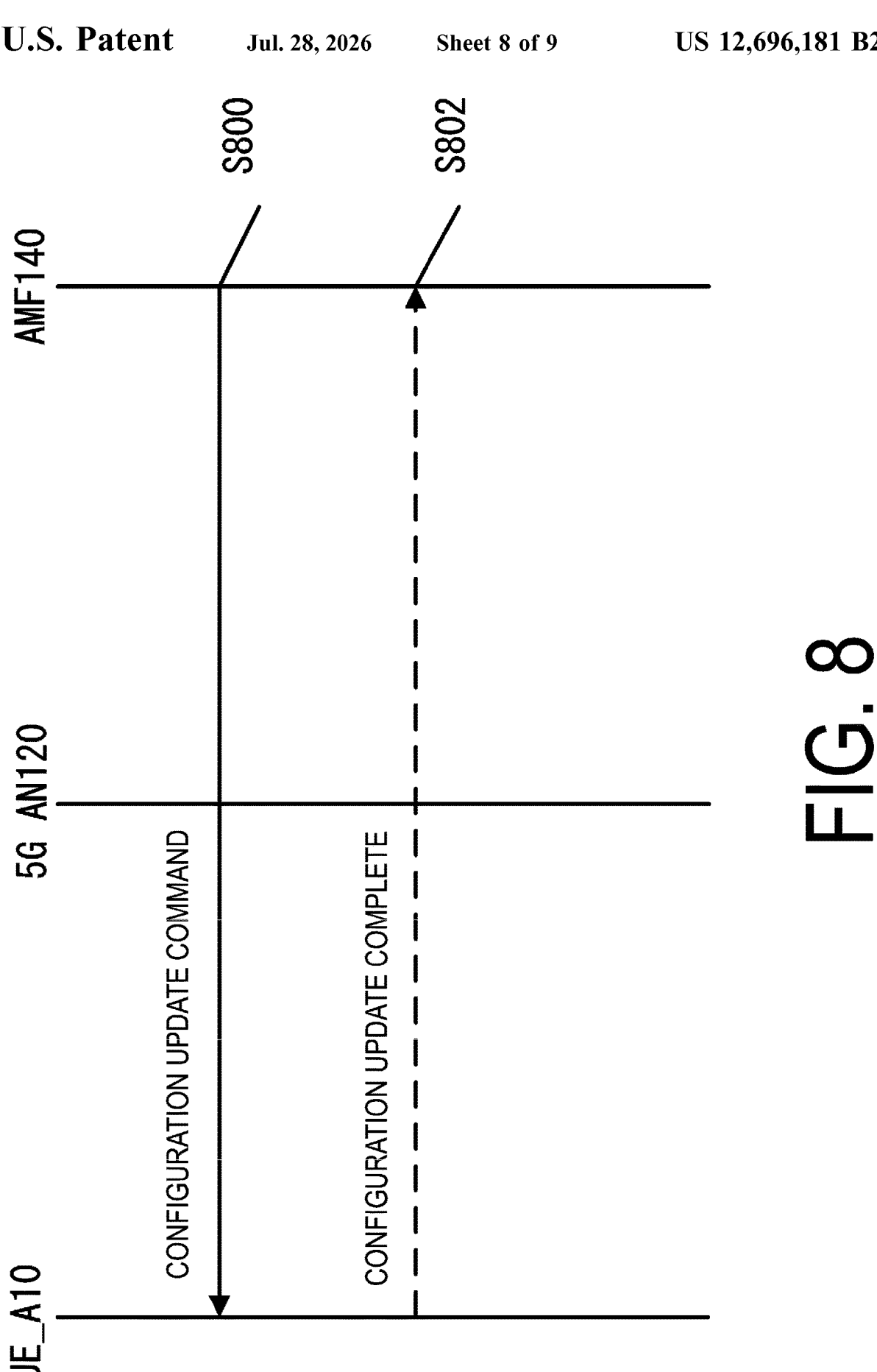
FIG. 8 is a diagram illustrating a UE configuration modification/update procedure.

Next, the UE configuration update procedure (Generic UE configuration update procedure) will be described with reference to FIG. 8. The UE configuration update procedure is hereinafter also referred to as the present procedure. The present procedure is a procedure for the core network to update configuration information of the UE. The present procedure may be a procedure for mobility management that is initiated by the network with respect to the UE registered with the network.

In addition, the apparatus in the core network, such as the AMF, may initiate the present procedure, based on update of a configuration of the network and/or update of an operator policy. Note that a trigger of the present procedure may be detection of mobility of the UE, may be detection of state change of the UE, and/or the access network, and/or the core network, or may be state change of the network slice. In addition, the trigger of the present procedure may be reception of a request from the DN and/or an application server of the DN, change of a configuration of the network, or may be change of an operator policy. Furthermore, the trigger of the present procedure may be expiration of the running timer. Note that the trigger for the apparatus in the core network to initiate the present procedure is not limited to these. In other words, the present procedure may be performed at any timing after the above-described registration procedure and/or PDU session establishment procedure completes. In addition, the present procedure may be performed at any timing on the condition that each apparatus is in a state in which each apparatus has established a 5GMM context and/or each apparatus is in a state in which each apparatus is in the 5GMM connected mode.

During the present procedure, each apparatus may transmit and/or receive a message including identification information for changing configuration information of the UE and/or identification information for stopping or changing the function being performed by the UE. In addition, based on completion of the present procedure, each apparatus may update the configuration information to a configuration indicated by the network, or may start behaviour indicated by the network.

The UE may update the configuration information of the UE, based on the control information transmitted and/or received in the present procedure. In addition, the UE may stop the function being performed, or may start a new function, along with the update of the configuration information of the UE. In other words, the apparatus in the core network may initiate the present procedure and further transmit a control message and control information of the present procedure to the UE so as to cause the UE to update the configuration information of the UE that can be identified using these pieces of control information. In addition, by causing update of the configuration information of the UE, the apparatus in the core network may cause stop of the function being performed by the UE, or may cause the UE to start a new function.

First, the AMF 140 transmits the Configuration update command message to the UE_A 10 via the 5G AN 120 (or the gNB) (S800), and thereby initiates the UE configuration update procedure.

The AMF 140 may further include and transmit, in the configuration update command message, at least one of the NSSAIs related to the UE_A 10 (hereinafter meaning the configured NSSAI, the allowed NSSAI, and/or the rejected NSSAI, and/or the pending NSSAI, and the first NSSAI). Note that, by transmitting one or more of the NSSAIs, the AMF may indicate new UE configuration information, or may request update of the UE configuration information. Note that information indicating support of each function and information indicating a request for use of each function may be transmitted and/or received as the same piece of identification information, or may be transmitted and/or received as different pieces of identification information.

Furthermore, the AMF 140 may include and transmit, in the configuration update command message, the TAI list indicating the new registration area.

Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

Note that the AMF 140 may select and determine whether to include the NSSAIs and the TAI list in the configuration update command message, based on each piece of identification information received, and/or the subscriber information, and/or the capability information of the network, and/or the operator policy, and/or the state of the network, and/or the registration information of the user, and/or the context held in the AMF 140, and/or the like.

By transmitting the configuration update command message, based on each piece of received identification information, and/or subscriber information, and/or capability information of the network, and/or an operator policy, and/or a state of the network, and/or registration information of a user, and/or a context stored in the AMF 140, and/or the like, the AMF 140 may indicate a request for update of the configuration information of the UE_A 10.

The UE_A 10 receives the configuration update command message from the AMF 140 via the 5G AN 120 (or gNB) (S800). The UE_A 10 may update the configuration information of the UE, based on the configuration update command message, and/or identification information included in the configuration update command message.

In a case of receiving a TAI list, the UE_A 10 enables the received TAI list, and in a case that the UE_A 10 already stores a valid TAI list, the UE_A 10 may delete or disable the old TAI list. The valid TAI list may hereinafter be represented as the registration area below. Note that in a case that the UE_A 10 does not store a valid TAI list, and does not receive a TAI list from the core network during the present procedure, no valid TAI list needs to be stored.

The UE_A 10 may appropriately store each received NSSAI. Specifically, in a case of receiving configured NSSAI, the UE_A 10 may store the received configured NSSAI as "configured NSSAI associated with the current PLMN." In other words, the UE_A 10 may replace the "configured NSSAI associated with the current PLMN stored by the UE_A 10" with the "received configured NSSAI."

Furthermore, in a case of receiving the configured NSSAI, the UE_A 10 may delete mapped S-NSSAI of S-NSSAI included in the "configured NSSAI associated with the current PLMN stored by the UE_A 10." Furthermore, in a case that the "received configured NSSAI" includes one or multiple mapped S-NSSAIs, the UE_A 10 may store the one or multiple mapped S-NSSAIs.

Furthermore, in a case that the UE_A 10 receives the configured NSSAI, the UE_A 10 may delete the "rejected NSSAI stored by the UE_A 10 and associated with the current PLMN."

Alternatively, in a case of receiving the configured NSSAI, the UE_A 10 may delete at least one of the "first rejected NSSAI stored by the UE_A 10 and associated with the current PLMN," the "second rejected NSSAI stored by the UE_A 10 and associated with the current PLMN," and the "third rejected NSSAI stored by the UE_A 10 and associated with the current PLMN."

Furthermore, in a case of receiving the configured NSSAI, the UE_A 10 may delete the "first NSSAI stored by the UE_A 10," the "first NSSAI stored by the UE_A 10 and associated with the current PLMN," and/or one or multiple "first NSSAIs stored by the UE_A 10 and associated with the EPLMN of the current PLMN."

Furthermore, in a case of receiving the configured NSSAI, the UE_A 10 may delete the "pending NSSAI stored by the UE_A 10," and/or the "pending NSSAI stored by the UE_A 10 and associated with the current PLMN," and/or one or multiple "first pending NSSAIs stored by the UE_A 10 and associated with the EPLMN of the current PLMN."

Furthermore, in a case of receiving the allowed NSSAI, the UE_A 10 may store the received allowed NSSAI as "allowed NSSAI associated with the current PLMN and the current access type." In other words, the UE_A 10 may replace the "allowed NSSAI associated with the current PLMN and the current access type" stored by the UE_A 10 with the "received allowed NSSAI".

Furthermore, in a case that the UE_A 10 receives a TAI list and the allowed NSSAI from the new AMF 141, and at least one TAI included in the TAI list belongs to the EPLMN, then the UE_A 10 may store the received allowed NSSAI as "allowed NSSAI associated with the EPLMN to which the TAI included in the TAI list belongs and with the current access type." Note that in a case of storing the allowed NSSAI, the UE_A 10 may store the allowed NSSAI in association with the registration area, or may store, in association with the registration area, the S-NSSAI included in the allowed NSSAI.

Furthermore, in a case that the UE_A 10 receives the allowed NSSAI, the UE_A 10 may delete the mapped S-NSSAI of S-NSSAI included in the "allowed NSSAI deleted based on reception" or the "old allowed NSSAI updated based on reception." Furthermore, in a case that mapped S-NSSAIs are included in the "allowed NSSAI received" by the UE_A 10, the UE_A 10 may store one or multiple mapped S-NSSAIs.

However, in a case of receiving the S-NSSAI included in the pending NSSAI, the S-NSSAI being included in the old allowed NSSAI, the UE_A 10 need not delete the mapped S-NSSAI of the S-NSSAI.

In a case of receiving the MM message including the allowed NSSAI and the pending NSSAI, the UE_A 10 may perform control based on reception of the pending NSSAI before control based on reception of the allowed NSSAI.

Specifically, in a case that the old allowed NSSAI stored by the UE_A 10 includes S-NSSAI #1, and the UE_A 10 receives, from the network, the pending NSSAI including S-NSSAI #1 and the new allowed NSSAI not including S-NSSAI #1, the UE_A 10 may perform update of each stored NSSAI based on reception of the pending NSSAI prior to update of each stored NSSAI based on reception of the allowed NSSAI.

Similarly, in a case of receiving the MM message including the allowed NSSAI and the rejected NSSAI, the UE_A 10 may perform control based on reception of the rejected NSSAI prior to control based on reception of allowed NSSAI.

Specifically, in a case that the old allowed NSSAI stored by the UE_A 10 includes S-NSSAI #1, and the UE_A 10 receives, from the network, the rejected NSSAI including S-NSSAI #2 corresponding to mapped S-NSSAI of S-NSSAI #1, and the new allowed NSSAI not including S-NSSAI #1, the UE_A 10 may perform update of each stored NSSAI based on reception of the rejected NSSAI prior to update of each stored NSSAI based on reception of the allowed NSSAI.

Furthermore, in a case of receiving the allowed NSSAI, the UE_A 10 may delete the S-NSSAI of the "rejected NSSAI stored by the UE_A 10 and associated with the current PLMN."

Specifically, in a case of receiving the allowed NSSAI, the UE_A 10 may delete the S-NSSAI included in the received allowed NSSAI and/or the mapped S-NSSAI of the received allowed NSSAI from at least one of the "first rejected NSSAI stored by the UE_A 10 and associated with the current PLMN," the "second rejected NSSAI stored by the UE_A 10 and associated with the current PLMN," the "second rejected NSSAI stored by the UE_A 10 and associated with the current PLMN and with the current registration area," and the "third rejected NSSAI stored by the UE_A 10 and associated with the current PLMN" or may delete, from all the NSSAIs, the S-NSSAI included in the received allowed NSSAI and/or the mapped S-NSSAI of the allowed NSSAI.

Furthermore, in a case of receiving the allowed NSSAI, the UE_A 10 may delete the S-NSSAI included in the received allowed NSSAI from the "pending NSSAI stored by the UE_A 10 and associated with the current PLMN." Furthermore, in a case of receiving the allowed NSSAI, the UE_A 10 may delete the mapped S-NSSAI or S-NSSAI included in the received allowed NSSAI from the "pending NSSAI stored by the UE_A 10 and associated with all the PLMNs." Furthermore, in a case of receiving the allowed NSSAI, the UE_A 10 may delete the S-NSSAI included in the received allowed NSSAI from the "pending NSSAI stored by the UE_A 10 and associated with the EPLMN."

Here, in the roaming scenario, in a case that the S-NSSAI included in the pending NSSAI is S-NSSAI of the HPLMN, and the UE_A 10 receives the allowed NSSAI, the UE_A 10 may delete, from the "pending NSSAI stored by the UE_A 10," the mapped S-NSSAI of the S-NSSAI included in the received new allowed NSSAI. At this time, in the roaming scenario, the allowed NSSAI is associated with the PLMN ID or the SNPN ID, indicating the current PLMN or the current SNPN, in other words, the RPLMN or the RSNPN, whereas the S-NSSAI included in the pending NSSAI may be the S-NSSAI of the HPLMN.

Furthermore, in a case of receiving the allowed NSSAI, the UE_A 10 may delete the S-NSSAI included in the received allowed NSSAI from the "first NSSAI stored by the UE_A 10 and associated with the current PLMN." Alternatively, in a case of receiving the allowed NSSAI, the UE_A 10 may delete the mapped S-NSSA or S-NSSAI included in the received allowed NSSAI from the "first NSSAI stored by the UE_A 10 and associated with all the PLMNs."

Furthermore, in a case of receiving the rejected NSSAI, the UE_A 10 may store the S-NSSAI included in the received rejected NSSAI as appropriate rejected NSSAI based on the reject cause value with which the S-NSSAI is associated. In other words, the UE_A 10 may add the "S-NSSAI included in the received rejected NSSAI" to the rejected NSSAI stored by the UE_A 10.

Specifically, in a case of receiving the reject cause value "S-NSSAI not available in the current PLMN or SNPN," and the rejected S-NSSAI associated with the reject cause value, the UE_A 10 may add the S-NSSAI to the first rejected NSSAI associated with the current PLMN.

Furthermore, in a case of receiving the reject cause value "S-NSSAI not available in the current registration area" and the rejected S-NSSAI associated with the reject cause value, the UE_A 10 may add the "received rejected S-NSSAI" to the "second rejected NSSAI associated with the current PLMN and the current registration area."

Furthermore, in a case of receiving the reject cause value "S-NSSAI not available due to the failed or revoked NSSAA" and the rejected S-NSSAI associated with the reject cause value, the UE_A 10 may add the "received rejected S-NSSAI" to the "third rejected NSSAI." At this time, the "third rejected NSSAI" may be associated with the current PLMN, or may be common to all PLMNs.

Note that in a case that the UE_A 10 receives the TAI list together with the rejected NSSAI, the current registration area is indicated by the received TAI list. On the other hand, in a case that the UE_A 10 does not receive the TAI list together with the rejected NSSAI, the current registration area is indicated by the TAI list previously received and stored by the UE_A 10.

Furthermore, in a case of receiving the reject cause value "S-NSSAI not available due to the failed or revoked NSSAA" and the rejected NSSAI including the rejected S-NSSAI associated with the reject cause value, the UE_A 10 may add and/or store the S-NSSAI to the third rejected NSSAI. Note that in a case of storing the third rejected NSSAI associated with the current PLMN, then the UE may add and/or store the received S-NSSAI to and/or in the third rejected NSSAI associated with the current PLMN.

Furthermore, in a case of receiving the rejected NSSAI, the UE_A 10 may delete the S-NSSAI included in the received rejected NSSAI from the "allowed NSSAI stored by the UE_A 10 and associated with the current PLMN."

Here, in a case that the UE_A 10 receives the rejected NSSAI including the S-NSSAI of the HPLMN, and further the rejected NSSAI received by the UE_A 10 includes the mapped S-NSSAI of the S-NSSAI included in the "allowed NSSAI stored by the UE_A 10 and associated with the current PLMN," the UE_A 10 may delete the S-NSSAI from the "allowed NSSAI stored by the UE_A 10 and associated with the current PLMN."

Furthermore, in a case of receiving the rejected NSSAI, the UE_A 10 may delete the S-NSSAI included in the received rejected NSSAI from the "pending NSSAI stored by the UE_A 10 and associated with the current PLMN." Furthermore, in a case of receiving the rejected NSSAI, the UE_A 10 may delete the mapped S-NSSA or S-NSSAI included in the received allowed NSSAI, from the "pending NSSAI stored by the UE_A 10 and associated with all the PLMNs." Furthermore, in a case of receiving the rejected NSSAI, the UE_A 10 may delete the S-NSSAI included in the received allowed NSSAI from the "pending NSSAI stored by the UE_A 10 and associated with the EPLMN."

Furthermore, in a case of receiving the allowed NSSAI, the UE_A 10 may delete the S-NSSAI included in the received allowed NSSAI from the "first NSSAI stored by the UE_A 10 and associated with the current PLMN." Alternatively, in a case of receiving the allowed NSSAI, the UE_A 10 may delete the mapped S-NSSA or S-NSSAI included in the received allowed NSSAI from the "first NSSAI stored by the UE_A 10 and associated with all the PLMNs."

Furthermore, in a case of receiving the rejected NSSAI, the UE_A 10 may delete the S-NSSAI included in the received rejected NSSAI from the "pending NSSAI stored by the UE_A 10 and associated with the current PLMN." Furthermore, in a case of receiving the rejected NSSAI, the UE_A 10 may delete the mapped S-NSSA or S-NSSAI included in the received allowed NSSAI, from the "pending NSSAI stored by the UE_A 10 and associated with all the PLMNs." Furthermore, in a case of receiving the rejected NSSAI, the UE_A 10 may delete the S-NSSAI included in the received allowed NSSAI from the "pending NSSAI stored by the UE_A 10 and associated with the EPLMN."

Note that during roaming, in a case that the S-NSSAI included in the rejected NSSAI (one of the first to third rejected NSSAIs) is the S-NSSAI of the HPLMN and the pending NSSAI stored by the UE is the S-NSSAI of the current PLMN (in other words, the VPLMN), and that the UE_A 10 receives the rejected NSSAI, and that the rejected NSSAI includes the mapped S-NSSAI of certain S-NSSAI included in the "pending NSSAI stored by the UE_A 10 and associated with the current PLMN," then the UE_A 10 may delete the S-NSSAI from the "pending NSSAI stored by the UE_A 10 and associated with the current PLMN."

Alternatively, during roaming, in a case that the S-NSSAI included in the rejected NSSAI (one of the first to third rejected NSSAIs) is the S-NSSAI of the HPLMN and the pending NSSAI stored by the UE is also the S-NSSAI of the HPLMN, in a case of receiving the rejected NSSAI, the UE_A 10 may delete the S-NSSAI included in the received rejected NSSAI from the "pending NSSAI stored by the UE_A 10 and associated with the current PLMN."

Alternatively, during roaming, in a case that the S-NSSAI included in the rejected NSSAI (one of the first to third rejected NSSAIs) is the S-NSSAI of the current PLMN (in other words, the VPLMN) and the pending NSSAI stored by the UE is the S-NSSAI of the HPLMN, and that the UE_A 10 receives the rejected NSSAI, and that the certain S-NS- SAI included in the "pending NSSAI stored by the UE_A 10" is the mapped S-NSSAI of the rejected NSSAI or the mapped S-NSSAI of the S-NSSAI included in the rejected NSSAI, the UE_A 10 may delete the S-NSSAI from the "pending NSSAI stored by the UE_A 10." Furthermore, in a case of receiving the rejected NSSAI, the UE_A 10 may delete the S-NSSAI included in the received rejected NSSAI from the "first NSSAI stored by the UE_A 10 and associated with the current PLMN." Furthermore, in a case of receiving the rejected NSSAI, the UE_A 10 may delete the mapped S-NSSA or S-NSSAI included in the received allowed NSSAI from the "first NSSAI stored by the UE_A 10 and associated with all the PLMNs." Furthermore, in a case of receiving the rejected NSSAI, the UE_A 10 may delete the S-NSSAI included in the received allowed NSSAI from the "first NSSAI stored by the UE_A 10 and associated with the EPLMN."

Furthermore, in a case of receiving the pending NSSAI, the UE_A 10 may replace the pending NSSAI stored by the UE_A 10 with the new pending NSSAI. Specifically, in a case of receiving the pending NSSAI included in the registration accept message during the registration procedure for the current PLMN or SNPN, the UE_A 10 may replace, with the new pending NSSAI, the pending NSSAI associated with the current PLMN or SNPN stored by the UE_A 10.

Alternatively, in a case that the S-NSSAI included in the pending NSSAI is the S-NSSAI of the HPLMN, and that the UE_A 10 receives the pending NSSAI included in the registration accept message during the registration procedure for the current PLMN or SNPN, the UE_A 10 may replace the pending NSSAI stored by the UE_A 10 with the new pending NSSAI.

Furthermore, in a case of storing the mapped S-NSSAI of the pending NSSAI, the UE_A 10 may delete the mapped S-NSSAI of the pending NSSAI, store the mapped S-NSSAI of the new pending NSSAI, or perform both processing operations.

Note that the mapped S-NSSAI of the pending NSSAI may be stored based on the mapped S-NSSAI of the old allowed NSSAI.

Note that each type of processing performed by the UE_A 10 based on reception of each piece of identification information described above may be performed during the present procedure or after completion of the present procedure or may be performed based on completion of the present procedure after completion of the present procedure. Furthermore, the UE may transmit a Configuration update complete message to the AMF 140 via the 5G AN (gNB) as a response message to the configuration update command message, based on the identification information included in the configuration update command message (S802).

In a case that the UE_A 10 transmits the configuration update complete command message, the AMF 140 receives the configuration update complete message via the 5G AN (gNB) (S802). Each apparatus completes the present procedure, based on transmission and/or reception of the configuration update command message and/or the configuration update complete message.

In addition, based on completion of the present procedure, each apparatus may perform processing based on information transmitted and/or received in the present procedure. For example, in a case that update information for configuration information is transmitted and/or received, each apparatus may update the configuration information. In addition, in a case that information indicating that the registration procedure needs to be performed is transmitted and/or received, the UE_A 10 may initiate the registration procedure, based on completion of the present procedure.

In addition, based on completion of the present procedure, the UE_A 10 may store identification information received together with the configuration information command message, or may recognize determination of the network. Based on the completion of the present procedure, the UE may perform each procedure based on the stored information.

In the above-described procedure, by transmitting and/or receiving the configuration update command message, the apparatuses in the core network can indicate to the UE to update the configuration information already applied by the UE and indicate to the UE to stop or change the function performed by the UE.

3.5. De-registration Procedure Initiated by Network

Figure 9:
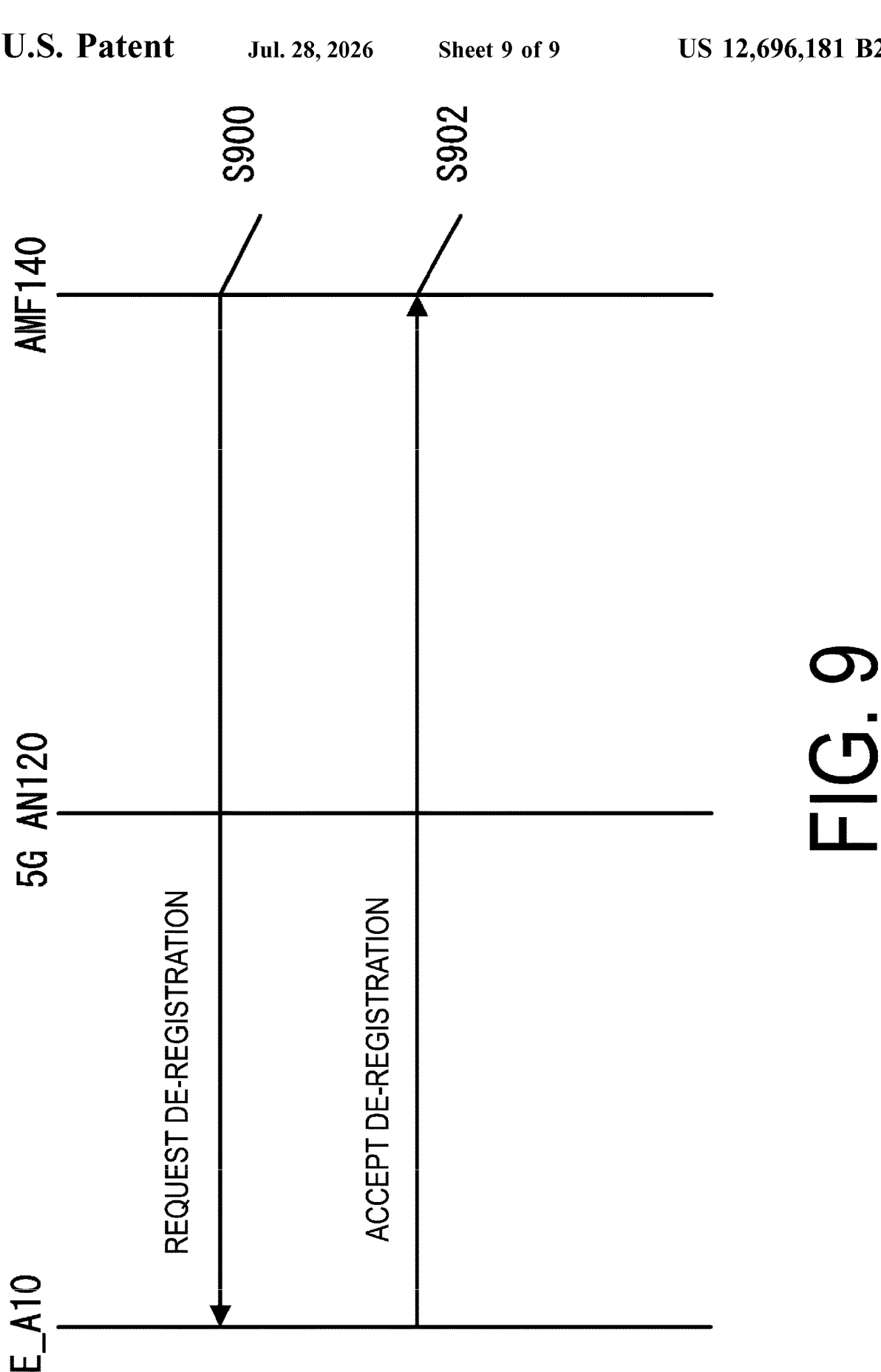
FIG. 9 is a diagram illustrating a de-registration procedure initiated by a network.

Now, a Network-initiated de-registration procedure will be described by using FIG. 9. Hereinafter, the present procedure will refer to the Network-initiated de-registration procedure. The Network-initiated de-registration procedure is a procedure for de-registering with the access network A, and/or the core network A, the access network B, and/or the core network B, and/or the DN, and/or the PDN, the procedure being manually activated by the network. The present procedure may be a procedure for mobility management that is initiated by the network with respect to the UE registered with the network.

The AMF can perform the present procedure at any timing as long as the UE is in a state of being registered with the network (RM-REGISTERED state or 5GMM-REGISTERED state). For example, the AMF may initiate the present procedure in response to the update of the registration information of the UE. More specifically, based on the completion of the NSSAA procedure, the AMF may initiate the present procedure in a case that the UE registration information lacks the allowed NSSAI. In other words, the AMF may initiate the present procedure in a case that no S-NSSAI is available that is allowed for the UE and that no S-NSSAI is scheduled to be added to the allowed NSSAI in the future by any other procedure (for example, the NSSAA procedure).

First, the AMF 140 may initiate the present procedure by transmitting a De-registration request message to the UE_A 10 (S900). In this regard, the De-registration request message is a NAS message transmitted and/or received on the N1 interface. However, between the UE and the 5G AN (gNB), the De-registration reject message is included and transmitted and/or received in the RRC message.

The AMF 140 may include and transmit, in the de-registration request message, at least one piece of identification information of the NSSAI (hereinafter, referred to as the rejected NSSAI, and the pending NSSAI, and the first NSSAI). The AMF may further include and transmit a cause value and/or information indicating the access type for de-registration, in the de-registration request message. In this regard, the cause value may be 5GMM cause. Furthermore, in a case that the present procedure is initiated based on the result of the NSSAA procedure or due to the completion of the NSSAA, the cause value may be a value indicating that there is no network slice available. This may correspond to 5GMM cause value #62 "No network slices available" in the 5GS.

Note that by transmitting these pieces of identification information and/or the de-registration message, the AMF 140 may indicate that the network does not support each function, or request a transition to the deregistered state, or notify a change of the AMF 140, or subsequently indicate initiation of the registration procedure, or indicate information obtained by combing the above-described pieces of information. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

Based on the reception of at least one of the NSSAIs, and/or the reception of the cause value, and/or the reception of other identification information, and/or the state of the UE, the UE_A 10 may recognize and store the rejected S-NSSAI and the cause of the rejection and determine the behaviour of the UE.

Furthermore, in a case of receiving the rejected NSSAI, the UE_A 10 may store the S-NSSAI included in the received rejected NSSAI as appropriate rejected NSSAI based on the reject cause value with which the S-NSSAI is associated. In other words, the UE_A 10 may add the "S-NSSAI included in the received rejected NSSAI" to the rejected NSSAI stored by the UE_A 10.

Specifically, in a case of receiving the reject cause value "S-NSSAI not available in the current PLMN or SNPN," and the rejected S-NSSAI associated with the reject cause value, the UE_A 10 may add the S-NSSAI to the first rejected NSSAI associated with the current PLMN.

Furthermore, in a case of receiving the reject cause value "S-NSSAI not available in the current registration area" and the rejected S-NSSAI associated with the reject cause value, the UE_A 10 may add the "received rejected S-NSSAI" to the "second rejected NSSAI associated with the current PLMN and the current registration area."

Furthermore, in a case of receiving the reject cause value "S-NSSAI not available due to the failed or revoked NSSAA" and the rejected S-NSSAI associated with the reject cause value, the UE_A 10 may add the "received rejected S-NSSAI" to the "third rejected NSSAI." At this time, the "third rejected NSSAI" may be associated with the current PLMN, or may be common to all PLMNs.

Note that in a case that the UE_A 10 receives the TAI list together with the rejected NSSAI, the current registration area is indicated by the received TAI list. On the other hand, in a case that the UE_A 10 does not receive the TAI list together with the rejected NSSAI, the current registration area is indicated by the TAI list previously received and stored by the UE_A 10.

Furthermore, in a case of receiving the reject cause value "S-NSSAI not available due to the failed or revoked NSSAA" and the rejected NSSAI including the rejected S-NSSAI associated with the reject cause value, the UE_A 10 may add and/or store the S-NSSAI to the third rejected NSSAI. Note that in a case of storing the third rejected NSSAI associated with the current PLMN, then the UE may add and/or store the received S-NSSAI to and/or in the third rejected NSSAI associated with the current PLMN.

Furthermore, in a case of receiving the rejected NSSAI, the UE_A 10 may delete the S-NSSAI included in the received rejected NSSAI from the "allowed NSSAI stored by the UE_A 10 and associated with the current PLMN."

Here, in a case that the UE_A 10 receives the rejected NSSAI including the S-NSSAI of the HPLMN, and further the rejected NSSAI received by the UE_A 10 includes the mapped S-NSSAI of the S-NSSAI included in the "allowed NSSAI stored by the UE_A 10 and associated with the current PLMN," the UE_A 10 may delete the S-NSSAI from the "allowed NSSAI stored by the UE_A 10 and associated with the current PLMN."

Furthermore, in a case of receiving the rejected NSSAI, the UE_A 10 may delete the S-NSSAI included in the received rejected NSSAI from the "pending NSSAI stored by the UE_A 10 and associated with the current PLMN." Furthermore, in a case of receiving the rejected NSSAI, the UE_A 10 may delete the mapped S-NSSA or S-NSSAI included in the received allowed NSSAI, from the "pending NSSAI stored by the UE_A 10 and associated with all the PLMNs." Furthermore, in a case of receiving the rejected NSSAI, the UE_A 10 may delete the S-NSSAI included in the received allowed NSSAI from the "pending NSSAI stored by the UE_A 10 and associated with the EPLMN."

Furthermore, in a case of receiving the allowed NSSAI, the UE_A 10 may delete the S-NSSAI included in the received allowed NSSAI from the "first NSSAI stored by the UE_A 10 and associated with the current PLMN." Alternatively, in a case of receiving the allowed NSSAI, the UE_A 10 may delete the mapped S-NSSA or S-NSSAI included in the received allowed NSSAI from the "first NSSAI stored by the UE_A 10 and associated with all the PLMNs."

Furthermore, in a case of receiving the rejected NSSAI, the UE_A 10 may delete the S-NSSAI included in the received rejected NSSAI from the "pending NSSAI stored by the UE_A 10 and associated with the current PLMN." Furthermore, in a case of receiving the rejected NSSAI, the UE_A 10 may delete the mapped S-NSSA or S-NSSAI included in the received allowed NSSAI, from the "pending NSSAI stored by the UE_A 10 and associated with all the PLMNs." Furthermore, in a case of receiving the rejected NSSAI, the UE_A 10 may delete the S-NSSAI included in the received allowed NSSAI from the "pending NSSAI stored by the UE_A 10 and associated with the EPLMN."

Note that during roaming, in a case that the S-NSSAI included in the rejected NSSAI (one of the first to third rejected NSSAIs) is the S-NSSAI of the HPLMN and the pending NSSAI stored by the UE is the S-NSSAI of the current PLMN (in other words, the VPLMN), and that the UE_A 10 receives the rejected NSSAI, and that the rejected NSSAI includes the mapped S-NSSAI of certain S-NSSAI included in the "pending NSSAI stored by the UE_A 10 and associated with the current PLMN," then the UE_A 10 may delete the S-NSSAI from the "pending NSSAI stored by the UE_A 10 and associated with the current PLMN."

Alternatively, during roaming, in a case that the S-NSSAI included in the rejected NSSAI (one of the first to third rejected NSSAIs) is the S-NSSAI of the HPLMN and the pending NSSAI stored by the UE is also the S-NSSAI of the HPLMN, in a case of receiving the rejected NSSAI, the UE_A 10 may delete the S-NSSAI included in the received rejected NSSAI from the "pending NSSAI stored by the UE_A 10 and associated with the current PLMN."

Alternatively, during roaming, in a case that the S-NSSAI included in the rejected NSSAI (one of the first to third rejected NSSAIs) is the S-NSSAI of the current PLMN (in other words, the VPLMN) and the pending NSSAI stored by the UE is the S-NSSAI of the HPLMN, and that the UE_A 10 receives the rejected NSSAI, and that the certain S-NS-SAI included in the "pending NSSAI stored by the UE_A 10" is the mapped S-NSSAI of the rejected NSSAI or the mapped S-NSSAI of the S-NSSAI included in the rejected NSSAI, the UE_A 10 may delete the S-NSSAI from the "pending NSSAI stored by the UE_A 10."

Furthermore, in a case of receiving the rejected NSSAI, the UE_A 10 may delete the S-NSSAI included in the received rejected NSSAI from the "first NSSAI stored by the UE_A 10 and associated with the current PLMN." Furthermore, in a case of receiving the rejected NSSAI, the UE_A 10 may delete the mapped S-NSSA or S-NSSAI included in the received allowed NSSAI from the "first NSSAI stored by the UE_A 10 and associated with all the PLMNs." Furthermore, in a case of receiving the rejected NSSAI, the UE_A 10 may delete the S-NSSAI included in the received allowed NSSAI from the "first NSSAI stored by the UE_A 10 and associated with the EPLMN."

Furthermore, in a case of receiving the pending NSSAI, the UE_A 10 may replace the pending NSSAI stored by the UE_A 10 with the new pending NSSAI. Specifically, in a case of receiving the pending NSSAI included in the registration accept message during the registration procedure for the current PLMN or SNPN, the UE_A 10 may replace, with the new pending NSSAI, the pending NSSAI associated with the current PLMN or SNPN stored by the UE_A 10.

Alternatively, in a case that the S-NSSAI included in the pending NSSAI is the S-NSSAI of the HPLMN, and that the UE_A 10 receives the pending NSSAI included in the registration accept message during the registration procedure for the current PLMN or SNPN, the UE_A 10 may replace the pending NSSAI stored by the UE_A 10 with the new pending NSSAI.

Furthermore, in a case of storing the mapped S-NSSAI of the pending NSSAI, the UE_A 10 may delete the mapped S-NSSAI of the pending NSSAI, store the mapped S-NSSAI of the new pending NSSAI, or perform both processing operations.

Note that the mapped S-NSSAI of the pending NSSAI may be stored based on the mapped S-NSSAI of the old allowed NSSAI.

Note that each type of processing performed by the UE_A 10 based on reception of each piece of identification information described above may be performed during the present procedure or after completion of the present procedure or may be performed based on completion of the present procedure after completion of the present procedure.

The UE_A 10 receives the de-registration request message via the 5G AN (gNB). The UE_A 10 receives the de-registration request message to recognize the contents of various types of identification information included in the de-registration request message.

In response to the reception of the de-registration request message, the UE_A 10 may transmit the de-registration accept message (DEREGISTRATION ACCEPT message) to the AMF 140 via the 5G AN (or gNB). Note that the de-registration accept message is a NAS message transmitted and/or received over the N1 interface. The RRC message may be a control message transmitted and/or received between the UE and the 5G AN (or the gNB).

Note that each apparatus may transition to a state in which the UE is not registered with the network (an RM_DEREGISTERED state or a 5GMM-DEREGISTERED state) based on the transmission and/or reception of the registration accept message. The transition of each apparatus to each state may be based on the completion of the present procedure.

Furthermore, each apparatus may perform processing based on the information transmitted and/or received in the present procedure based on the completion of the de-registration procedure. For example, the UE_A 10 may initiate the registration procedure based on the completion of the de-registration procedure.

4. Embodiments in Present Invention

Embodiments in the present invention may be a combination of one or more procedures described in Chapter 3. For example, in the present embodiment, after completion of the initial registration procedure described in Chapter 3, the NSSAA procedure may be performed, and the UE configuration update procedure may be performed. Furthermore, the apparatuses (UE and intra-core network apparatuses) may perform one or more of the moving and regular registration procedures based on the completion of the initial registration procedure. Alternatively, after completion of the initial registration procedure described in Chapter 3, the NSSAA procedure may be performed, and the network-initiated de-registration procedure may be performed.

An example of an embodiment of the present invention will be described below. Note that the apparatuses may perform the behaviour of the multiple embodiments described below in combination.

Specifically, the behaviour of each apparatus during transmission and/or reception of the allowed NSSAI may be performed in accordance with the first embodiment, and the behaviour of each apparatus during transmission and/or reception of the second rejected NSSAI may be performed in accordance with the second embodiment. Alternatively, the behaviour of each apparatus during transmission and/or reception of the allowed NSSAI may be performed in accordance with the first embodiment, and the behaviour of each apparatus during transmission and/or reception of the second rejected NSSAI may be performed in accordance with the third embodiment.

Alternatively, the behaviour of each apparatus during transmission and/or reception of the allowed NSSAI may be performed in accordance with the second embodiment, and the behaviour of each apparatus during transmission and/or reception of the second rejected NSSAI may be performed in accordance with the first embodiment. The behaviour of each apparatus during transmission and/or reception of the allowed NSSAI may be performed in accordance with the second embodiment, and the behaviour of each apparatus during transmission and/or reception of the second rejected NSSAI may be performed in accordance with the third embodiment.

Alternatively, the behaviour of each apparatus during transmission and/or reception of the allowed NSSAI may be performed in accordance with the third embodiment, and the behaviour of each apparatus during transmission and/or reception of the second rejected NSSAI may be performed in accordance with the first embodiment. The behaviour of each apparatus during transmission and/or reception of the allowed NSSAI may be performed in accordance with the third embodiment, and the behaviour of each apparatus during transmission and/or reception of the second rejected NSSAI may be performed in accordance with the second embodiment.

4.1. First Embodiment

The first embodiment (hereinafter referred to as the present embodiment) will be described below. In the present embodiment, an example of behaviour of each apparatus will be described that is performed, during roaming, in a case that the S-NSSAI included in the third rejected NSSAI is the S-NSSAI of the HPLMN, and that the pending NSSAI is the S-NSSAI of the current PLMN (RPLMN and VPLMN), and that further the UE manages and/or stores the mapped S-NSSAI of the pending NSSAI.

Specifically, a case will be described where the UE, storing the pending NSSAI, receives the third rejected NSSAI from the network.

First, in the first registration procedure for the VPLMN, the UE initiates the registration procedure by including S-NSSAI #1, corresponding to the S-NSSAI of the VPLMN, in the registration request message, and transmitting the registration request message to the VPLMN. At this time, the UE may also include mapped S-NSSAI #2 of S-NSSAI #1 in the registration request message for transmission.

Then, the UE receives, from the VPLMN, the pending NSSAI including S-NSSAI #1.

The UE includes, in the pending NSSAI, S-NSSAI #1 included in the pending NSSAI and stores the S-NSSAI #1. At this time, the UE does not delete, from storage, S-NSSAI #2, corresponding to the mapped S-NSSAI of S-NSSAI #1, or the UE stores S-NSSAI #2.

Then, the UE receives, from the VPLMN, the MM message including the third rejected NSSAI including S-NSSAI #2. Based on the reception of the third rejected NSSAI, the UE includes S-NSSAI #2 in the third rejected NSSAI and stores the third rejected NSSAI.

Furthermore, in a case that the pending NSSAI includes S-NSSAI #1, corresponding to the S-NSSAI of the VPLMN to which S-NSSAI #2 is mapped, the UE may delete S-NSSAI #1 from the pending NSSAI.

Note that in a case that the mapped S-NSSAI of S-NSSAI #1 is not only S-NSSAI #2, in other words in a case that the S-NSSAIs of multiple HPLMNs are mapped to the S-NSSAI #1, the UE need not delete S-NSSAI #1 from the pending NSSAI based on the reception of the S-NSSAI #2.

The UE may delete S-NSSAI #1 from the pending NSSAI in a case of receiving the third rejected NSSAI including all of the mapped S-NSSAIs of S-NSSAI #1.

The UE may be controlled such that the UE is prevented from initiating the MM procedure using the S-NSSAI included in the third rejected NSSAI in a case of storing the third rejected NSSAI.

As described above, in the present embodiment, based on the reception of the rejected NSSAI configured with the S-NSSAI of the HPLMN, the pending NSSAI configured with the S-NSSAI of the current PLMN stored by the UE can be updated.

Note that the first registration procedure may be the registration procedure described in Chapter 3. Furthermore, the procedure in which the UE receives the third rejected NSSAI may be a registration procedure, a UE configuration change procedure, or a network-initiated de-registration procedure.

In the present embodiment, the UE receives the third rejected NSSAI. However, even in a case that the UE instead receives the first rejected NSSAI or the second rejected NSSAI including the S-NSSAI of the HPLMN, each apparatus may perform similar behaviour.

4.2. Second Embodiment

A second embodiment (hereinafter referred to as the present embodiment) will be described below. In the present embodiment, an example of behaviour of each apparatus will be described that is performed, during roaming, in a case that the S-NSSAI included in the first rejected NSSAI is the S-NSSAI of the current PLMN (RPLMN and VPLMN), and the pending NSSAI is also the S-NSSAI of the HPLMN.

Specifically, a case will be described in which the UE, storing the pending NSSAI, receives the first rejected NSSAI from the network.

First, in the first registration procedure for the VPLMN, the UE initiates the registration procedure by including S-NSSAI #1, corresponding to the S-NSSAI of the VPLMN, in the registration request message, and transmitting the registration request message to the VPLMN. At this time, the UE may also include mapped S-NSSAI #2 of S-NSSAI #1 in the registration request message for transmission.

The UE then receives the pending NSSAI, including S-NSSAI #2, from the VPLMN. The UE includes, in the pending NSSAI, S-NSSAI #2 included in the pending NSSAI and stores the pending NSSAI.

Then, the UE receives, from the VPLMN, the MM message including the first rejected NSSAI including S-NSSAI #1. Based on the reception of the first rejected NSSAI, the UE includes S-NSSAI #1 in the first rejected NSSAI for storage.

Furthermore, in a case that S-NSSAI #2, corresponding to the mapped S-NSSAI of S-NSSAI #1, is included in the pending NSSAI, the UE may delete S-NSSAI #2 from the pending NSSAI.

Note that, in a case that the mapped S-NSSAI of S-NSSAI #1 is not only S-NSSAI #2, in other words, in a case that the S-NSSAIs of multiple HPLMNs are mapped to S-NSSAI #1, the UE can delete multiple S-NSSAIs from the pending NSSAI based on the reception of S-NSSAI #1.

Specifically, for example, in a case that S-NSSAI #2 and S-NSSAI #3 of the HPLMN are stored in the pending NSSAI, and further S-NSSAI #2 and S-NSSAI #3 are mapped to S-NSSAI #1 of the VPLMN, the UE may delete S-NSSAI #2 and S-NSSAI #3 from the pending NSSAI based on the reception of the rejected NSSAI including S-NSSAI #1.

The UE may be controlled such that the UE is prevented from initiating the MM procedure using the S-NSSAI included in the first rejected NSSAI.

As described above, in the present embodiment, based on the reception of the rejected NSSAI configured with the S-NSSAI of the current PLMN, the pending NSSAI configured with the S-NSSAI of the HPLMN stored by the UE can be updated.

Note that the first registration procedure may be the registration procedure described in Chapter 3. Furthermore, the procedure in which the UE receives the third rejected NSSAI may be a registration procedure, a UE configuration change procedure, or a network-initiated de-registration procedure.

In the present embodiment, the UE receives the first rejected NSSAI. However, even in a case that the UE instead receives the second rejected NSSAI or the third rejected NSSAI including the S-NSSAI of the VPLMN, each apparatus may perform similar behaviour.

4.3. Third Embodiment

A third embodiment (hereinafter referred to as the present embodiment) will be described below. In the present embodiment, an example of behaviour of each apparatus will be described that is performed, during roaming, in a case that the S-NSSAI included in the third rejected NSSAI is the S-NSSAI of the HPLMN and the allowed NSSAI is the S-NSSAI of the current PLMN (RPLMN and VPLMN), and further the UE manages and/or stores the mapped S-NSSAI of the allowed NSSAI.

Specifically, a case will be described in which the UE, storing the allowed NSSAI associated with the VPLMN of a roaming destination, receives the third rejected NSSAI from the VPLMN.

First, in the first registration procedure for the VPLMN, the UE initiates the registration procedure by including S-NSSAI #1, corresponding to the S-NSSAI of the VPLMN, in the registration request message, and transmitting the registration request message to the VPLMN. At this time, the UE may also include mapped S-NSSAI #2 of S-NSSAI #1 in the registration request message for transmission.

At this time, the UE stores S-NSSAI #1 included in the allowed NSSAI or the configured NSSAI associated with the VPLMN.

Then, the UE receives the allowed NSSAI including S-NSSAI #1 from the VPLMN. The UE includes, in the allowed NSSAI, S-NSSAI #1 included in the allowed NSSAI and stores the allowed NSSAI. At this time, the UE does not delete, from storage, S-NSSAI #2, corresponding to the mapped S-NSSAI of S-NSSAI #1, or the UE stores S-NSSAI #2.

Then, the UE receives, from the VPLMN, the MM message including the third rejected NSSAI including S-NS-SAI #2. Based on the reception of the third rejected NSSAI, the UE includes S-NSSAI #2 in the third rejected NSSAI and stores the third rejected NSSAI.

Furthermore, in a case that allowed NSSAI includes S-NSSAI #1, corresponding to the S-NSSAI of the VPLMN to which S-NSSAI #2 is mapped, the UE may delete S-NSSAI #1 from the allowed NSSAI.

Note that in a case that the mapped S-NSSAI of S-NSSAI #1 is not only S-NSSAI #2, in other words, in a case that the S-NSSAIs of multiple HPLMNs are mapped to S-NSSAI #1, the UE need not delete S-NSSAI #1 from the allowed NSSAI based on the reception of S-NSSAI #2.

The UE may delete S-NSSAI #1 from the allowed NSSAI in a case of receiving the third rejected NSSAI including all of the mapped S-NSSAIs of S-NSSAI #1.

Alternatively, even in a case that the mapped S-NSSAI of the S-NSSAI #1 is not only S-NSSAI #2, the UE may delete S-NSSAI #1 from the allowed NSSAI based on the reception of S-NSSAI #2.

The UE may be controlled such that the UE is prevented from initiating the MM procedure by using the S-NSSAI included in the third rejected NSSAI.

As described above, in the present embodiment, based on the reception of the rejected NSSAI configured with the S-NSSAI of the HPLMN, the stored information of the allowed NSSAI configured with the S-NSSAI of the current PLMN stored by the UE and of the mapped S-NSSAI of the allowed NSSAI can be updated.

Note that the first registration procedure may be the registration procedure described in Chapter 3. Furthermore, the procedure in which the UE receives the third rejected NSSAI may be a registration procedure, a UE configuration change procedure, or a network-initiated de-registration procedure.

In the present embodiment, the UE receives the third rejected NSSAI. However, even in a case that the UE instead receives the first rejected NSSAI or the second rejected NSSAI including the S-NSSAI of the HPLMN, each apparatus may perform similar behaviour.

5. Modified Examples

A program running on an apparatus of the embodiment according to an aspect of the present invention may serve as a program that controls a Central Processing Unit (CPU) and the like to cause a computer to function in such a manner as to realize the functions of the embodiment according to the aspect of the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing the functions of the embodiments according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various features of the apparatuses used in the aforementioned embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The aforementioned electric circuit may include a digital circuit or may include an analog circuit. In a case that with advances in semiconductor technology, a circuit integration technology appears that replaces the present integrated circuits, it is possible for one or multiple aspects of the present invention to use a new integrated circuit based on the technology.

Note that the invention of the present application is not limited to the above-described embodiments. In the embodiment, apparatuses have been described as an example, but an aspect of the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope that does not depart from the gist of the present invention. Furthermore, in the present invention, various modifications are possible within the scope of claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

The invention claimed is:

1. A User Equipment (UE) comprising:

a transmission and reception unit, a controller, and a storage unit, wherein the transmission and reception unit receives allowed Network Slice Selection Assistance Information (NS-SAI), and the controller:

deletes Single Network Slice Selection Assistance Information (S-NSSAI) of the allowed NSSAI from pending NSSAI stored by the storage unit, and in a case that the UE is roaming, deletes mapped S-NSSAI of the allowed NSSAI from the pending NSSAI stored by the storage unit, wherein the pending NSSAI indicates S-NSSAI for which a network slice-specific authentication and authorization procedure is pending.

2. A communication control method performed by a User Equipment (UE), the communication control method comprising:

receiving allowed Network Slice Selection Assistance Information (NSSAI);

deleting Single Network Slice Selection Assistance Information (S-NSSAI) of the allowed NSSAI from pending NSSAI stored by the storage unit; and in a case that the UE is roaming, deleting mapped S-NSSAI of the allowed NSSAI from the pending NSSAI stored by the UE, the pending NSSAI indicating S-NSSAI for which a network slice-specific authentication and authorization procedure is pending.

* * * * *